US012220634B2

(12) United States Patent
Song

(10) Patent No.: US 12,220,634 B2
(45) Date of Patent: Feb. 11, 2025

(54) METHOD, APPARATUS, AND TERMINAL FOR TRANSMITTING PROMPT INFORMATION IN MULTIPLAYER ONLINE BATTLE PROGRAM

(71) Applicant: Tencent Technology (Shenzhen) Company Limited, Shenzhen (CN)

(72) Inventor: Hao Song, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 18/511,874

(22) Filed: Nov. 16, 2023

(65) Prior Publication Data

US 2024/0082718 A1 Mar. 14, 2024

Related U.S. Application Data

(63) Continuation of application No. 17/367,270, filed on Jul. 2, 2021, now Pat. No. 11,857,878, which is a (Continued)

(30) Foreign Application Priority Data

Jul. 19, 2019 (CN) ......................... 201910655572.6

(51) Int. Cl.
*A63F 13/533* (2014.01)
*A63F 13/2145* (2014.01)

(Continued)

(52) U.S. Cl.
CPC ........ *A63F 13/533* (2014.09); *A63F 13/2145* (2014.09); *A63F 13/822* (2014.09); *A63F 13/847* (2014.09); *A63F 13/92* (2014.09)

(58) Field of Classification Search
CPC .. A63F 13/533; A63F 13/2145; A63F 13/822; A63F 13/847; A63F 13/422; A63F 13/5375; A63F 13/537
See application file for complete search history.

(56) References Cited

U.S. PATENT DOCUMENTS

| | | | | |
|---|---|---|---|---|
| 8,376,834 B2 * | 2/2013 | Hirzel | .................. | A63F 13/798 463/23 |
| 9,687,745 B2 * | 6/2017 | Lin | ...................... | A63F 13/795 |

(Continued)

FOREIGN PATENT DOCUMENTS

| | | |
|---|---|---|
| CN | 105597310 A | 5/2016 |
| CN | 106809586 A | 6/2017 |

(Continued)

OTHER PUBLICATIONS

Tencent Technology, Indonesian Office Action, ID Patent Application No. P00202104818, Aug. 16, 2024, 5 pgs.

(Continued)

*Primary Examiner* — Chase E Leichliter
(74) *Attorney, Agent, or Firm* — Morgan, Lewis & Bockius LLP

(57) ABSTRACT

This application discloses a method for transmitting prompt information in a multiplayer online battle program performed by a terminal. The method includes: displaying a user interface (UI) from a perspective corresponding to a master virtual character of the multiplayer online battle program; receiving a prompt activation operation on the UI for activating a prompt information transmission function; selecting a plurality of skill display elements in the UI corresponding to the prompt activation operation; receiving a prompt release operation on a target skill display element among the plurality of skill display elements; determining target prompt information specific to the target skill display element; and transmitting the determined target prompt (Continued)

information to one or more virtual characters that are teammates of the master virtual character.

17 Claims, 51 Drawing Sheets

Related U.S. Application Data continuation of application No. PCT/CN2020/096956, filed on Jun. 19, 2020.

(51) Int. Cl.

| | |
|---|---|
| ***A63F 13/822*** | (2014.01) |
| ***A63F 13/847*** | (2014.01) |
| ***A63F 13/92*** | (2014.01) |

(56) References Cited

U.S. PATENT DOCUMENTS

| | | | | |
|---|---|---|---|---|
| 10,967,269 | B2 * | 4/2021 | Onishi | A63F 13/69 |
| 11,484,801 | B2 * | 11/2022 | Tripathi | A63F 13/35 |
| 11,857,878 | B2 * | 1/2024 | Song | A63F 13/5375 |
| 2011/0175832 | A1 * | 7/2011 | Miyazawa | G06F 3/04886 345/173 |
| 2011/0275431 | A1 * | 11/2011 | Hirzel | A63F 13/822 463/23 |
| 2011/0300946 | A1 * | 12/2011 | Stafford | A63F 13/332 463/42 |
| 2012/0172098 | A1 * | 7/2012 | Baker | G07F 17/3237 463/43 |
| 2013/0244784 | A1 * | 9/2013 | Assa | G06F 3/0416 463/40 |
| 2014/0274410 | A1 * | 9/2014 | Maynard | G06F 3/0482 463/42 |
| 2014/0364194 | A1 * | 12/2014 | Kusano | A63F 13/35 463/22 |
| 2015/0038233 | A1 * | 2/2015 | Rom | A63F 13/42 463/42 |
| 2015/0057084 | A1 * | 2/2015 | Lin | A63F 13/352 463/42 |
| 2016/0170589 | A1 * | 6/2016 | Maynard | A63F 13/533 463/31 |
| 2018/0024660 | A1 * | 1/2018 | Wang | G06F 3/04817 273/110 |
| 2018/0028907 | A1 * | 2/2018 | Weng | G06F 3/04842 |
| 2018/0028918 | A1 * | 2/2018 | Tang | G06F 3/0484 |
| 2018/0169525 | A1 * | 6/2018 | Onishi | A63F 13/537 |
| 2018/0264354 | A1 * | 9/2018 | Wada | A63F 13/35 |
| 2018/0286099 | A1 * | 10/2018 | Kozloski | G06T 1/60 |
| 2018/0339229 | A1 * | 11/2018 | He | G06F 3/04847 |
| 2019/0030431 | A1 * | 1/2019 | Zhang | A63F 13/2145 |
| 2019/0070493 | A1 * | 3/2019 | He | A63F 13/426 |
| 2019/0070494 | A1 * | 3/2019 | He | H04M 1/00 |
| 2019/0070495 | A1 * | 3/2019 | He | A63F 13/847 |
| 2019/0070496 | A1 * | 3/2019 | He | A63F 13/92 |
| 2019/0070497 | A1 * | 3/2019 | He | G06F 3/0488 |
| 2019/0118089 | A1 * | 4/2019 | Ying | A63F 13/837 |
| 2019/0118096 | A1 * | 4/2019 | Jeon | A63F 13/2145 |
| 2019/0208037 | A1 * | 7/2019 | Yang | A63F 13/358 |
| 2019/0208284 | A1 * | 7/2019 | Guo | A63F 13/58 |
| 2019/0232175 | A1 * | 8/2019 | Morishita | A63F 13/814 |
| 2019/0344160 | A1 * | 11/2019 | Kim | A63F 3/062 |
| 2020/0061468 | A1 * | 2/2020 | Zhang | A63F 13/92 |
| 2020/0245019 | A1 * | 7/2020 | Yin | A63F 13/45 |
| 2021/0038996 | A1 * | 2/2021 | Lin | A63F 13/795 |
| 2021/0331070 | A1 * | 10/2021 | Song | A63F 13/5375 |
| 2021/0331076 | A1 * | 10/2021 | Labate | A63F 13/48 |
| 2022/0072431 | A1 * | 3/2022 | Lin | A63F 13/85 |
| 2022/0305390 | A1 * | 9/2022 | Tripathi | A63F 13/795 |
| 2022/0314118 | A1 * | 10/2022 | Zeng | A63F 13/822 |
| 2022/0379215 | A1 * | 12/2022 | Zeng | A63F 13/48 |
| 2024/0082718 | A1 * | 3/2024 | Song | A63F 13/58 |

FOREIGN PATENT DOCUMENTS

| | | | |
|---|---|---|---|
| CN | 107596691 | A | 1/2018 |
| CN | 107648847 | A | 2/2018 |
| CN | 108970115 | A | 12/2018 |
| CN | 109276887 | A | 1/2019 |
| CN | 109445662 | A | 3/2019 |
| CN | 109634453 | A | 4/2019 |
| CN | 109833624 | A | 6/2019 |
| CN | 110368691 | A | 10/2019 |
| JP | 2011000377 | A | 1/2011 |
| JP | 2017047088 | A | 3/2017 |
| JP | 2018519970 | A | 7/2018 |
| JP | 2019051030 | A | 4/2019 |
| JP | 2019051311 | A | 4/2019 |
| KR | 20150103319 | A | 9/2015 |

OTHER PUBLICATIONS

"DOTA2 Novice Advanced—Alt, Ctrl and Shift", May 15, 2018, 2 pgs., Retrieved from the Internet: https:/www.sohu.com/a/231646208_421894.

Lions ACG, "King of Glory: What Quick Messages Can be Sent to Let Teammates Cooperate with Them? These 3 Items Should be Prepared Quickly", Apr. 25, 2019, Retrieved from the Internet: hhttp://v.qq.com/x/page/x0864ybkmvj.html.

Kan KKan, "Wow, Must Add on List", Brunchstory, World of Warcraft, Nov. 3, 2018, 10 pgs., Retrieved from the Internet: https://brunch.co.kr/@kkan/373#comment.

Tencent Technology, Australian Office Action, AU Patent Application No. 2020316410, Aug. 23, 2022, 3 pgs.

Tencent Technology, Australian Office Action, AU Patent Application No. 2020316410, Feb. 2, 2023, 3 pgs.

Tencent Technology, Australian Office Action, AU Patent Application No. 2020316410, Jun. 6, 2023, 4 pgs.

Tencent Technology, Canadian Office Action, Canadian Patent Application No. 3,133,852, Nov. 24, 2022, 4 pgs.

Tencent Technology, Canadian Office Action, CA 3,133,852, Sep. 20, 2023, 5 pgs.

Tencent Technology, Extended European Search Report, EP20844928.0, Oct. 7, 2022, 13 pgs.

Tencent Technology, Indian Office Action, IN Patent Application No. 202147029543, Mar. 16, 2022, 6 pgs.

Tencent Technology, Indonesian Office Action, ID Patent Application No. P00202104818, Jun. 12, 2023, 5 pgs.

Tencent Technology, ISRWO, PCT/CN2020/096956, Sep. 30, 2020, 7 pgs.

Tencent Technology, IPRP, PCT/CN2020/096956, Jan. 25, 2022, 6 pgs.

Tencent Technology, Korean Office Action, KR Patent Application No. 10-2021-7025848, Apr. 17, 2023, 17 pgs.

Tencent Technology, Russian Office Action, RU Patent Application No. 2021127032, Aug. 30, 2022, 15 pgs.

Tencent Technology, Singaporean Written Opinion and Search Report, SG Patent Application No. 11202105322S, Sep. 1, 2022, 9 pgs.

Tencent Technology, Vietnamese Office Action, VN Patent Application No. 1-2021-06445, Oct. 25, 2023, 4 pgs.

Tencent Technology, Canadian Office Action, CA Patent Application No. 3,133,852, Jun. 25, 2024, 6 pgs.

Tencent Technology, Singaporean Witten Opinion, SG Patent Application No. 112021053225, Sep. 18, 2024, 6 pgs.

* cited by examiner

METHOD, APPARATUS, AND TERMINAL FOR TRANSMITTING PROMPT INFORMATION IN MULTIPLAYER ONLINE BATTLE PROGRAM

CROSS-REFERENCE TO RELATED APPLICATIONS

This application is a continuation application of U.S. patent application Ser. No. 17/367,270, entitled "METHOD, APPARATUS, AND TERMINAL FOR TRANSMITTING PROMPT INFORMATION IN MULTIPLAYER ONLINE BATTLE PROGRAM" filed on Jul. 2, 2021, which is a continuation application of PCT Patent Application No. PCT/CN2020/096956, entitled "METHOD, APPARATUS, AND TERMINAL FOR TRANSMITTING PROMPT INFORMATION IN MULTIPLAYER ONLINE BATTLE PROGRAM" filed on Jun. 19, 2020, which claims priority to Chinese Patent Application No. 201910655572.6, entitled "METHOD, APPARATUS, AND TERMINAL FOR TRANSMITTING PROMPT INFORMATION IN MULTIPLAYER ONLINE BATTLE PROGRAM" and filed with the National Intellectual Property Administration, PRC on Jul. 19, 2019, all of which are incorporated herein by reference in their entirety.

FIELD OF THE TECHNOLOGY

This application relates to the field of computer technologies, and in particular, to a technique for transmitting prompt information in a multiplayer online battle program.

BACKGROUND OF THE DISCLOSURE

Multiplayer online battle arena (MOBA) a popular genre of games. In this genre of games, users are divided into two teams, and the two teams compete against each other in a scattered game map. Each user controls a selected character by using a real-time strategy (RTS)-style interface, and the user only needs to control the character selected by the user.

In the related art, the MOBA game includes a signal system used for communication between different users. The signal system includes an attack button, a retreat button, and an assembly button. When user A clicks/taps the attack button in a round of battle, other users belonging to the same team as user A can receive a text prompt and a voice prompt indicating "launch an attack" from the signal system. When user B clicks/taps the retreat button in the round of battle, other users belonging to the same team as user B can receive a text prompt and a voice prompt indicating "start a retreat" from the signal system. When user C clicks/taps the assembly button in the round of battle, other users belonging to the same team as user C can receive a text prompt and a voice prompt indicating "request to assemble" from the signal system.

The signal system is relatively simple and limited, and can transmit only several types of prompt information, which cannot meet communication requirements of users.

SUMMARY

This application provides a method, apparatus, and terminal for transmitting prompt information in a multiplayer online battle program, which may resolve a problem of a relatively simple and limited signal system in the related art. The technical solutions are as follows.

According to an aspect of this application, a method for transmitting prompt information in a multiplayer online battle program is provided, which is performed by a terminal and includes:

displaying a user interface (UI) of the multiplayer online battle program;

receiving a directional operation on the UI, the directional operation being an operation for activating a prompt information transmission function and pointing to a target display element in the UI, the target display element being one of a plurality of display elements in the UI; and predicting target prompt information according to the target display element and battle information;

determining one or more virtual characters in a battle of the multiplayer online battle program for receiving the predicted target prompt information; and transmitting the predicted target prompt information to terminals of the one or more determined virtual characters, wherein the one or more determined virtual characters are a master virtual character or all virtual characters in the battle.

According to another aspect of this application, a method for displaying prompt information in a multiplayer online battle program is provided, which is performed by a terminal and includes:

displaying a user interface (UI) of the multiplayer online battle program;

receiving a directional operation on the UI, the directional operation being an operation for activating a prompt information transmission function and pointing to a target display element in the UI, the target display element being one of a plurality of display elements in the UI; and predicting target prompt information according to the target display element and battle information; and displaying the predicted target prompt information on the UI.

According to another aspect of this application, an apparatus for transmitting prompt information in a multiplayer online battle program is provided, the apparatus including:

a display module, configured to display a user interface (UI) of the multiplayer online battle program;

an interaction module, configured to receive a directional operation on the UI, the directional operation being an operation for activating a prompt information transmission function and pointing to a target display element in the UI, the target display element being one of a plurality of display elements in the UI; and a prediction module, configured to predict target prompt information according to the target display element and battle information, a transmission module, configured to transmit the target prompt information to clients of teammate virtual characters of a master virtual character or all virtual characters in a battle.

According to another aspect of this application, an apparatus for displaying prompt information in a multiplayer online battle program is provided, the apparatus including:

a display module, configured to display a user interface (UI) of the multiplayer online battle program;

an interaction module, configured to receive a directional operation on the UI, the directional operation being an operation for activating a prompt information transmission function and pointing to a target display element in the UI, the target display element being one of a plurality of display elements in the UI; and a prediction module, configured to predict target prompt information according to the target display element and battle information, the display module being configured to display the target prompt information on the UI.

According to another aspect of this application, a terminal is provided, including a processor and a memory, the memory storing a plurality of instructions that, when executed by the processor, cause the terminal to implement the method for transmitting prompt information in a multiplayer online battle program, and/or, the method for displaying prompt information in a multiplayer online battle program.

According to another aspect of this application, a non-transitory computer-readable storage medium is provided, storing a plurality of instructions that, when executed by a processor of a terminal, cause the terminal to implement the method for transmitting prompt information in a multiplayer online battle program, and/or, the method for displaying prompt information in a multiplayer online battle program.

According to another aspect of this application, a computer program product is provided, including instructions, the instructions, when run on a computer, causing the computer to perform the method for transmitting prompt information in a multiplayer online battle program, and/or, the method for displaying prompt information in a multiplayer online battle program.

The technical solutions provided in the embodiments of this application achieve at least the following beneficial effects.

In a case that a directional operation is received, target prompt information expected to be transmitted is predicted according to a target display element and battle information, and the target prompt information is transmitted to clients of teammate virtual characters of a master virtual character or all virtual characters in a battle. Therefore, a user may transmit prompt information that satisfies the user's expectation at the minimal man-machine interaction cost. A multiplayer online battle program intelligently determines and selects a signal that the user wants to transmit in a current battle scenario based on a thought expressed by the user and the battle information, thereby improving the man-machine interaction efficiency in information communication between the user and other users.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

Figure 1:
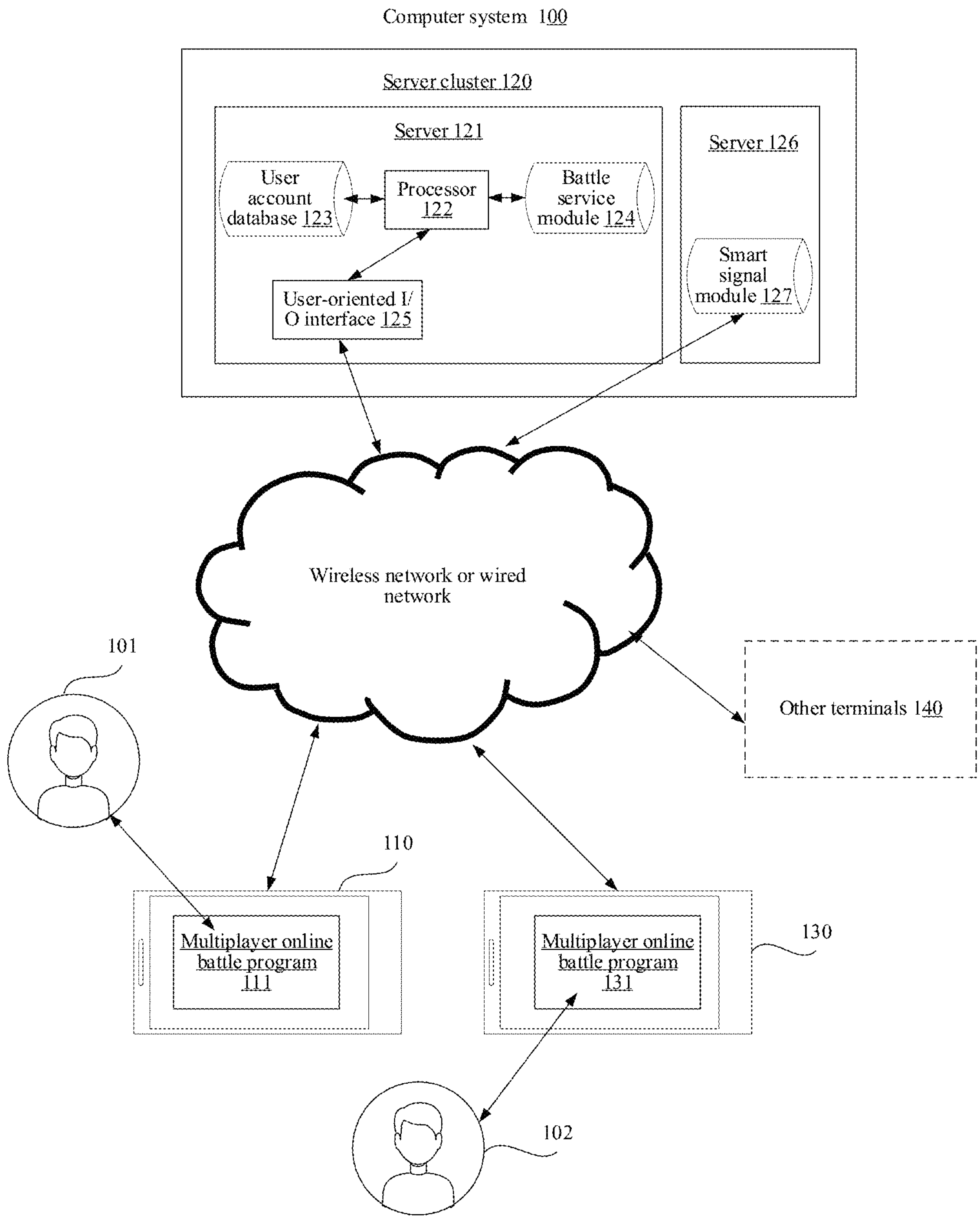
FIG. 1 is a structural block diagram of a computer system according to an exemplary embodiment of this application.

To make the objectives, technical solutions, and advantages of this application clearer, the following further describes implementations of this application in detail with reference to the accompanying drawings.

First, several terms involved in this application are introduced and explained.

Virtual environment: It is a virtual environment displayed (or provided) when an application is run on a terminal. The virtual environment may be a simulated environment of a real world, or may be a semi-simulated semi-fictional environment, or may be an entirely fictional environment. The virtual environment may be any one of a two-dimensional virtual environment, a 2.5-dimensional virtual environment, and a three-dimensional virtual environment. In some embodiments, the virtual environment is further used for a virtual environment battle between at least two virtual characters, and there are virtual resources available to the at least two virtual characters in the virtual environment. In some embodiments, the virtual environment may include a map, and the map may include two symmetric regions. Virtual characters on two opposing camps occupy the regions respectively, and the objective is for each camp to destroy a target building deep in the opponent's region.

Virtual character (also referred to as hero): It refers to a movable object in the virtual environment. The movable object may be at least one of a virtual human, a virtual animal, and an animated human character. In some embodiments, when the virtual environment is a three-dimensional virtual world, the virtual characters may be three-dimensional models. Each virtual character has its own shape and size in the three-dimensional virtual world, and occupies some space in the three-dimensional virtual world. In some embodiments, the virtual character is a three-dimensional character constructed based on three-dimensional human skeleton technology. The virtual character wears different skins to get different appearances. In some implementations, the virtual character may also be implemented by using a 2.5-dimensional model or a two-dimensional model, which is not limited in the embodiments of this application. In some embodiments of this application, the virtual characters are virtual characters that can be controlled by users in the virtual environment, and virtual characters that cannot be controlled by users (such as creeps, monsters, and non-player characters (NPCs)) may be referred to as assisting virtual characters.

MOBA: It is an arena game in which different virtual teams on at least two opposing camps occupy respective map regions on a map provided in a virtual environment, and compete against each other to achieve a specific victory condition. The victory condition includes, but is not limited to, at least one of occupying forts or destroy forts of the opposing camps, killing virtual characters in the opposing camps, surviving in a specified scenario and time, seizing a specific resource, and outscoring the opponent within a specified time. The battle arena game may take place in rounds. The same map or different maps may be used in different rounds of the battle arena game. Each virtual team includes one or more virtual characters, for example, 1 virtual character, 3 virtual characters, or 5 virtual characters.

MOBA game: It is a game in which several forts are provided in a virtual world, and users on different camps control virtual characters to battle in the virtual world, occupy forts or destroy forts of the opposing camp. For example, in the MOBA game, the users may be divided into two opposing camps. The virtual characters controlled by the users are scattered in the virtual world to compete against each other, and the victory condition is to destroy or occupy all enemy forts. The MOBA game takes place in rounds. A duration of a round of the MOBA game is from a time point at which the game starts to a time point at which the victory condition is met.

In a typical MOBA game, a communication system in a round of battle between different users includes the following three parts.

1. Built-in voice system.

A voice communication channel is formed between a plurality of users, and the users need to turn on the microphone before speaking.

2. Built-in chat system.

A text-based chat channel is formed between a plurality of users, and the users need to type on a terminal for communication.

3. Built-in signal system (including: an attack button, a retreat button, an assembly button, and a minimap marking function).

The attack button, the retreat button, the assembly button, and the minimap are displayed on a UI, and the user clicks/taps the buttons or the minimap to quickly initiate communication.

Many MOBA games are mobile phone games (mobile games for short). A user playing a MOBA game on a mobile phone may be in a place not suitable for talking, such as in a bedroom or in a carriage, and therefore, the user cannot use the voice communication channel to communicate effectively. In addition, the use of the voice communication channel for communication may also lead to network lag. For mobile phones, typing on the touchscreen while there is already a MOBA game running on the interface requires high man-machine interaction cost, and interferes with battle operations in a round of battle. The built-in signal system can transmit only several types of prompt information. In other words, the built-in signal system has problems in at least two dimensions:

1. signals that can be transmitted are too simple and limited; and
2. the cost of man-machine interaction is high.

The embodiments of this application provide a system for transmitting prompt information in a multiplayer online battle program (a signal system for short). Based on the system, a user may express a thought at the minimal man-machine interaction operation cost without tuning on the voice or typing function. The embodiment of this application may intelligently determine and select signals that the player wants to transmit or transfer under a current scenario according to a thought expressed by the user player and a real-time implementation status of the current battle.

FIG. 1 is a structural block diagram of a computer system according to an exemplary embodiment of this application. The computer system 100 includes: a first terminal 110, a server cluster 120, and a second terminal 130.

A client 111 supporting a virtual environment is installed and run on the first terminal 110, and the client 111 may be a multiplayer online battle program. When the first terminal runs the client 111, a UI of the client 111 is displayed on a screen of the first terminal 110. The client 111 may be any one of a military simulation program, a MOBA game, a battle royale shooting game, and a simulation game (SLG). In this embodiment, an example in which the client 111 is a MOBA game is used for description. The first terminal 110 is a terminal used by a first user 101. The first user 101 uses the first terminal 110 to control a first virtual character located in a virtual environment to perform activities, and the first virtual character may be referred to as a master virtual character of the first user 101. The activities of the first virtual character include, but are not limited to: at least one of adjusting body postures, crawling, walking, running, riding, jumping, driving, picking, shooting, attacking, and throwing. For example, the first virtual character is a first virtual human, for example, a simulated human character or an animated human character.

A client 131 supporting a virtual environment is installed and run on the second terminal 130, and the client 131 may be a multiplayer online battle program. When the second terminal 130 runs the client 131, a UI of the client 131 is displayed on a screen of the second terminal 130. The client 131 may be any one of a military simulation program, a MOBA game, a battle royale shooting game, and a simulation game (SLG). In this embodiment, an example in which the client 131 is a MOBA game is used for description. The second terminal 130 is a terminal used by a second user 102. The second user 102 uses the second terminal 130 to control a second virtual character located in a virtual environment to perform activities, and the second virtual character may be referred to as a master virtual character of the second user 102. For example, the second virtual character is a second virtual human, for example, a simulated human character or an animated human character.

In some embodiments, the first virtual human and the second virtual human are located in the same virtual environment. In some embodiments, the first virtual human and the second virtual human may belong to the same camp, the same team, or the same organization, are friends, or have a temporary communication permission. In some embodiments, the first virtual human and the second virtual human may alternatively belong to different camps, different teams, or different organizations, or are enemies to each other.

In some embodiments, the client installed on the first terminal 110 is the same as the client installed on the second terminal 130, or the clients installed on the two terminals are clients of the same type on different operating system platforms (Android system or iOS system). The first terminal 110 may generally refer to one of a plurality of terminals, and the second terminal 130 may generally refer to another one of the plurality of terminals. In this embodiment, the first terminal 110 and the second terminal 130 are merely used as an example for description. The first terminal 110 and the second terminal 130 may be of the same or different device types, and the device type includes at least one of a smartphone, a tablet computer, an e-book reader, a moving picture experts group audio layer III (MP3) player, a moving picture experts group audio layer IV (MP4) player, a laptop, and a desktop computer.

FIG. 1 shows only two terminals. However, a plurality of other terminals 140 may access the server cluster 120 in different embodiments. In some embodiments, one or more terminals 140 are terminals corresponding to a developer. A developing and editing platform for the client is installed on the terminal 140. The developer may edit and update the client on the terminal 140 and transmit an updated client installation package to the server cluster 120 via a wired or wireless network. The first terminal 110 and the second terminal 130 may download the client installation package from the server cluster 120 to update the client.

The first terminal 110, the second terminal 130, and the other terminals 140 are connected to the server cluster 120 via a wireless network or a wired network.

The server cluster 120 includes at least one of one server, a plurality of servers, a cloud computing platform, and a virtualization center. The server cluster 120 is configured to provide a background service for a client supporting a virtual environment. In some embodiments, the server cluster 120 is responsible for primary computing work, and the terminal is responsible for secondary computing work; or the server cluster 120 is responsible for secondary computing work, and the terminal is responsible for primary computing work; or the server cluster 120 and the terminals (the first terminal 110 and the second terminal 130) perform collaborative computing by using a distributed computing architecture among each other.

In a schematic example, the server cluster 120 includes a server 121 and a server 126. The server 121 includes a processor 122, a user account database 123, a battle service module 124, and a user-oriented input/output (I/O) interface 125. The processor 122 is configured to load instructions stored in the server 121, and process data in the user account database 123 and the battle service module 124. The user account database 123 is configured to store data of user accounts used by the first terminal 110, the second terminal 130, and the other terminals 140, for example, avatars of the user accounts, nicknames of the user accounts, battle effectiveness indexes of the user accounts, and service zones of the user accounts. The battle service module 124 is configured to provide a plurality of battle rooms for the users to battle, for example, a 1V1 battle room, a 3V3 battle room, a 5V5 battle room, and the like. The user-oriented I/O interface 125 is configured to establish communication between the first terminal 110 and/or the second terminal 130 via a wireless network or a wired network for data exchange. In some embodiments, a smart signal module 127 is disposed in the server 126, and the smart signal module 127 is configured to implement a method for transmitting prompt information in a multiplayer online battle program provided in the following embodiment.

Figure 2:
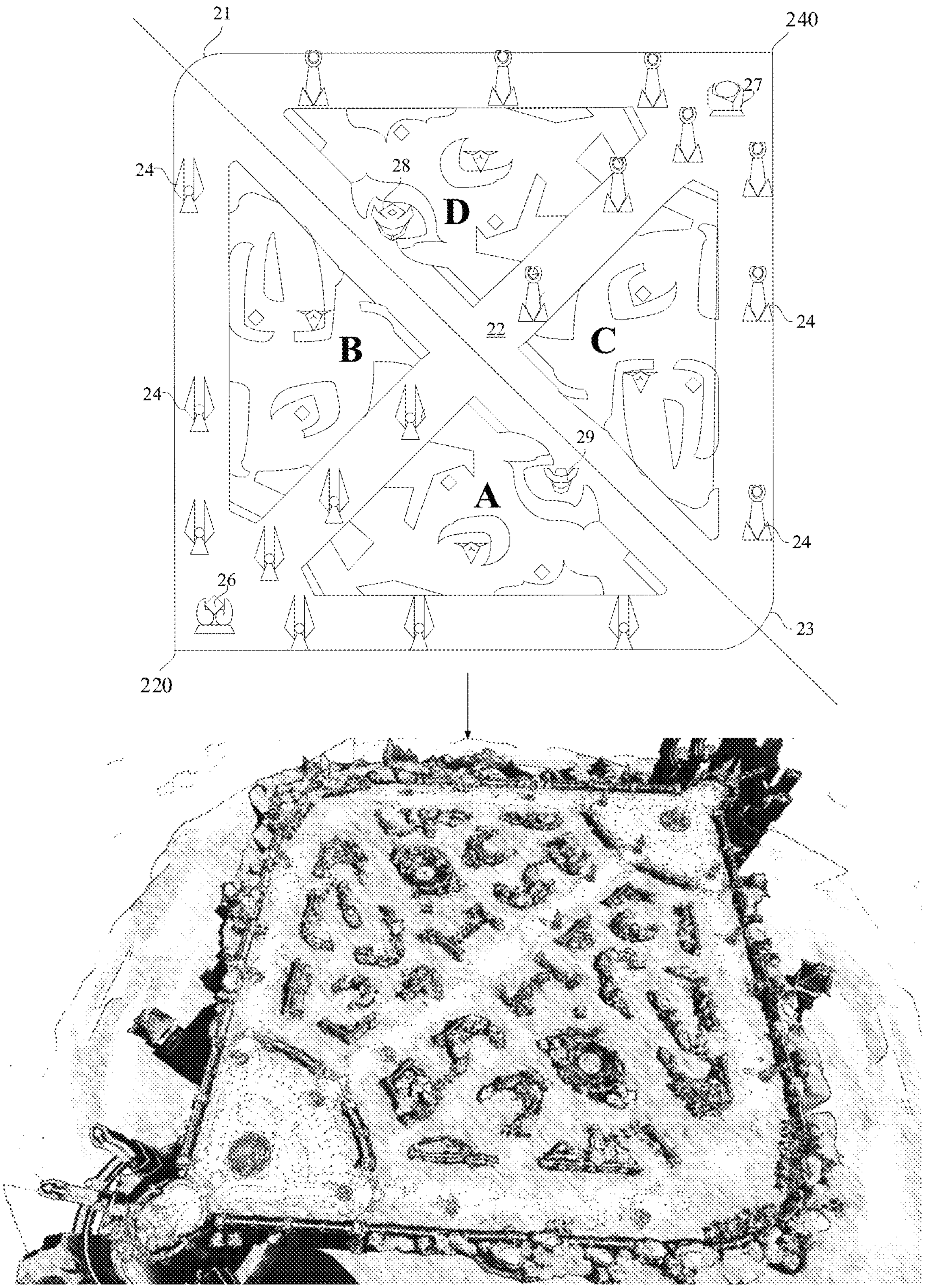
FIG. 2 is a schematic diagram of a map of a MOBA game according to another exemplary embodiment of this application.

FIG. 2 is a schematic diagram of a map provided in a MOBA game virtual environment according to an exemplary embodiment of this application. The map is in the shape of a square. The map is divided diagonally into a lower left triangular region 220 and an upper right triangular region 240. There are three lanes from a lower left corner of the lower left triangular region 220 to an upper right corner of the upper right triangular region 240: a top lane 21, a middle lane 22, and a bottom lane 23. In a typical round of battle, 10 virtual characters are needed, which are divided into two camps to battle. 5 virtual characters in a first camp occupy the lower left triangular region 220, and 5 virtual characters in a second camp occupy the upper right triangular region 240. A victory condition for the first camp is to destroy or occupy all forts of the second camp, and a victory condition for the second camp is to destroy or occupy all forts of the first camp.

For example, the forts of the first camp include 9 turrets 24 and a first base 26. Among the 9 turrets 24, there are respectively 3 turrets on the top lane 21, the middle lane 22, and the bottom lane 23. The first base 26 is located at the lower left corner of the lower left triangular region 220.

For example, the forts of the second camp include 9 turrets 24 and a second base 27. Among the 9 turrets 24, there are respectively 3 turrets on the top lane 21, the middle lane 22, and the bottom lane 23. The second base 27 is located at the upper right corner of the upper right triangular region 240.

A location denoted by a dotted line in FIG. 2 may be referred to as a riverway region. The riverway region is a common region of the first camp and the second camp, and is also a border region between the lower left triangular region 220 and the upper right triangular region 240.

The MOBA game requires the virtual characters to obtain resources in the map to improve combat capabilities of the virtual characters. The resources include creeps, monsters, big and small dragons.

1. The creeps periodically appear on the top lane 21, the middle lane 22, and the bottom lane 23. When a creep is killed, a virtual character nearby will obtain experience values and gold coins.

2. The map may be divided into 4 triangular regions A, B, C, and D by the middle lane (a diagonal line from the lower left corner to the upper right corner) and the riverway region (a diagonal line from an upper left corner to a lower right corner) as division lines. Monsters are periodically refreshed in the 4 triangular regions A, B, C, and D, and when a monster is killed, a virtual character nearby will obtain experience values, gold coins, and BUFF effects.

3. A big dragon 28 and a small dragon 29 are periodically refreshed at two symmetric positions in the riverway region. When the big dragon 28 and the small dragon 29 are killed, each virtual character in a killer camp obtains experience values, gold coins, and BUFF effects. The big dragon 28 may be referred to as a "dominator", a "Caesar", or other names, and the small dragon 29 may be referred to as a "tyrant", a "magic dragon", or other names.

In an example, the top lane and the bottom lane of the riverway each have a gold coin monster, which appears at the 30th second of the game. After a gold coin monster is killed, a virtual character nearby will obtain gold coins, and the gold coin monster is refreshed after 70 seconds.

Region A has a red BUFF, two normal monsters (a pig and a bird), and a tyrant (a small dragon). The red BUFF and the monsters appear at the 30th second of the game, the normal monsters are refreshed after 70 seconds upon being killed, and the red BUFF is refreshed after 90 seconds upon being killed.

The tyrant appears at the 2nd minute of the game, and is refreshed after 3 minutes upon being killed. All teammates of the killer obtain gold coins and experience values after the tyrant is killed. The tyrant falls into darkness at the 9th minute and 55th second, and a dark tyrant appears at the 10th minute. A revenge BUFF of the tyrant is obtained by a virtual character who kills the dark tyrant.

Region B has a blue BUFF and two normal monsters (a wolf and a bird). The blue BUFF also appears at the 30th second and is refreshed after 90 seconds upon being killed.

Region C is the same as the region B, it has a blue BUFF and two normal monsters (a wolf and a bird). Similarly, the blue BUFF also appears at the 30th second and is refreshed after 90 seconds upon being killed.

Region D is similar to the region A, has a red BUFF and two normal monsters (a pig and a bird). The red BUFF is also used for output increase and deceleration. There is also a dominator (a big dragon). The dominator appears at the 8th minute of the game and is refreshed after 5 minutes upon being killed. A dominator BUFF, a fetter BUFF, and dominant pioneers (sky dragons that are manually summoned) on the lanes may be obtained after the dominator is killed.

In an example, the BUFFs are explained in detail:

The red BUFF lasts for 70 seconds and carries continuous burning injuries and deceleration with an attack.

The blue BUFF lasts for 70 seconds and may shorten a cooldown (CD) time and restore additional mana per second.

The dark tyrant BUFF and the fetter BUFF are obtained after the dark tyrant is killed.

The dark tyrant BUFF increases physical attacks (80+5% of a current attack) for the whole team and increase magic attacks (120+5% of a current magic attack) for the entire team for 90 seconds.

The fetter BUFF reduces an output for the dominator by 50%, and the fetter BUFF does not disappear when the virtual character is killed and lasts for 90 seconds.

The dominator BUFF and the fetter BUFF can be obtained by killing the dominator.

The dominator may improve life recover and mana recover for the whole team by 1.5% per second and last for 90 seconds. The dominator BUFF disappears when the virtual character is killed.

The fetter BUFF reduces an output for the dark tyrant by 50%, and the fetter BUFF does not disappear when the virtual character is killed and lasts for 90 seconds.

The following benefits may be obtained after the dominator is killed.

1. All the teammates obtain 100 gold coins, and whether a master virtual character has participated in fighting against the dominator or not, the master virtual character obtains effects, including a master virtual character that is in a resurrection CD.

2. From a moment that the dominator is killed, next three waves (three lanes) of creeps of the killer party are replaced with the dominant pioneers (flying dragons). The dominant pioneers are very strong and attack in the three lanes at the same time, which brings a great creep line pressure on the opposing team. The opposing team needs to defense in three lanes. An alarm of the dominant pioneers is shown in the map, and during the alarm, there will be a hint of the number of waves of the coming dominant pioneers (usually three waves).

The combat capabilities of the 10 virtual characters include two parts: level and equipment. The level is obtained by using accumulated experience values, and the equipment is purchased by using accumulated gold coins. The 10 virtual characters may be obtained by matching 10 user accounts online by a server. For example, the server matches 2, 6, or 10 user accounts online for competition in the same virtual world. The 2, 6, or 10 virtual characters are on two opposing camps. The two camps have the same quantity of corresponding virtual characters. For example, there are 5 virtual characters on each camp. Types of the 5 virtual characters may be a warrior character, an assassin character, a mage character, a support (or meat shield) character, and an archer character respectively.

The battle may take place in rounds. The same map or different maps may be used in different rounds of battle. Each camp includes one or more virtual characters, for example, 1 virtual character, 3 virtual characters, or 5 virtual characters.

Figure 3:
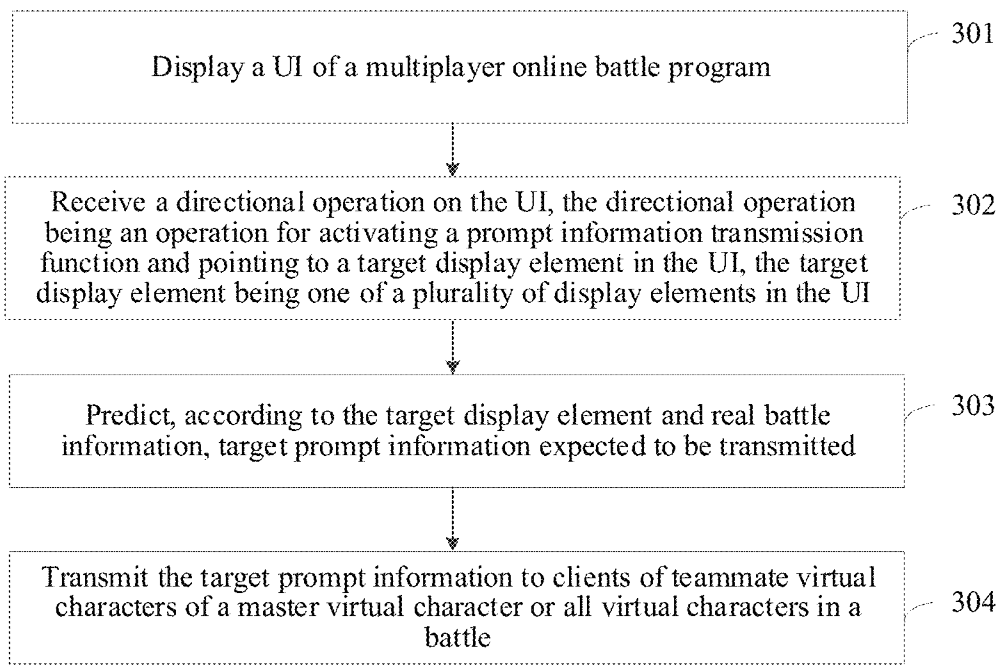
FIG. 3 is a flowchart of a method for transmitting prompt information in a multiplayer online battle program according to an exemplary embodiment of this application.

FIG. 3 is a flowchart of a method for transmitting prompt information in a multiplayer online battle program according to an exemplary embodiment of this application. The method may be performed by any terminal in FIG. 1, and the method includes the following steps.

Step 301. Display a UI of a multiplayer online battle program.

The multiplayer online battle program is a program that allows at least two users to control virtual characters to battle in a virtual environment. The virtual environment is a battle environment configured for at least two virtual characters to battle. The multiplayer online battle program may be any one of a military simulation program, a MOBA game, a battle royale shooting game, and an SLG. In this embodiment, an example in which the multiplayer online battle arena is a MOBA game is used for description.

Figure 4:
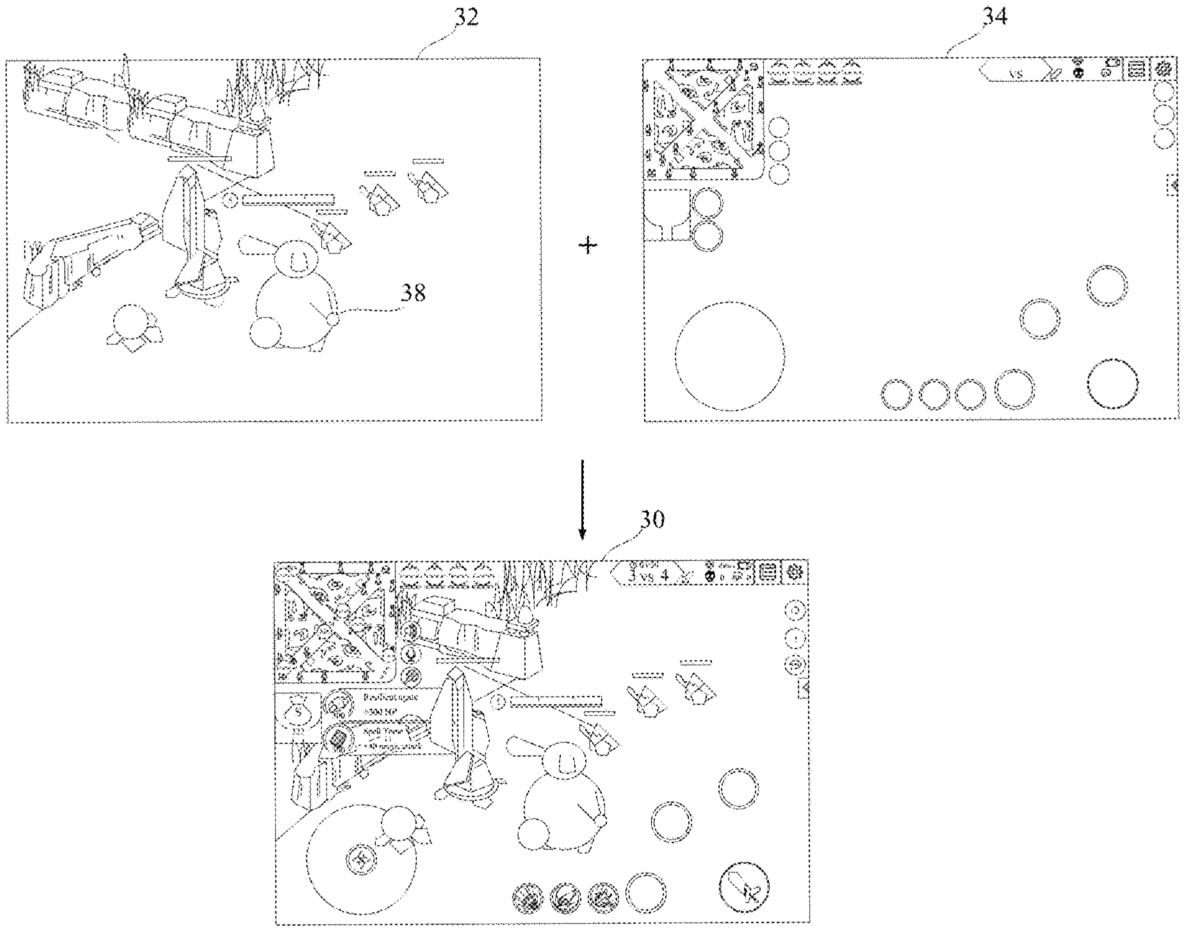
FIG. 4 is a schematic interface diagram of a schematic implementation of the method for transmitting prompt information in a multiplayer online battle program according to the embodiment in FIG. 3.

In an example, as shown in FIG. 4, the UI 30 of the multiplayer online battle program includes a virtual environment image 32 and an interaction panel region 34.

The virtual environment image 32 is an image of the virtual environment observed from a perspective corresponding to a master virtual character 38. The master virtual character is a virtual character controlled by a user using the terminal in the virtual environment. The perspective corresponding to the master virtual character may be any one of a first-person perspective, a 45° bird's-eye view, a third-person perspective, and an over-shoulder perspective of the master virtual character. An example uses the 45° bird's-eye view for description in this embodiment.

When the master virtual character 38 moves or rotates, the virtual environment image changes accordingly. The master virtual character 38 may appear in the virtual environment image or may not appear in the virtual environment image.

Figure 5:
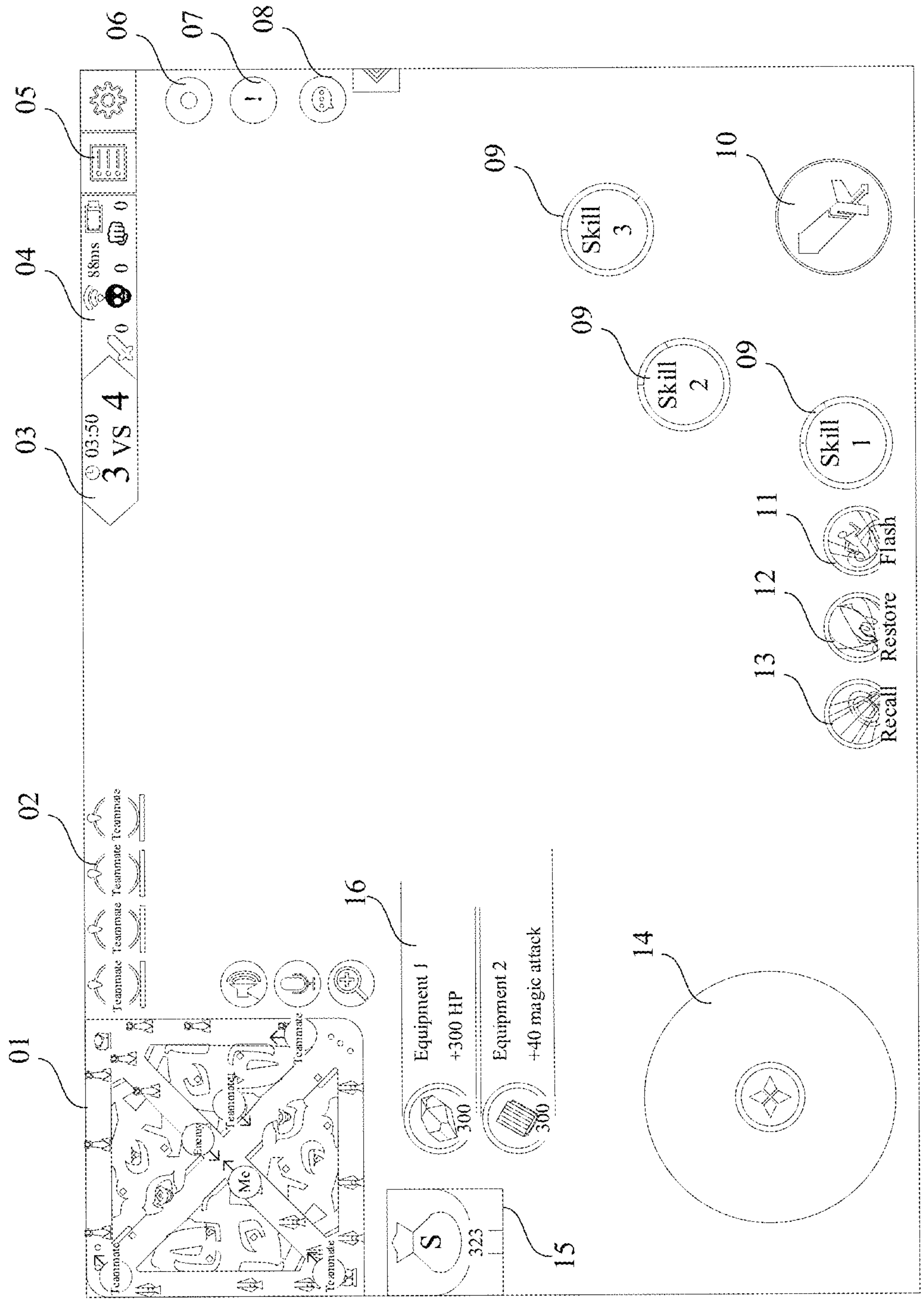
FIG. 5 is a schematic interface diagram of a head up display (HUD) region according to an exemplary embodiment of this application.

The interaction panel region 34 is a UI element superimposed on the virtual environment image 32. The interaction panel region 34 is divided into two types: information display elements used for displaying information and control function elements used for man-machine interaction. The interaction panel region 34 is also referred to as a HUD region. For example, as shown in FIG. 5, the HUD region 34 includes:

a minimap region 01, a friend information region 02, a scoreboard 03, a device information region and master virtual character score region 04, a menu region 05, a minimap region extension button 06, a control button 07, a chatting button 08, skill buttons 09 of the master virtual character, an attack skill button 10 of the master virtual character, a summoner ability 11, a restore skill 12, a recall skill 13, a moving control 14, a gold coin region 15, and recommended equipment 16.

The friend information region 02, the scoreboard 03, and the device information region and master virtual character score region 04 are the information display elements, and the other elements are the control function elements. The interaction panel region 34 may include other elements, such as a death panel, a turret-attacking button, and a creep-attacking button, which is not limited in the embodiments.

After a user starts a round of battle, the UI of the multiplayer online battle program is displayed.

Step 302. Receive a directional operation on the UI, the directional operation being an operation for activating a prompt information transmission function and pointing to a target display element in the UI.

When the user needs to transmit prompt information, the user applies the directional operation on the UI. The directional operation may be a user operation, or may be an operation combination formed by two or more user operations.

The directional operation is an operation for activating a prompt information transmission function and pointing to a target display element in the UI. The target display element is one of a plurality of display elements in the UI. In an example, the directional operation may be an operation of a double-tap, a triple-tap, or a long-pressing on the target display element. In another example, the interaction panel region includes a signal control. The directional operation is an operation pointing from the signal control to a target display element in the UI. The signal control is a control for activating the prompt information transmission function.

The plurality of display elements in the UI include, but are not limited to, at least one of the following elements.

1. Three-dimensional models forming battle function elements (non-decorative elements and non-visual presentation elements) in the virtual environment.

For example, the battle function elements are elements that influence the battle process in the virtual environment. The three-dimensional models include, but are not limited to: virtual characters, turrets, bases, monsters, grass, detection eyes, a big dragon, a small dragon, and the like.

2. The information display elements in the interaction panel region.

For example, the information display elements include: the friend information region 02, the scoreboard 03, the device information region and master virtual character score region 04, and the death panel not shown in FIG. 5.

3. The control function elements in the interaction panel region.

For example, the control function elements include: the minimap region 01, the minimap extension button 06, the button control 07, the chatting control 08, the skill buttons 09 of the master virtual character, the attack skill button 10 of the master virtual character, the summoner ability 11, the moving control 14, the gold coin region 15, and the recommended equipment 16.

For example, the control function elements further include a fast signal button. The fast signal button includes, but is not limited to an attack button, a retreat button, and an assembly button (not shown in FIG. 5).

Step 303. Predict target prompt information according to the target display element and battle information.

The target display element is a display element selected by the directional operation. The battle information is battle situation information during a round of battle. The battle information includes, but is not limited to the following: a started duration of this round of battle, levels of virtual characters, skill upgrade information, skill cooldown information, summoner ability types, health points (HP) of the virtual characters, HP of turrets, a position relationship between the virtual characters and grass, creep line situations, monsters refresh situations, network information, teammate positions, enemies positions, kill information, death information, date information, festival information, location information, matches information, and camp names of camps.

For example, the prompt information is information for performing an information prompt for the teammates, the enemies, or all the virtual characters. A form of the prompt information includes, but is not limited to at least one of text, voices, icons, animation, and vibration feedback. In an example, the prompt information includes information of two types: fact information and intention information. The fact information is information representing existing facts in a current battle, for example, a monster is refreshed, a turret is being attacked, I see an enemy, and the like. The intention information is information representing a strategy intention of the user, for example, pay attention to pushing the creep line on the top lane, beware of ambush in the grass, the economy is so poor and we need to grow, and the like.

Step 304. Transmit the predicted target prompt information to clients of teammate virtual characters of a master virtual character or all virtual characters in a battle.

In an example, one or more virtual characters in a battle of the multiplayer online battle program are determined for receiving the predicted target prompt information and the predicted target prompt information is transmitted to clients of teammate virtual characters (the master virtual character itself is included optionally) of the master virtual character. In another example, the predicted target prompt information is transmitted to clients all virtual characters in a battle. In another example, the target prompt information may be also transmitted to a coach client, a referee client, or an audience client who view this battle.

In an example, the client transmits a frame synchronization signal to a server, the frame synchronization signal carrying the target prompt information. The server transmits the frame synchronization signal to other clients corresponding to the teammate virtual characters (the master virtual character itself is included optionally) of the master virtual character. Alternatively, the server transmits the frame synchronization signal to other clients of all the virtual characters in the battle. The other clients display or play the target prompt information according to the frame synchronization signal.

In conclusion, according to the method provided in this embodiment, when a directional operation is received, target prompt information expected to be transmitted is predicted according to a target display element and battle information, and the target prompt information is transmitted to clients of teammate virtual characters of a master virtual character or all virtual characters in a battle. Therefore, a user may transmit prompt information that satisfies the user's expectation at the minimal man-machine interaction cost. A multiplayer online battle program intelligently determines and selects a signal that the user wants to transmit in a current battle scenario based on a thought expressed by the user and the battle information, thereby improving the man-machine interaction efficiency in information communication between the user and other users.

Triggering of the directional operation may be implemented in at least one of the following manners.

1. Triggered by a long press.

The directional operation is triggered in a "long press a signal control+tap a target display element" manner.

2. Triggered by a drag.

The directional operation is triggered in a "slide operation" manner.

3. Triggered by a point touch on a minimap.

The directional operation is triggered by using a tap operation on the minimap.

4. Triggered by a combo.

The directional operation is triggered by "double-tapping" or "triple-tapping" the target display element.

For the first manner: the long press triggering manner, reference is made to the following embodiment.

Figure 6:
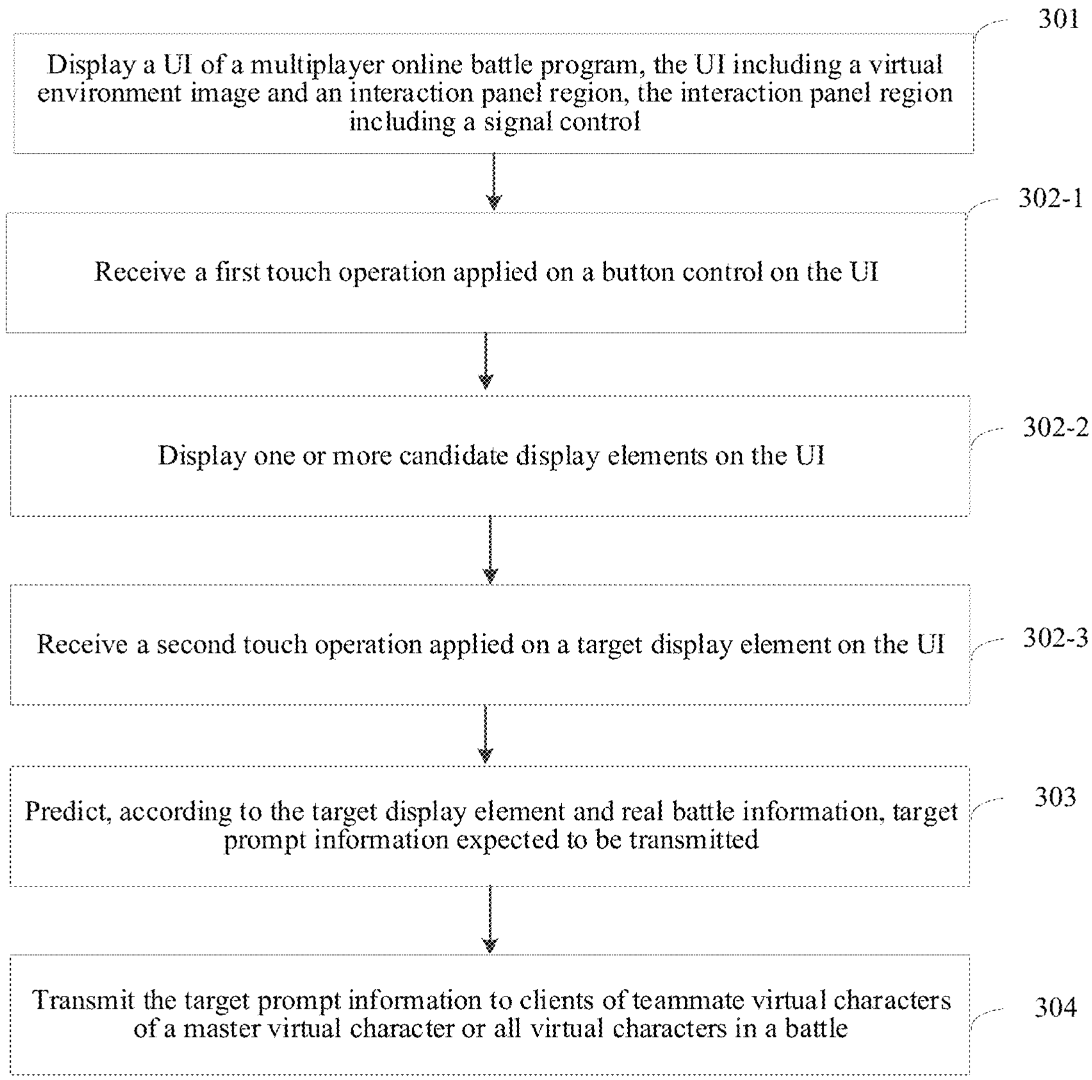
FIG. 6 is a flowchart of a method for transmitting prompt information in a multiplayer online battle program according to an exemplary embodiment of this application.

FIG. 6 is a flowchart of a method for transmitting prompt information in a multiplayer online battle program according to an exemplary embodiment of this application. The method may be performed by any terminal in FIG. 1. An example in which an interaction panel region includes a button control as a signal control (a signal button for short) is used for description, and the foregoing step 302 may be implemented into the following steps.

Step 302-1. Receive a first touch operation applied on the button control on a UI.

The first touch operation is a tap operation or a long press operation, and an example in which the first touch operation is the long press operation is used for description in this embodiment.

When a user expects to transmit prompt information, the user long presses the signal button.

Step 302-2. Display one or more candidate display elements on the UI.

The candidate display elements are display elements that support further triggering of a subsequent directional operation based on the first touch operation among the plurality of display elements displayed on the UI, that is, are display elements that can continuously trigger a prompt information transmission on the UI.

In an example, display manners of the one or more candidate display elements displayed on the UI remain unchanged. In another example, the one or more candidate display elements are displayed on the UI in a highlight manner, the highlight manner including at least one of the following display manners: a target color display manner, an overlay masking display manner, a highlight display manner, and a contour display manner.

For example, the display elements that can trigger a prompt information transmission in a HUD region are highlighted and contoured for display in the UI.

Step 302-3. Receive a second touch operation applied on the target display element in the candidate display elements on the UI.

The second touch operation is a tap operation, a double-tap operation, a combo operation, or a long press operation, and an example in which the second touch operation is the tap operation is used for description in this embodiment.

Figure 7:
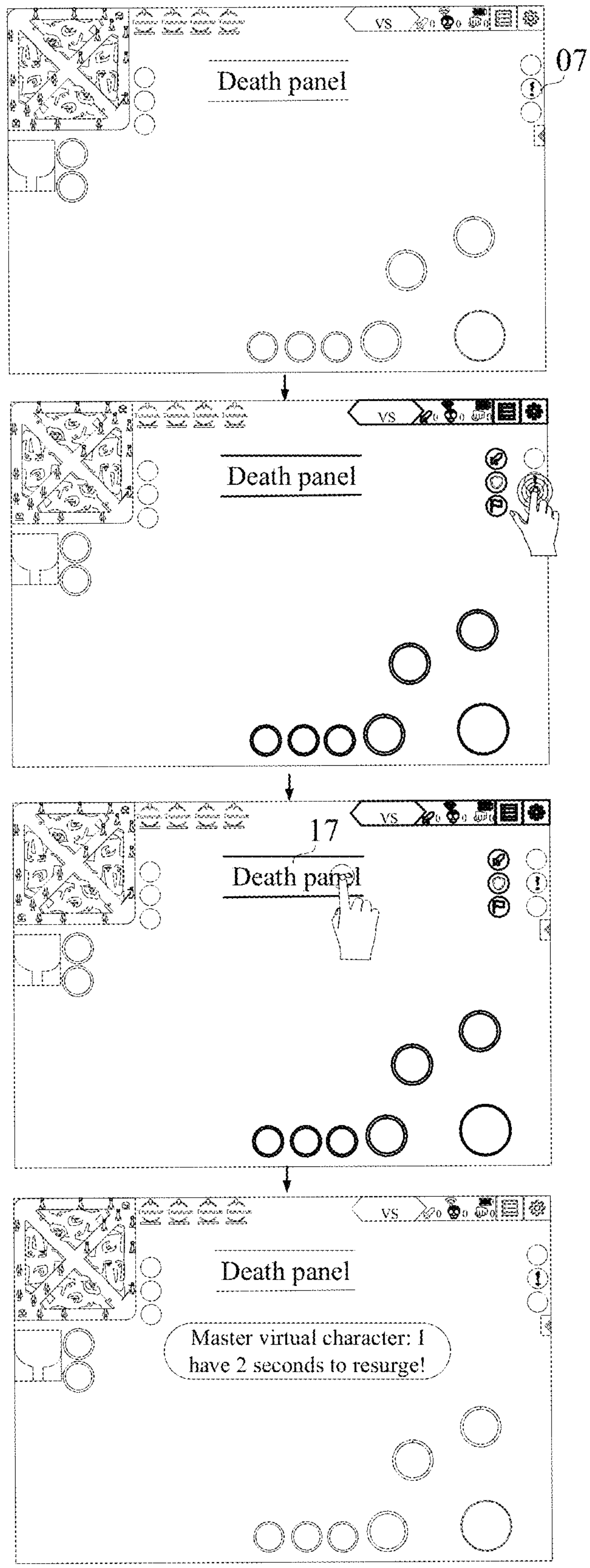
FIG. 7 is a schematic interface diagram of a schematic implementation of the method for transmitting prompt information in a multiplayer online battle program according to the embodiment in FIG. 6.

For example, referring to FIG. 7, when the prompt information needs to be transmitted, the user first long presses a signal button 07, and then each display element that can trigger a prompt information transmission in the HUD region, is displayed in bold. The user may select a death panel 17 as the target display element, that is, the user may tap the death panel 17. After determining the death panel 17 as the target display element, the multiplayer online battle program obtains battle information of "There are 2 seconds left before the master virtual character control by the user itself resurges" to generate target prompt information of "Master virtual character: I have 2 seconds to resurge", and transmits the target prompt information to teammates in a form of a chat message.

In conclusion, according to the method provided in this embodiment, the directional operation is triggered by using two touch operations. Original interaction design manners such as a point touch operation and a skill button are the same, and therefore, learning cost of the user can be reduced. A cognition threshold is low and an operation is simple, and it is easy for basic and normal-end users to learn and use.

For the second manner: the drag triggering manner, reference is made to the following embodiment.

Figure 8:
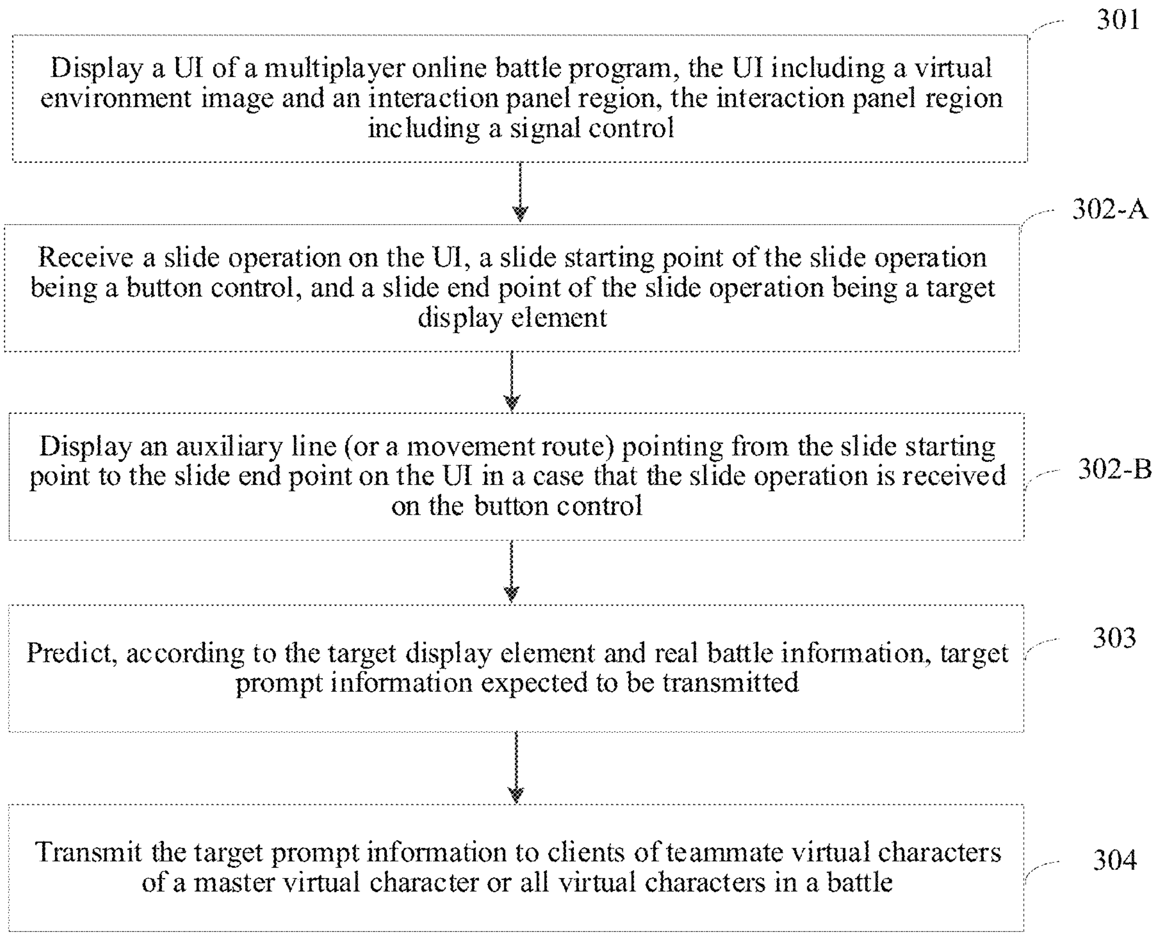
FIG. 8 is a flowchart of a method for transmitting prompt information in a multiplayer online battle program according to an exemplary embodiment of this application.

FIG. 8 is a flowchart of a method for transmitting prompt information in a multiplayer online battle program according to an exemplary embodiment of this application. The method may be performed by any terminal in FIG. 1. An example in which a HUD region includes a button control as a signal control (a signal button for short) is used for description, and the foregoing step 302 may be implemented into the following steps.

Step 302-A. Receive a slide operation on a UI, a slide starting point of the slide operation being the button control, and a slide end point of the slide operation being a target display element.

When a user expects to transmit prompt information, the user slides (or drags) from the signal button and releases the touch after sliding to the target display element.

Step 302-B. Display an auxiliary line (or a movement route) pointing from the slide starting point to the slide end point on the UI when the slide operation is received on the button control.

To display feedback on the slide operation of the user, as an optional step, the multiplayer online battle program displays the auxiliary line (or the movement route) pointing from the slide starting point to the slide end point on the UI when the slide operation is received on the button control.

For example, the auxiliary line is a ray pointing from the button control to the slide end point. The movement route is a ray or a curve formed by following a sliding track of a touched object.

For example, after the slide operation is received, a preset range around the button control shows additional displays: an attack button, a retreat button, and an assembly button. If the slide end point of the slide operation is the attack button, prompt information of "launch an attack" is transmitted rapidly. If the slide end point of the slide operation is the retreat button, prompt information of "start a retreat" is transmitted rapidly. If the slide end point of the slide operation is the assembly button, prompt information of "request to assemble" is transmitted rapidly.

Figure 9:
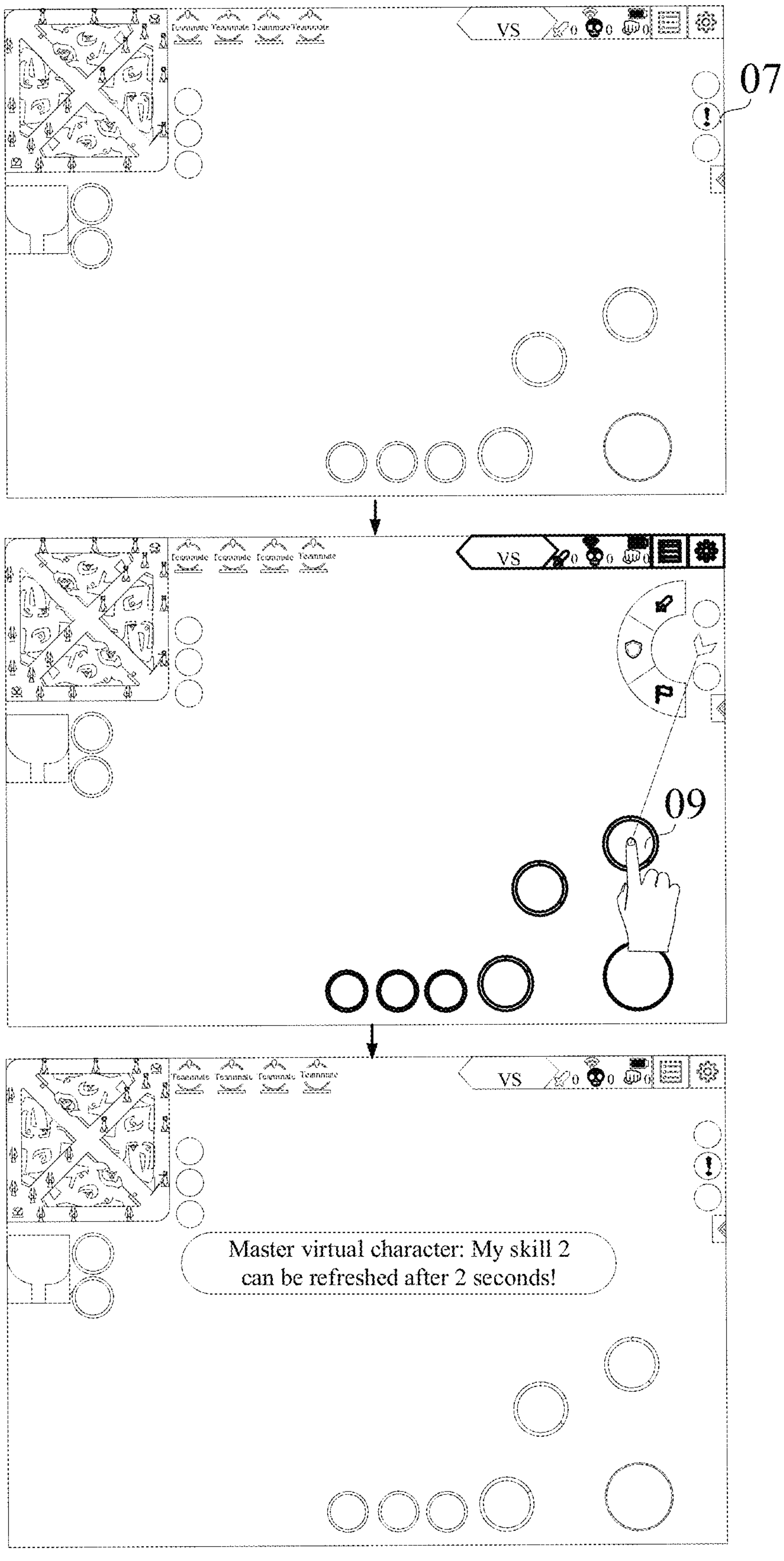
FIG. 9 is a schematic interface diagram of a schematic implementation of the method for transmitting prompt information in a multiplayer online battle program according to the embodiment in FIG. 8.

For example, referring to FIG. 9, when the prompt information needs to be transmitted, the user first long presses a signal button 07, and then each display element that can trigger a prompt information transmission, in the HUD region, is displayed in bold. The user may select a skill button 09 of a master virtual character as the target display element, that is, the user may trigger a slide operation from the signal button 07 to the skill button 09 of the master virtual character. After the slide operation is received by the signal button 07, an auxiliary line from the signal button 07 to the skill button 09 of the master virtual character may be displayed on the UI. After determining the skill button 09 of the master virtual character as the target display element, the multiplayer online battle program obtains battle information of "a skill 2 of the master virtual character controlled by the user itself has 2 seconds left to refresh" to generate target prompt information of "Master virtual character: My skill 2 can be refreshed after 2 seconds", and transmits the target prompt information to teammates in a form of a chat message.

In conclusion, according to the method provided in this embodiment, a directional operation is triggered by using a slide operation. In a fierce battle, a drag-type slide operation may shorten a time required for the operation in a case of high proficiency and a fast hand speed, and therefore, communication efficiency of high-end users is improved. In addition, when the user releases the touch, the button control, the auxiliary line, and the three additionally displayed rapid signal buttons related to the drag-type slide operation may all restore and may not block the vision, and may get back to the fierce battle operation faster than the point touch operation does.

For the third manner: the point touch triggering manner based on a minimap, reference is made to the following embodiment.

Figure 10:
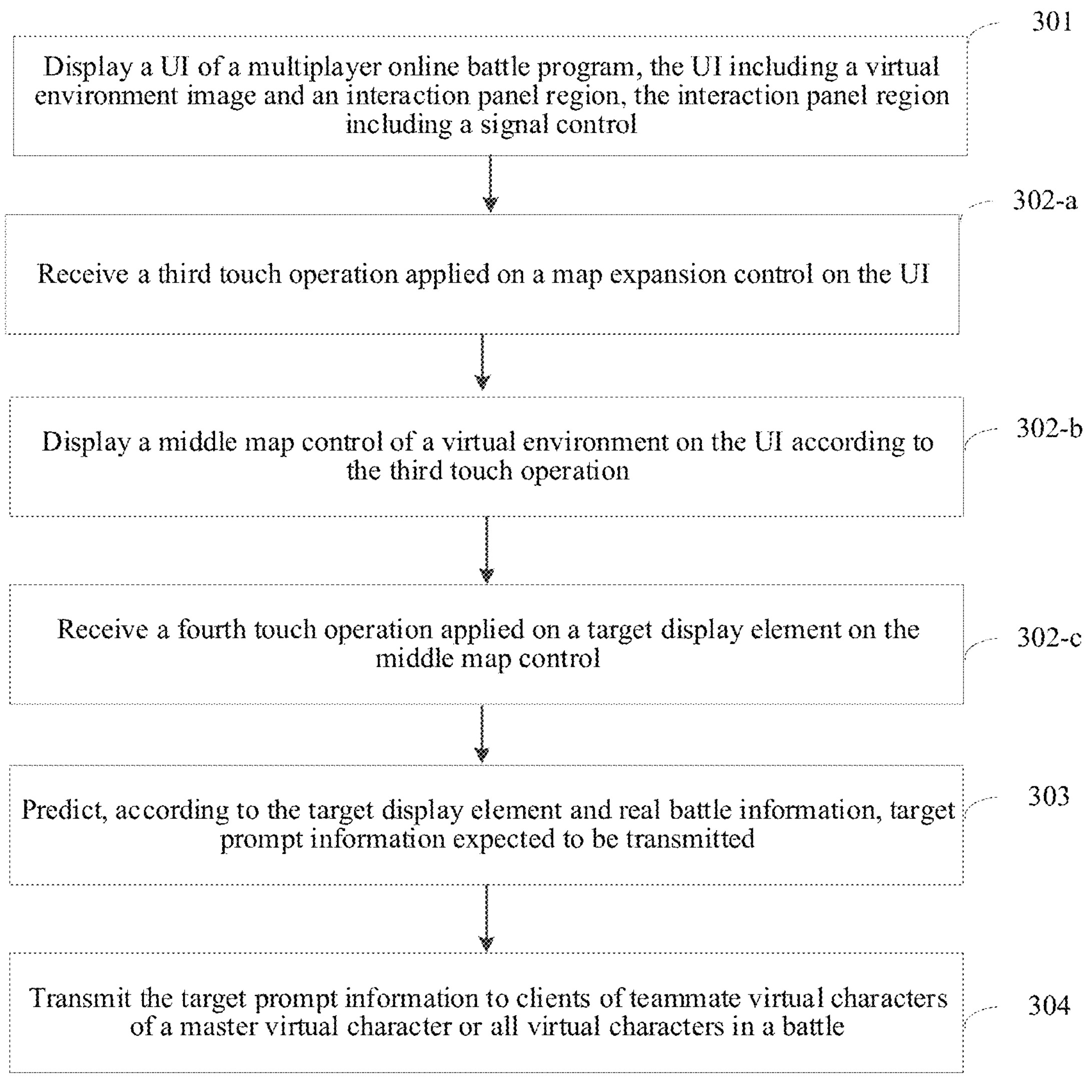
FIG. 10 is a flowchart of a method for transmitting prompt information in a multiplayer online battle program according to an exemplary embodiment of this application.

FIG. 10 is a flowchart of a method for transmitting prompt information in a multiplayer online battle program according to an exemplary embodiment of this application. The method may be performed by any terminal in FIG. 1. An example in which a HUD region includes a map expansion control (also referred to as a minimap button) as a signal control is used for description, and the foregoing step 302 may be implemented into the following steps.

Step 302-*a*. Receive a third touch operation applied on the map expansion control on a UI.

The third touch operation may be a tap operation, a double-tap operation, a combo operation, or a long press operation, and an example in which the third touch operation is the tap operation is used for description in this embodiment.

When a user expects to transmit prompt information, the user taps the map expansion control.

Step 302-*b*. Display a map viewing control of a virtual environment on the UI according to the third touch operation.

The map viewing control is a control for viewing the map of the virtual environment from a God's perspective by using a control with a target area size. The target area size is greater than an area size of the minimap. The map viewing control is also referred to as a middle map control.

In some embodiments, display elements that may be triggered are displayed in a highlight manner on the map viewing control. For example, the map viewing control displays at least one of the following display elements: a top lane, a middle lane, a bottom lane, turrets, monster points, a big dragon point, and a small dragon point. The big dragon point and the small dragon point may be considered as monster points that can provide team gains.

Step 302-*c*. Receive a fourth touch operation applied on a target display element on the map viewing control.

The fourth touch operation may be a tap operation, a double-tap operation, a combo operation, or a long press operation, and an example in which the fourth touch operation is the tap operation is used for description in this embodiment.

Figure 11:
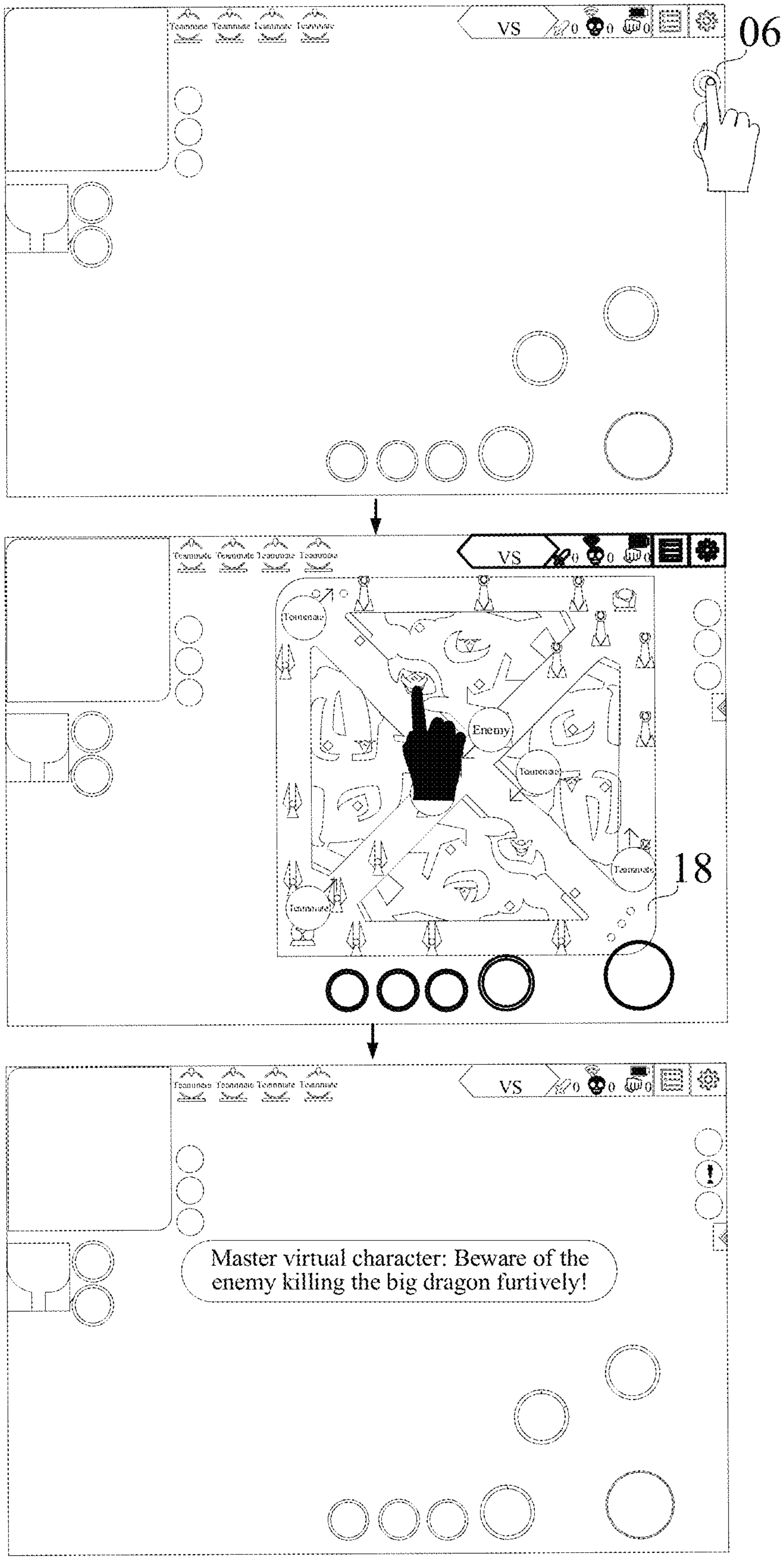
FIG. 11 is a schematic interface diagram of a schematic implementation of the method for transmitting prompt information in a multiplayer online battle program according to the embodiment in FIG. 10.

For example, referring to FIG. 11, when the prompt information needs to be transmitted, a user first taps a minimap button 06, and the multiplayer online battle program displays the map viewing control (the middle map control) 18 on the UI in an overlay manner, the map viewing control 18 displaying the top lane, the middle lane, the bottom lane, the turrets, the monster points, the big dragon point, and the small dragon point. The user may tap to select the big dragon point as the target display element on the map viewing control 18. After determining the big dragon point as the target display element, the multiplayer online battle program obtains battle information of "The big dragon has been refreshed for 2 seconds" to generate target prompt information of "Master virtual character: Beware of the enemy killing the big dragon furtively", and transmits the target prompt information to teammates in a form of a chat message.

In conclusion, according to the method provided in this embodiment, a directional operation is triggered based on the map viewing control. Display elements located outside the vision range of a virtual environment image can be selected, and therefore, the target display element may be not only selected within the vision range, and all display elements on the map, especially relatively large or macro display elements (such as the top lane, the middle lane, and the bottom lane) may be selected rapidly, thereby improving applicability and functionality of the foregoing method for transmitting prompt information.

For any one of the first manner to the third manner, with reference to FIG. 5, when a user controls a virtual character, the user usually controls the virtual character to move by using the left thumb, and controls the virtual character to release skills by using the right thumb. Most users continuously press a moving control (also referred to as a left hand wheel) with the left thumbs and press button controls by using intermittent touch operations with the right thumbs. Therefore, in order not to interrupt continuous operations of the left thumbs of the users, the moving control 14 and the signal button 07 are located at two marginal regions far away from each other on the UI. For example, the moving control 14 is located at a left side marginal region of the UI, and the signal button 07 is located at a right side marginal region of the UI.

Similarly, the moving control 14 and the map expansion control 06 are also located at two marginal regions far away from each other on the UI. For example, the moving control 14 is located at the left side marginal region of the UI, and the map expansion control 06 is located at a right side marginal region of the UI.

For the fourth manner: the combo triggering manner, reference is made to the following embodiment.

Figure 12:
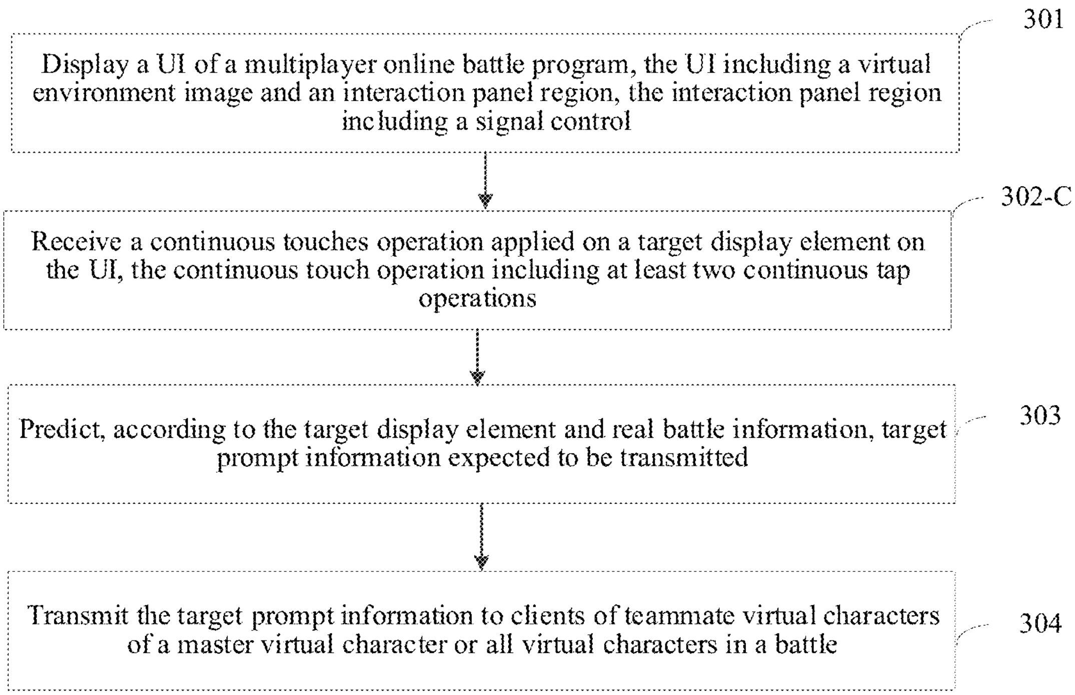
FIG. 12 is a flowchart of a method for transmitting prompt information in a multiplayer online battle program according to an exemplary embodiment of this application.

FIG. 12 is a flowchart of a method for transmitting prompt information in a multiplayer online battle program according to an exemplary embodiment of this application. The method may be performed by any terminal in FIG. 1. An example in which a HUD region includes a map expansion control (also referred to as a minimap button) as a signal control is used for description, and the foregoing step 302 may be implemented into the following steps.

Step 302-C. Receive a continuous touches operation applied on a target display element on a UI, the continuous touches operation including at least two continuous tap operations.

The continuous touches operation may be a double-tap operation, a triple-tap operation, or an operation of more taps, and an example in which the continuous touches operation is the double-tap operation is used for description in this embodiment.

When a user expects to transmit prompt information, the user double-taps the target display element on the UI.

Figure 13:
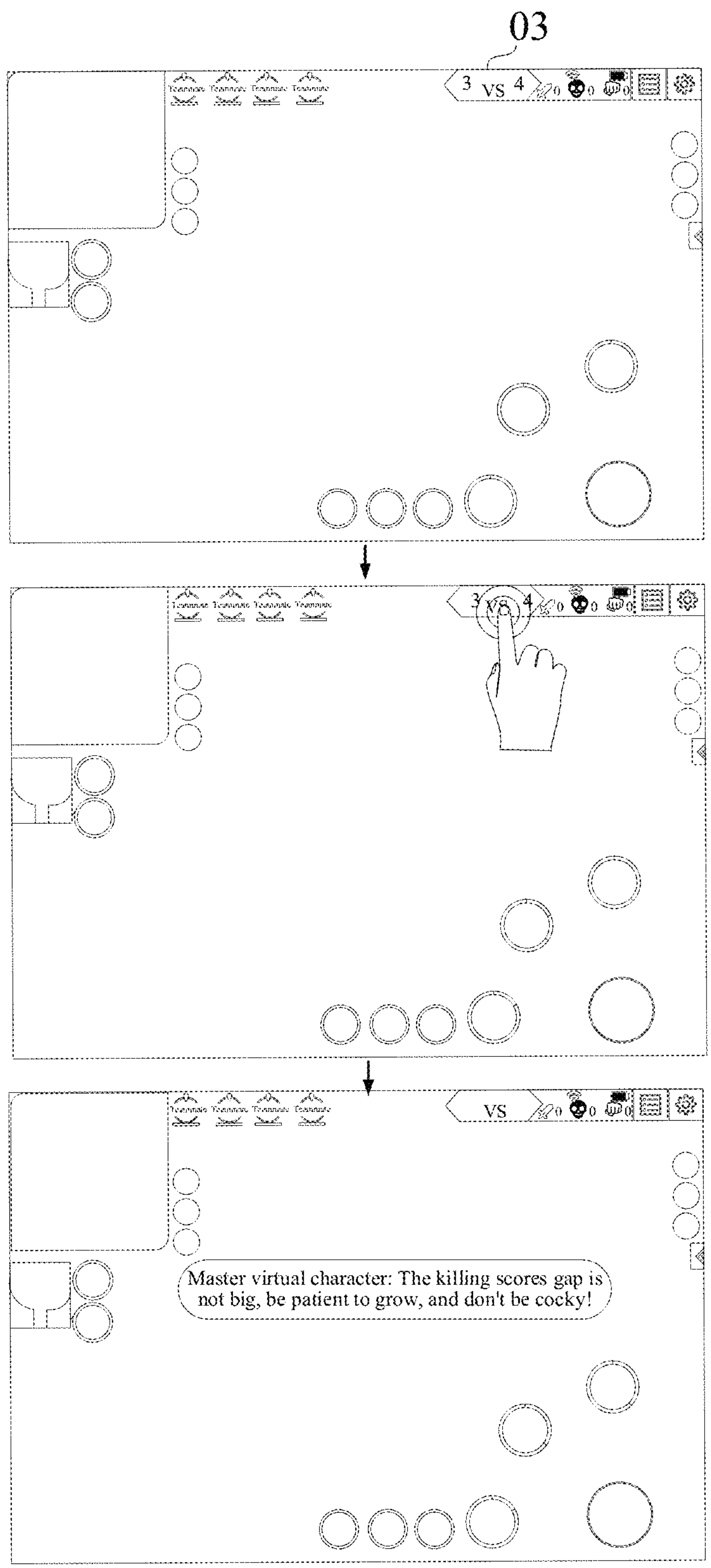
FIG. 13 is a schematic interface diagram of a schematic implementation of the method for transmitting prompt information in a multiplayer online battle program according to the embodiment in FIG. 12.

For example, referring to FIG. 13, when the prompt information needs to be transmitted, the user double-taps a scoreboard 03. After determining the scoreboard 03 as the target display element, the multiplayer online battle program obtains battle information of "A killing scores ratio is 3:4" to generate target prompt information of "Master virtual character: The killing scores gap is not big, be patient to grow, and don't be cocky", and transmits the target prompt information to teammates in a form of a chat message.

Figure 14:
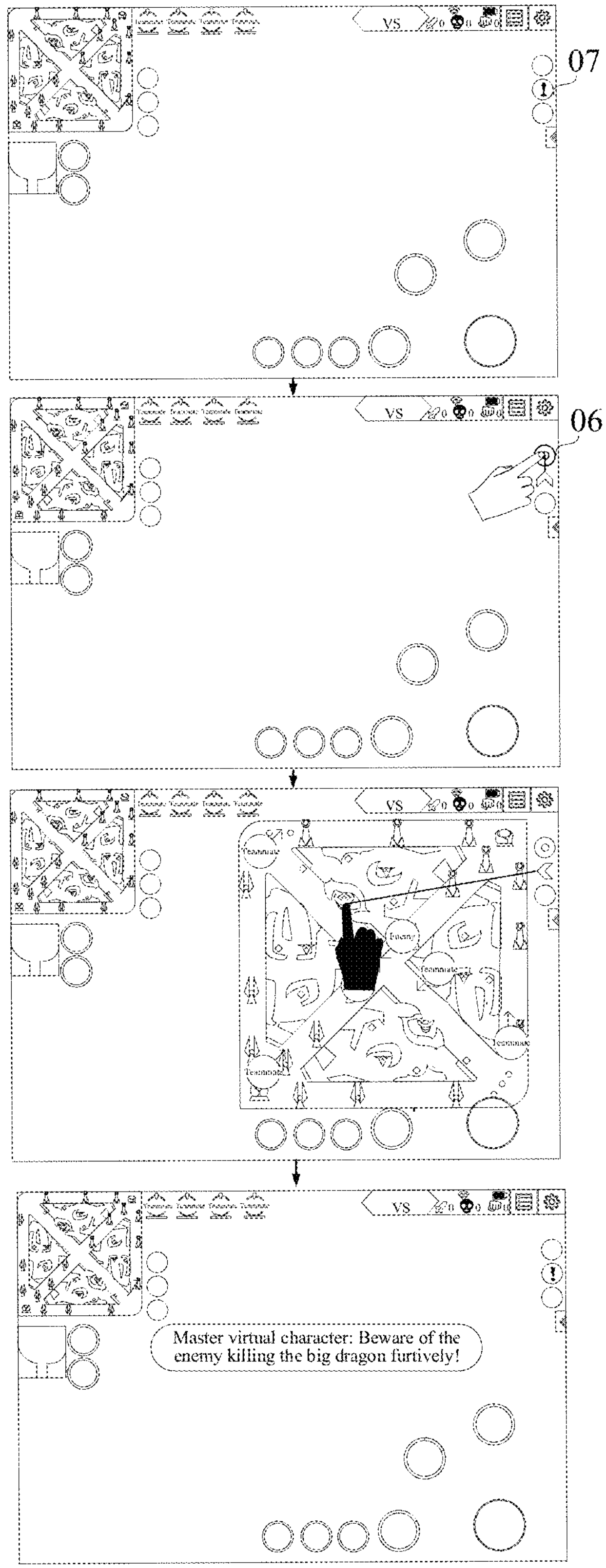
FIG. 14 is a schematic interface diagram of a schematic implementation of a method for transmitting prompt information in a multiplayer online battle program according to an exemplary embodiment of this application.

This embodiment of this application does not limit the triggering manners of the directional operation, and the foregoing triggering manners may be also combined into a new embodiment freely. For example, the drag triggering manner is combined with the minimap triggering manner, and as shown in FIG. 14, when a user needs to transmit prompt information, the user first slides from the signal button 07 to the map expansion control 06, where a map viewing control is displayed after the map expansion control 06 is triggered, and then slides (slides continuously without interruptions) to a big dragon position in the map viewing control. The multiplayer online battle program determines that the big dragon is a target display element, and transmits target prompt information of "Beware of the enemy killing the big dragon furtively" with reference to current battle situation information.

In some embodiments based on the foregoing embodiments, the prediction process of the "target prompt information" is implemented by using a behavior tree. The behavior tree includes a correspondence between display elements, battle information, and prompt information. For example, the behavior tree stores the correspondence between the display elements, the battle information, and the prompt information by using a tree structure. The multiplayer online battle program queries, according to a target display element and battle information, the behavior tree for target prompt information expected to be transmitted. Different target display elements are described respectively in the following.

For example, there is one or more behavior trees. The querying, according to a target display element and battle information, the behavior tree for target prompt information expected to be transmitted may be implemented in forms including but not limited to the following.

1. The target display element includes skill class display elements, the battle information includes a skill availability status.

The skill class display elements are controls for performing skills. In some embodiments, there may be one or more skill class display elements disposed on an interaction panel region, for example, hero skills, a summoner ability, and a skill obtained temporarily and having a valid duration.

In a case that the target display element is the skill class display element and a skill availability status corresponding to the target display element is unavailable, first target prompt information used for indicating that a skill is unavailable (disabled or cooled down) is determined.

In a case that the target display element is the skill class display element and a skill availability status corresponding to the target display element is available, second target prompt information used for indicating that a skill is available is determined.

2. The target display element includes skill class display elements, and the battle information includes a skill CD time.

In a case that the target display element is the skill class display element and a skill CD time corresponding to the target display element is valid, third target prompt information used for indicating the skill CD time is determined.

3. The target display element includes resource class display elements, and the battle information includes vision information of the resource class display element.

The resource class display elements are display elements configured for providing gold coin resources, blood volume resources, magic resources, and BUFF resources. In some embodiments, there may be one or more resource class display elements disposed in a virtual world, for example, monster points, a big dragon point, a small dragon point, and a bone dragon point.

In a case that the target display element is the resource class display element and the vision information corresponding to the target display element has vision of an enemy, fourth target prompt information used for indicating that the enemy is obtaining the resource is determined.

4. The target display element includes resource class display elements, and the battle information includes refresh information of the resource class display element.

The resource class display elements may be one-time or may be refreshed for a plurality of times. For example, after a group of monsters in the monster point is killed, a new group of monsters are refreshed automatically after waiting for a duration.

In a case that the target display element is the resource class display element and the refresh information is valid, fifth target prompt information used for indicating a remaining refresh time of the resource class display element is determined.

5. The target display element includes virtual character class display elements, and the battle information includes a state of the virtual character class display element.

The virtual character class display elements are virtual characters controlled by users, including virtual characters of the user's own side (the user's own camp) and virtual characters of the enemy side (the opposing camp or the enemy camp). In some embodiments, there may be one or virtual character class display elements disposed in the virtual world.

In a case that the target display element is the virtual character class display element and the state of the target display element is a first designated state, sixth target prompt information used for indicating that the virtual character class display element is in the first designated state is determined.

The state includes at least one of a blood volume state, a magic state, a recall state, a moving state, an attack state, an attacked state, an equipment state, a level state, and an external wearing state.

6. The target display element includes construction class display elements, and the battle information includes a state of the construction class display element.

The construction class display elements are constructions three-dimensional models fixed still in the map. In some embodiments, there may be one or more construction class display elements disposed in the virtual world, for example, turrets, a base defense, or constructions summoned by hero's skills.

In a case that the target display element is the construction class display element and the state of the target display element is a second designated state, seventh target prompt information used for indicating that the construction class display element is in the second designated state is determined.

7. The target display element includes a network information display element, and the battle information includes network speed information.

The network information display element is a display element used for indicating current network speed information of a terminal, and is usually disposed on the interaction panel region.

In a case that the target display element is the network information display element and a network speed of the network speed information is less than a first threshold, eighth target prompt information used for indicating a network speed state is determined.

8. The target display element includes a hardware performance display element, and the battle information includes a hardware working performance parameter.

The hardware performance display element is a display element used for indicating current hardware performance (CPU or frame rate) of the terminal, and is usually disposed on the interaction panel region.

In a case that the target display element is the hardware performance display element and the hardware working performance parameter is less than a second threshold, ninth target prompt information used for indicating a network speed state is determined.

9. The target display element includes a prompt information display element, and the battle information includes message content in the prompt information display element.

The prompt information display element is a display element used for displaying prompt information transmitted by others (or may be the user itself), for example, a dialog box.

In a case that the target display element is the prompt information display element, tenth target prompt information used for automatically replying to the message content is provided.

Target display element: a skill A of a master virtual character.

Figure 15:
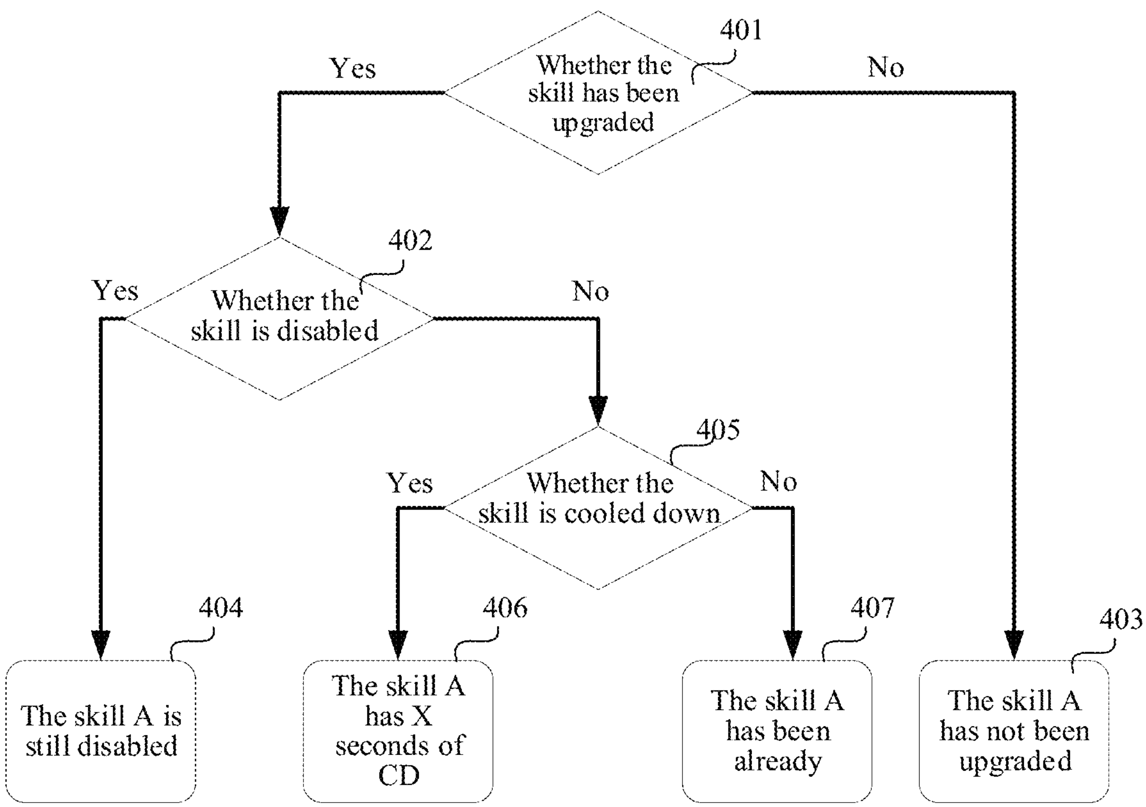
FIG. 15 is a flowchart of a behavior tree according to another exemplary embodiment of this application.

The master virtual character has a plurality of skills, for example, has three skills or four skills, and the skill A is one of the plurality of skills. When the target display element is the skill A of the master virtual character, referring to FIG. 15, the foregoing step 303 may be implemented into the following steps.

Step 401. Determine whether the skill A has been upgraded (for at least one level).

Upgrade means that after an experience value of the master virtual character reaches a threshold value, the skill A is obtained (or the skill A of a higher level).

Step 402 is performed when the skill A has been upgraded. Step 403 is performed when the skill A has not been upgraded.

Step 402. Determine whether the skill A is disabled.

Step 404 is performed when the skill A is disabled. Step 405 is performed when the skill A is not disabled.

Step 403. Determine the target prompt information as "the skill A has not been upgraded".

Step 404. Determine the target prompt information as "the skill A is disabled".

Step 405. Determine whether the skill A is cooled down.

Step 406 is performed when the skill A is in a cooled-down state. Step 407 is performed when the skill A is in an available state.

Step 406. Determine the target prompt information as "the skill A has X seconds of CD".

For example, X is a variable and is determined by the multiplayer online battle program according to a count number in a cooldown timer of the skill A Step 407. Determine the target prompt information as "the skill A has been ready".

Figure 16:
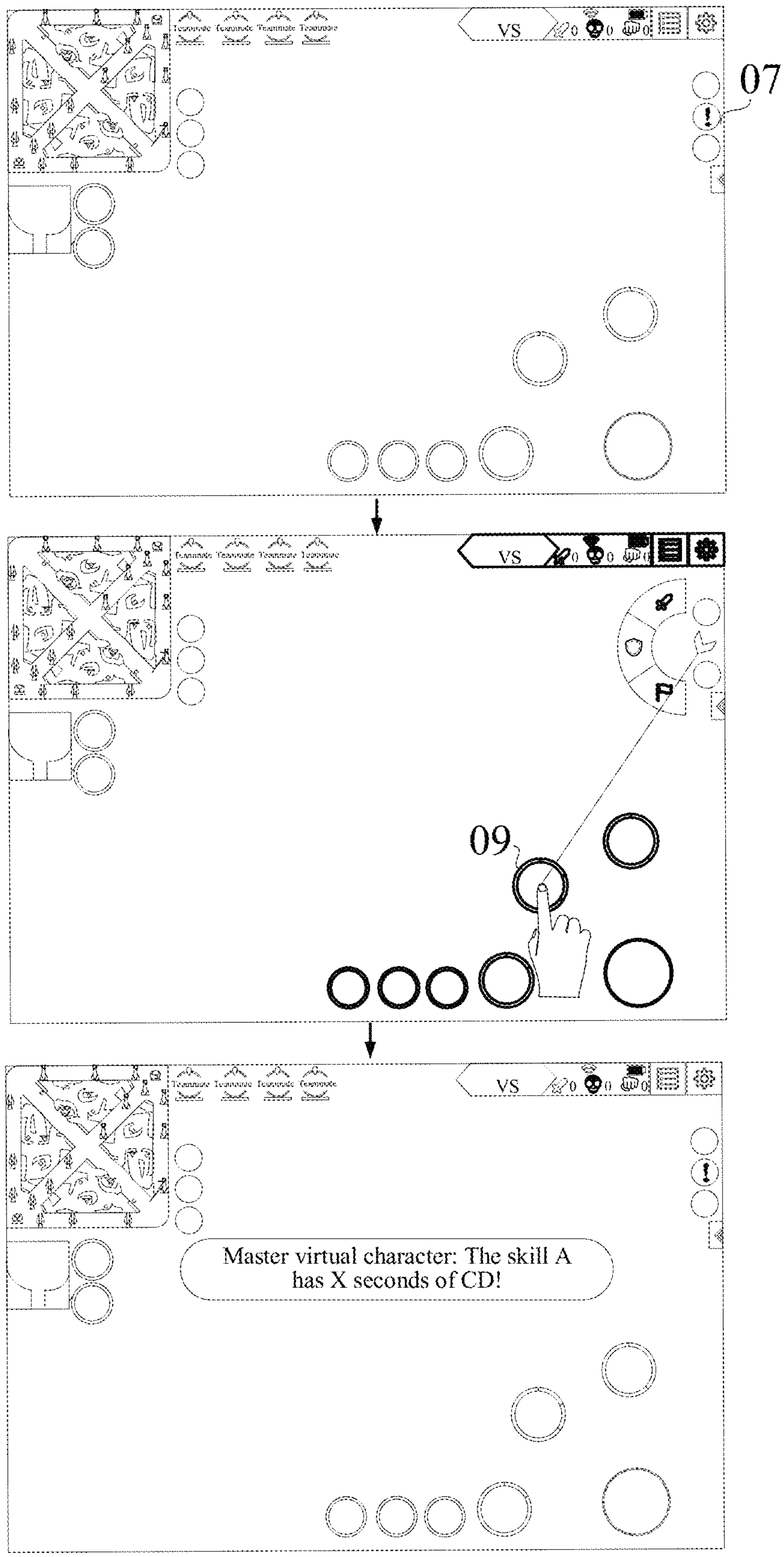
FIG. 16 is a schematic interface diagram of implementing the behavior tree according to the exemplary embodiment shown in FIG. 15.

For example, as shown in FIG. 16, a user applies a slide operation on a UI, a slide starting point of the slide operation being a signal button, and a slide end point of the slide operation being a skill button of the skill A. The multiplayer online battle program determines the target prompt information as "the skill A has X seconds of CD" with reference to current battle information.

Target display element: a summoner ability B.

Figure 17:
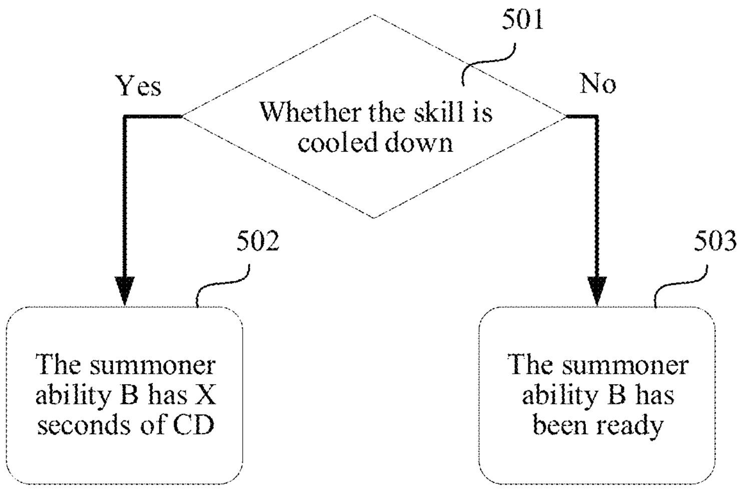
FIG. 17 is a flowchart of a behavior tree according to another exemplary embodiment of this application.

A master virtual character may select to carry a summoner ability B before the game starts, for example, a flash ability. The summoner ability B is one of a plurality of summoner abilities. For example, the summoner abilities include: Heal, Sprint, Smite, Shut, Anger of, Provoke, Daze, Purify, Cripple, and Flash. When the target display element is the summoner ability B, referring to FIG. 17, the foregoing step 303 may be implemented into the following steps.

Step 501. Determine whether the summoner ability B is cooled down.

Step 502 is performed when the skill A is in a cooled-down state. Step 503 is performed when the skill A is in an available state.

Step 502. Determine the target prompt information as "the summoner ability B has X seconds of CD".

Step 503. Determine the target prompt information as "the summoner ability B has been ready".

Figure 18:
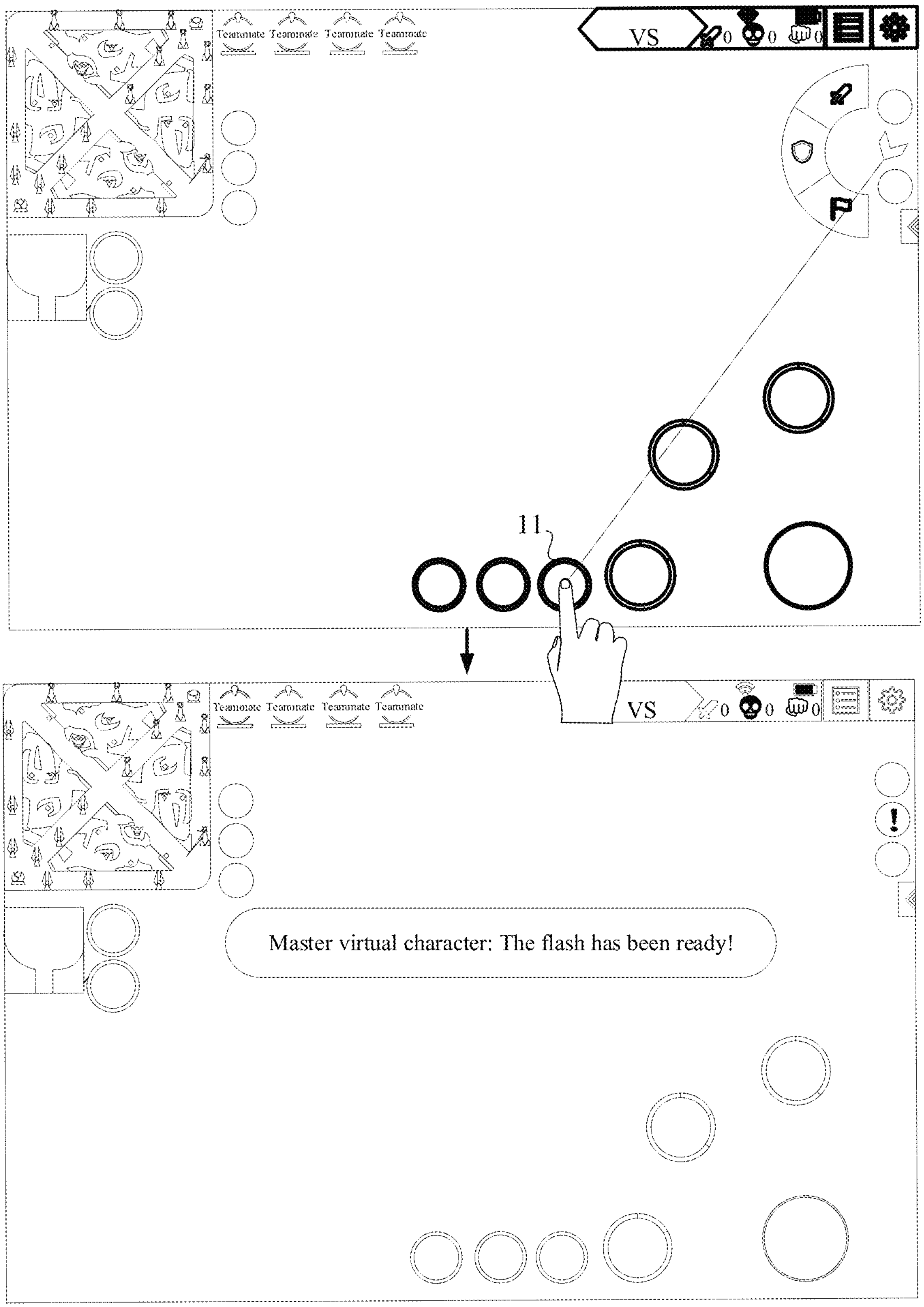
FIG. 18 is a schematic interface diagram of implementing the behavior tree according to the exemplary embodiment shown in FIG. 17.

For example, as shown in FIG. 18, an example in which the summoner ability B is "flash" is used. A user applies a slide operation on a UI, a slide starting point of the slide operation being a signal button, and a slide end point of the slide operation being an ability button 11 of the summoner ability "flash". The multiplayer online battle program determines the target prompt information as "The flash has been ready with reference to current battle information. The flash is an operation manner of teleporting a short distance.

Target display element: a restore spell.

Figure 19:
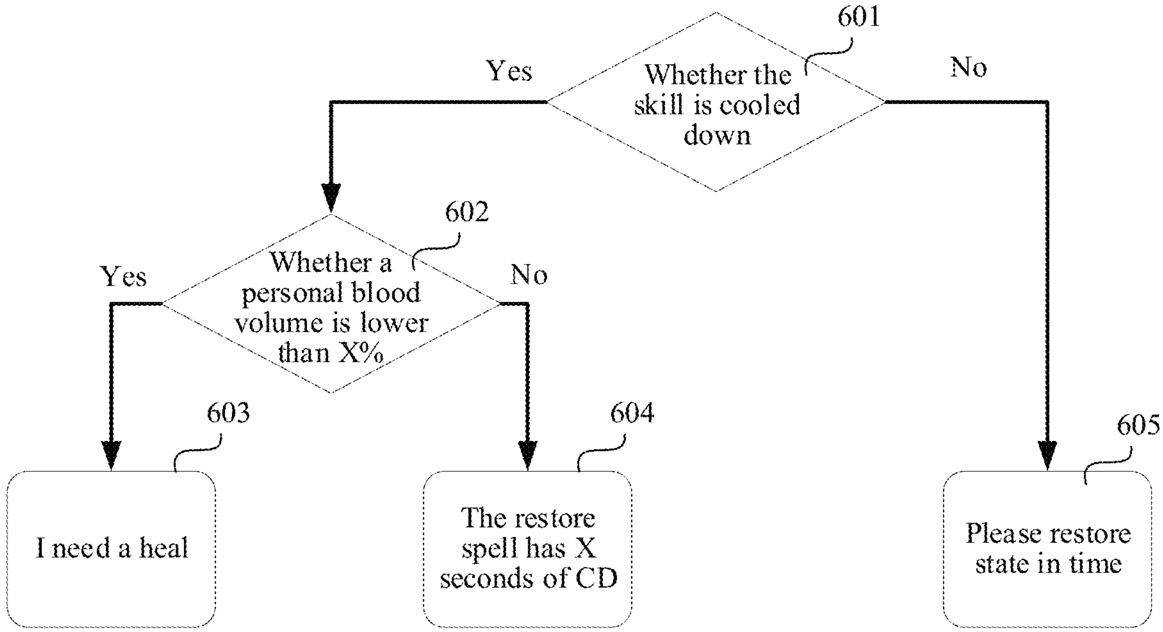
FIG. 19 is a flowchart of a behavior tree according to another exemplary embodiment of this application.

The restore spell is a spell configured for restoring an HP, a magic point, or an HP+a magic point of the master virtual character. When the target display element is the restore spell, referring to FIG. 19, the foregoing step 303 may be implemented into the following steps.

Step 601. Determine whether the restore spell is cooled down.

Step 602 is performed when the skill A is in a cooled-down state. Step 605 is performed when the skill A is in an available state.

Step 602. Determine whether a personal blood volume is lower than X %.

Step 603 is performed when the blood volume is lower than X %. Step 604 is performed when the blood volume is not lower than X %.

Step 603. Determine the target prompt information as "I need a heal".

Step 604. Determine the target prompt information as "The restore spell has X seconds of CD".

Step 605. Determine the target prompt information as "Please restore state in time".

Figure 20:
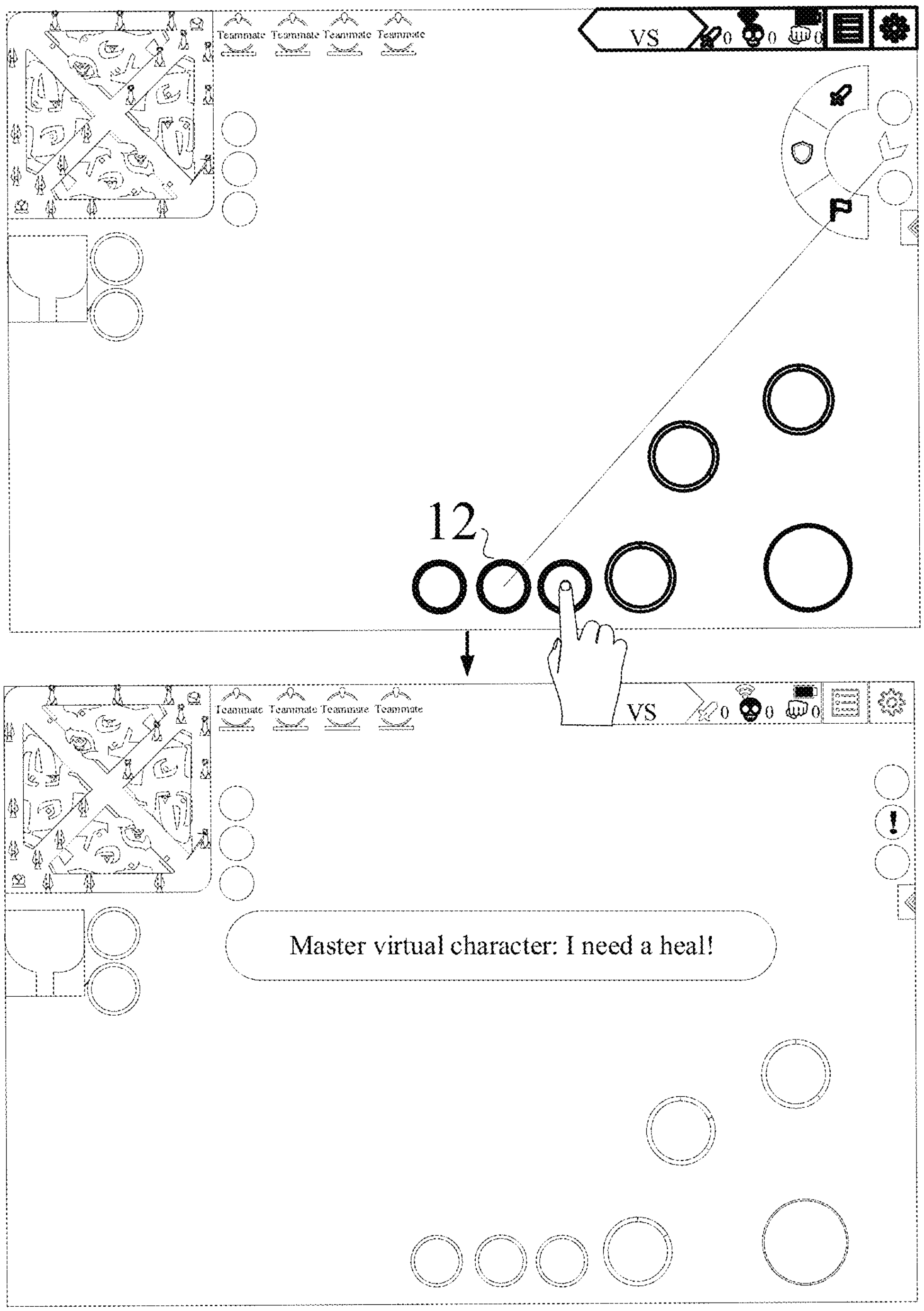
FIG. 20 is a schematic interface diagram of implementing the behavior tree according to the exemplary embodiment shown in FIG. 18.

For example, as shown in FIG. 20, a user applies a slide operation on a UI, a slide starting point of the slide operation being a signal button, and a slide end point of the slide operation being a spell button 12 of the "restore" spell. The multiplayer online battle program determines the target prompt information as "I need a heal" with reference to current battle information.

Target display element: a recall (base) spell.

Figure 21:
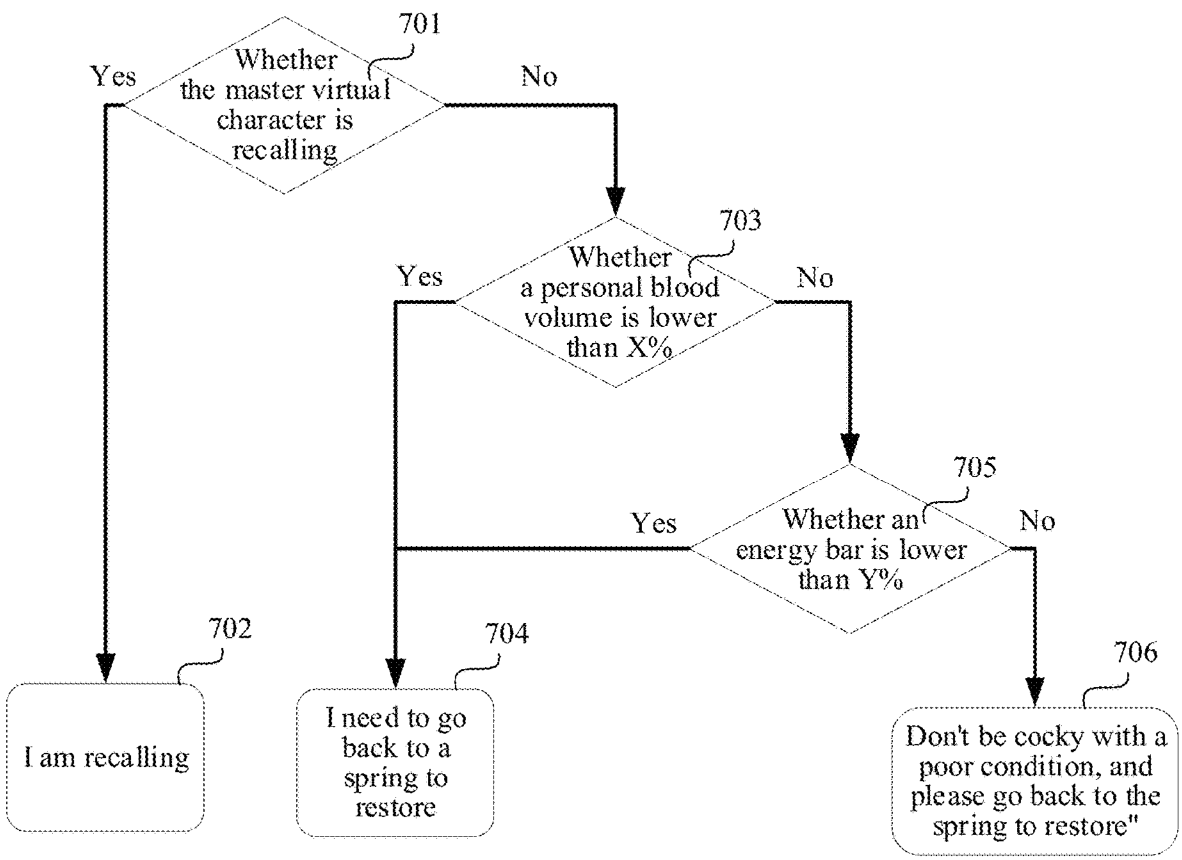
FIG. 21 is a flowchart of a behavior tree according to another exemplary embodiment of this application.

The recall spell is a spell configured for teleporting back to a base of the user's camp after a chant of a predetermined duration. When the target display element is the recall spell, referring to FIG. 21, the foregoing step 303 may be implemented into the following steps.

Step 701. Determine whether the virtual character is recalling.

Step 702 is performed when the virtual character is in the "recalling" state. Step 703 is performed when the virtual character is not in the "recalling" state.

Step 702. Determine the target prompt information as "I am recalling".

Step 703. Determine whether a personal blood volume is lower than X %.

Step 704 is performed when the blood volume is lower than X %. Step 705 is performed when the blood volume is not lower than X %.

Step 704. Determine the target prompt information as "I need to go back to a spring to restore".

Step 705. Determine whether an energy bar is lower than Y %.

Step 704 is performed when the energy bar is lower than Y %. Step 706 is performed when the energy bar is not lower than Y %.

Step 706. Determine the target prompt information as "Don't be cocky with a poor condition, and please go back to the spring to restore".

Figure 22:
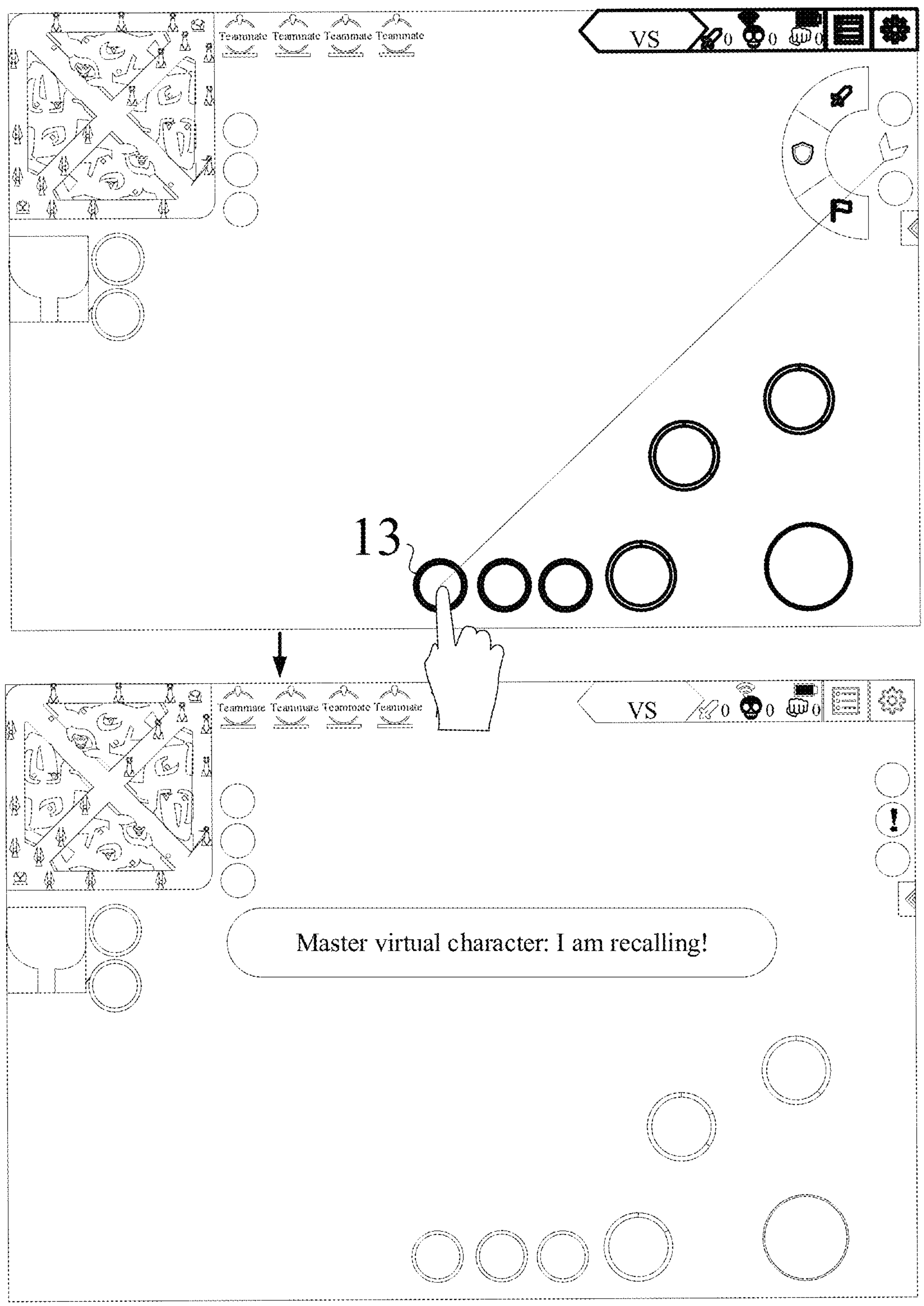
FIG. 22 is a schematic interface diagram of implementing the behavior tree according to the exemplary embodiment shown in FIG. 21.

For example, as shown in FIG. 22, a user applies a slide operation on a UI, a slide starting point of the slide operation being a signal button, and a slide end point of the slide operation being a spell button 13 of the "recall" spell. The multiplayer online battle program determines the target prompt information as "I am recalling" with reference to current battle information.

Target display element: a network speed identifier in a device information region.

Figure 23:
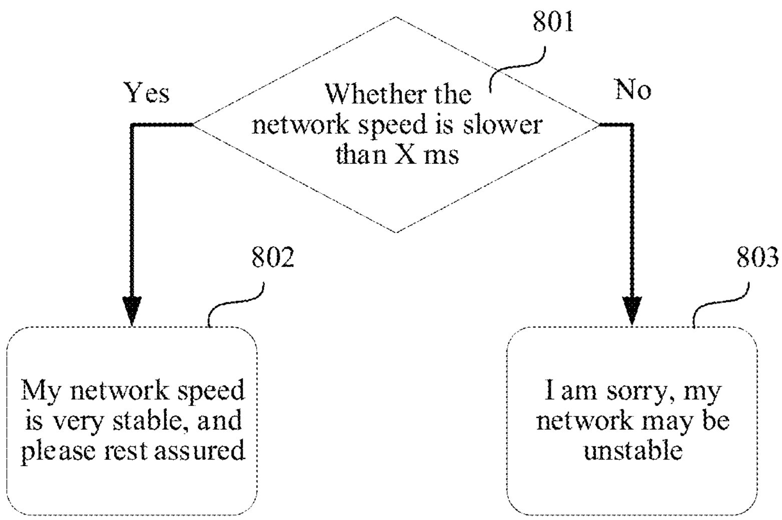
FIG. 23 is a flowchart of a behavior tree according to another exemplary embodiment of this application.

The network speed identifier is configured for indicating a signal quality of a mobile network or a wireless fidelity (Wi-Fi) network to which a terminal is currently connected. Referring to FIG. 23, the foregoing step 303 may be implemented into the following steps.

Step 801. Determine whether the network speed is slower than X ms.

Step 802 is performed when the network speed is slower than X ms. Step 803 is performed when the network speed is not slower than X ms.

Step 802. Determine the target prompt information as "My network speed is very stable, and please rest assured".

Step 803. Determine the target prompt information as "I am sorry, my network may be unstable".

Figure 24:
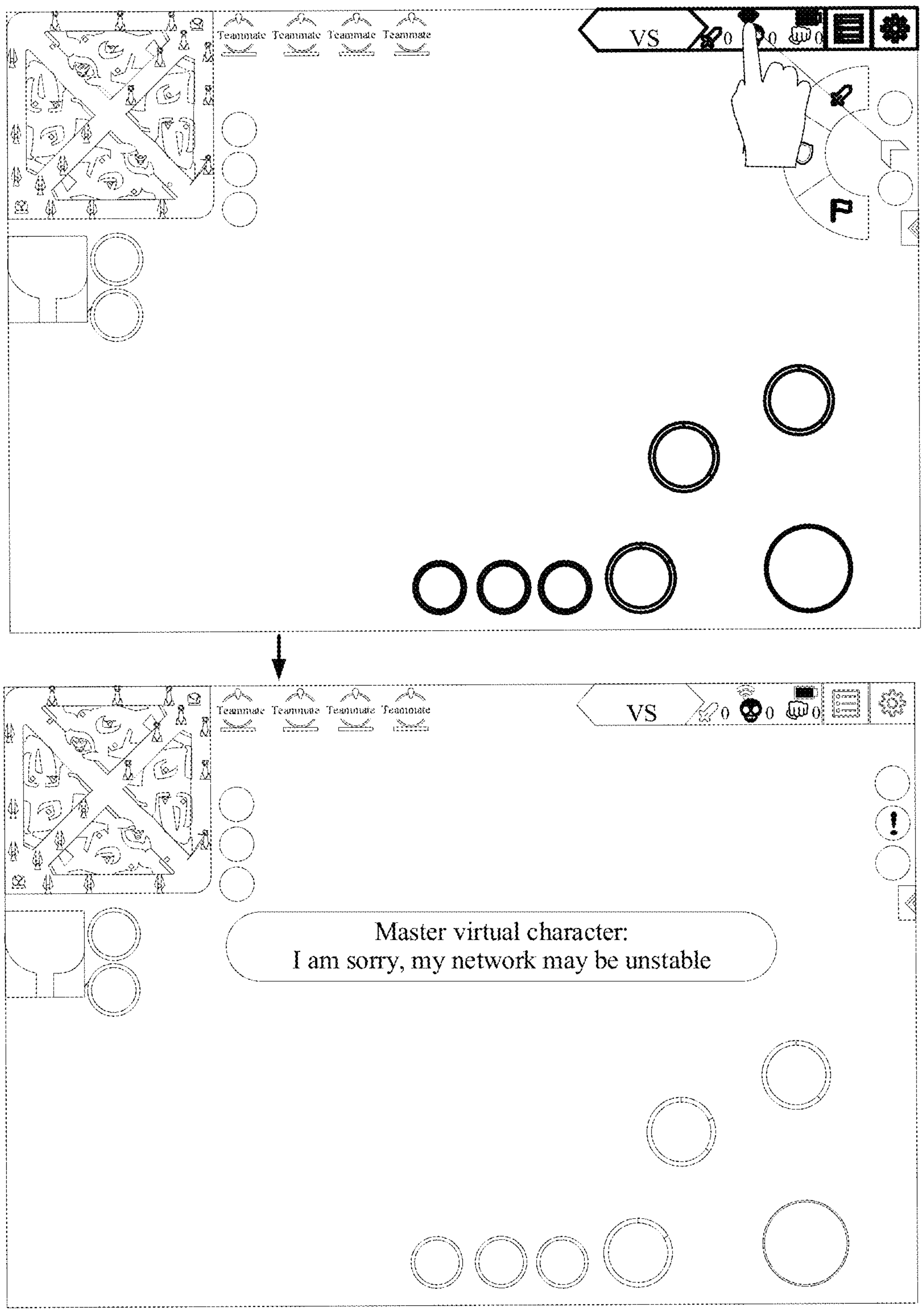
FIG. 24 is a schematic interface diagram of implementing the behavior tree according to the exemplary embodiment shown in FIG. 23.

For example, as shown in FIG. 24, a user applies a slide operation on a UI, a slide starting point of the slide operation being a signal button, and a slide end point of the slide operation being a device information region 04 including the "network speed identifier". The multiplayer online battle program determines the target prompt information as "I am sorry, my network may be unstable" with reference to current battle information.

Target display element: a scoreboard.

Figure 25:
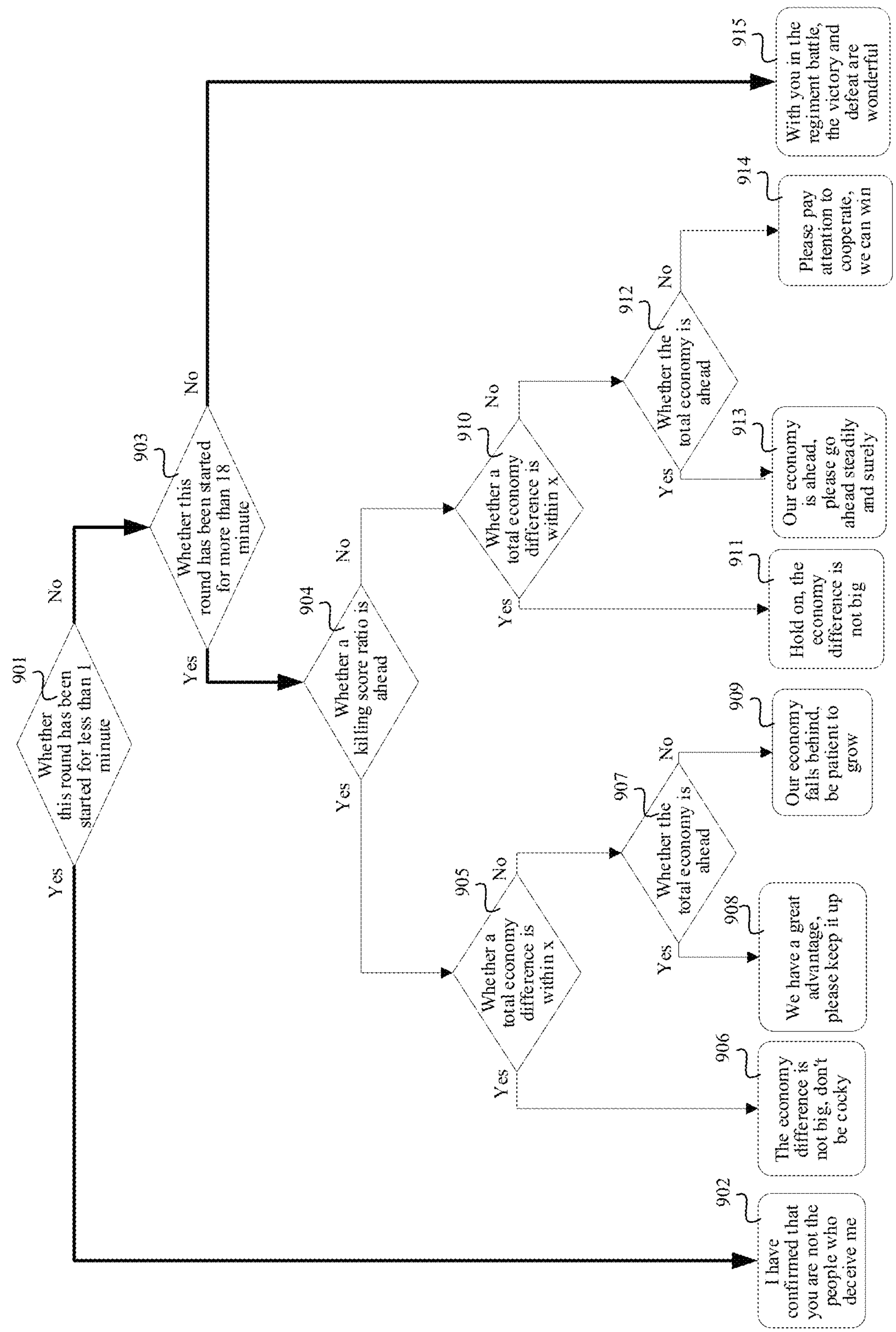
FIG. 25 is a flowchart of a behavior tree according to another exemplary embodiment of this application.

The scoreboard is an information display control configured for recording a killing score ratio quantity of virtual characters of two opposing camps. Referring to FIG. 25, the foregoing step 303 may be implemented into the following steps.

Step 901. Determine whether this round has been started for less than 1 minute.

Step 902 is performed when the round has been started for less than 1 minute. Step 903 is performed when the round has been started for greater than or equal to 1 minute.

Step 902. Determine the target prompt information as "I have confirmed that you are not the people who deceive me".

Step 903. Determine whether this round has been started for more than 18 minutes.

Step 904 is performed when the round has been started for more than 18 minutes. Step 915 is performed when the round has been started for less than or equal to 18 minutes.

Step 904. Determine whether a killing score ratio is ahead.

Step 905 is performed when the killing score ratio is ahead. Step 910 is performed when the killing score ratio is not ahead.

Step 905. Determine whether a total economy difference is within x.

Step 906 is performed when the total economy difference is within x. Step 907 is performed when the total economy difference exceeds x.

Step 906. Determine the target prompt information as "The economy difference is not big, don't be cocky".

Step 907. Determine whether the total economy is ahead.

Step 908 is performed when the total economy is ahead. Step 909 is performed when the total economy falls behind.

Step 908. Determine the target prompt information as "We have a great advantage, please keep it up".

Step 909. Determine the target prompt information as "Our economy falls behind, be patient to grow".

Step 910. Determine whether a total economy difference is within x.

For example, the threshold x varies with time. For example, a started duration of this round is y, and a threshold x is that:

- an interval of the started duration of this round: 0 seconds to 180 seconds, x=851;
- an interval of the started duration of this round: 180 seconds to 360 seconds, x=3(y−180)+851;
- an interval of the started duration of this round: 180 seconds to 360 seconds, x=1.28(y−180)+1391;
- an interval of the started duration of this round: 180 seconds to 360 seconds, x=7.86(y−180)+1623;
- an interval of the started duration of this round: 180 seconds to 360 seconds, x=3.09(y−180)+3038; and
- an interval of the started duration of this round: 900 seconds to 1080 seconds, x=2.77(y−180)+3595.

Step 911 is performed when the total economy difference is within x. Step 912 is performed when the total economy difference exceeds x.

Step 911. Determine the target prompt information as "Hold on, the economy difference is not big".

Step 912. Determine whether the total economy is ahead.

Step 913 is performed when the total economy is ahead. Step 914 is performed when the total economy falls behind.

Step 913. Determine the target prompt information as "Our economy is ahead, please go ahead steadily and surely".

Step 914. Determine the target prompt information as "Please pay attention to cooperate, we can win".

Step 915. Determine the target prompt information as "With you in the regiment battle, the victory and defeat are wonderful".

Figure 26:
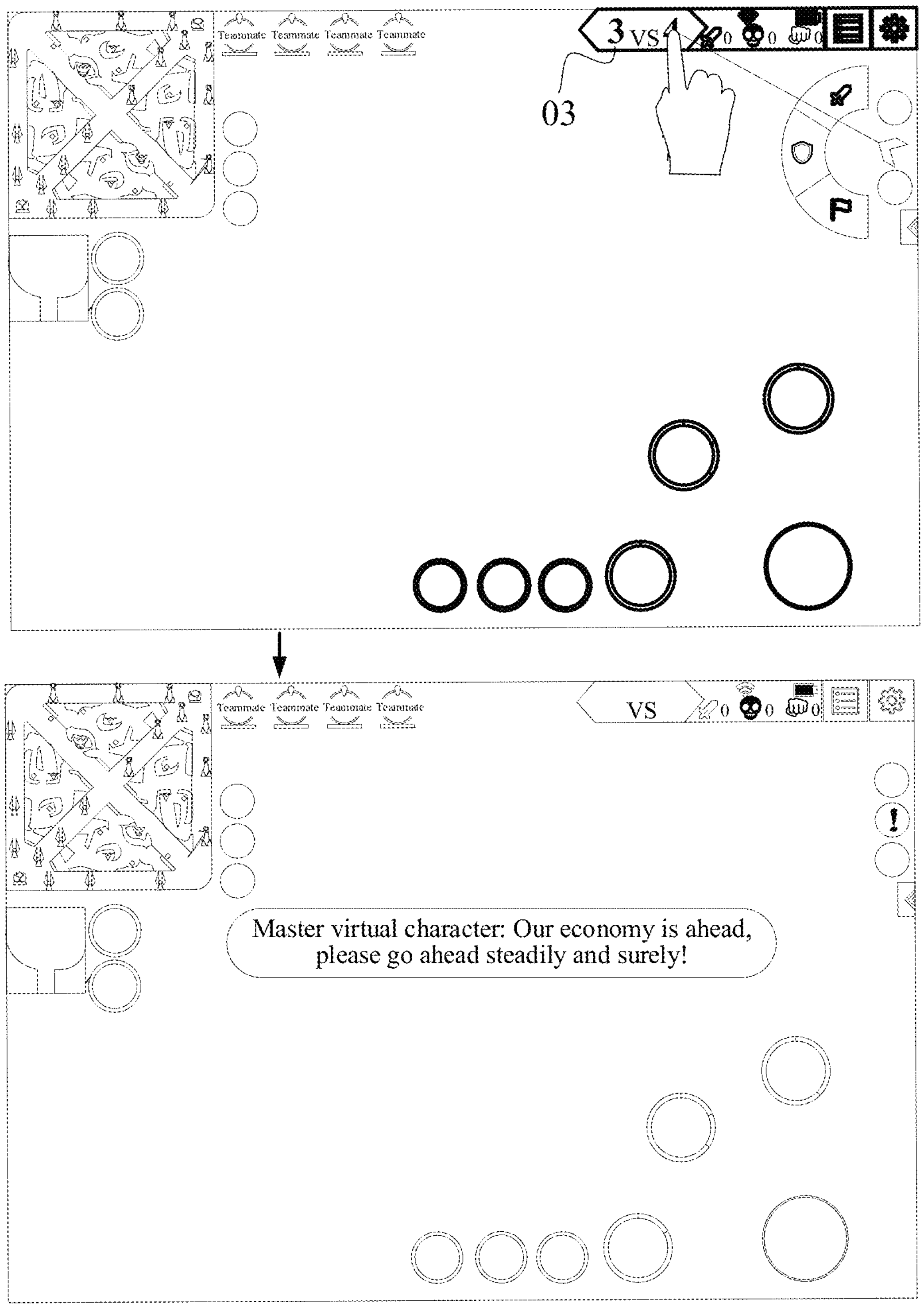
FIG. 26 is a schematic interface diagram of implementing the behavior tree according to the exemplary embodiment shown in FIG. 25.

For example, as shown in FIG. 26, a user applies a slide operation on a UI, a slide starting point of the slide operation being a signal button, and a slide end point of the slide operation being a scoreboard 03. The multiplayer online battle program determines the target prompt information as "Our economy is ahead, please go ahead steadily and surely" with reference to current battle information.

Target display element: a top lane/middle lane/bottom lane of a map viewing control.

Figure 27:
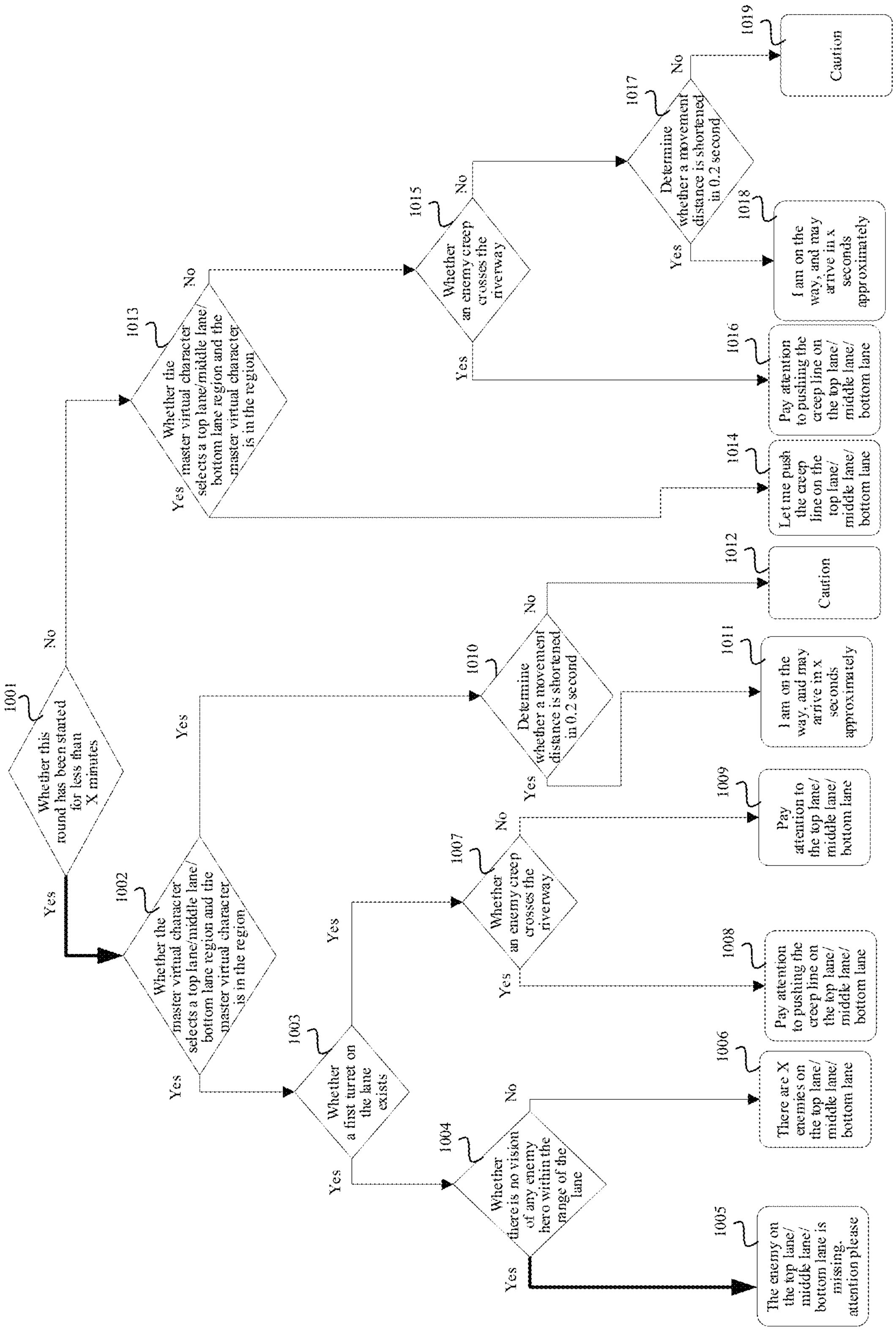
FIG. 27 is a flowchart of a behavior tree according to another exemplary embodiment of this application.

Referring to FIG. 27, the foregoing step 303 may be implemented into the following steps.

Step 1001. Determine whether this round has been started for less than X minutes.

Step 1002 is performed when the round has been started for less than X minutes. Step 1013 is performed when the round has been started for greater than or equal to X minutes.

Step 1002. Determine whether the master virtual character selects a top lane/middle lane/bottom lane region and the master virtual character is in the region.

Step 1003 is performed when the master virtual character selects the top lane/middle lane/bottom lane region and the master virtual character is in the region; otherwise, step 1010 is performed.

Step 1003. Determine whether a first turret (the first turret) on the lane exists.

Step 1004 is performed when the first turret exists. Step 1007 is performed when the first turret does not exist.

Step 1004. Determine whether there is no vision of any enemy virtual character within the range of the lane.

Step 1005 is performed when there is no vision of any enemy virtual character. Step 1006 is performed when there are visions of X enemy virtual characters.

Step 1005. Determine the target prompt information as “The enemy on the top lane/middle lane/bottom lane is missing, attention please”.

Step 1006. Determine the target prompt information as “There are X enemies on the top lane/middle lane/bottom lane”.

Step 1007. Determine whether an enemy creep crosses the riverway (enter our region).

Step 1008 is performed when an enemy creep crosses the riverway. Step 1009 is performed when an enemy creep does not cross the riverway.

Step 1008. Determine the target prompt information as “Pay attention to pushing the creep line on the top lane/middle lane/bottom lane”.

Step 1009. Determine the target prompt information as “Pay attention to the top lane/middle lane/bottom lane”.

Step 1010. Determine whether a movement distance is shortened in 0.2 second.

Determine whether a movement distance of the master virtual character controlled by the user is shortened in 0.2 second.

Step 1011 is performed when the movement distance is shortened. Step 1012 is performed when the movement distance is not shortened.

Step 1011. Determine the target prompt information as “I am on the way, and may arrive in x seconds approximately”.

Step 1012. Determine the target prompt information as “Caution”.

Step 1013. Determine whether the master virtual character selects a top lane/middle lane/bottom lane region and the master virtual character is in the region.

Step 1014 is performed when the master virtual character selects the top lane/middle lane/bottom lane region and the master virtual character is in the region; otherwise, step 1015 is performed.

Step 1014. Determine the target prompt information as “Let me push the creep line on the top lane/middle lane/bottom lane”.

Step 1015. Determine whether an enemy creep crosses the riverway (enter our region).

Step 1016 is performed when an enemy creep crosses the riverway. Step 1017 is performed when an enemy creep does not cross the riverway.

Step 1016. Determine the target prompt information as “Pay attention to pushing the creep line on the top lane/middle lane/bottom lane”.

Step 1017. Determine whether a movement distance is shortened in 0.2 second.

Determine whether a movement distance of the master virtual character controlled by the user is shortened in 0.2 second.

Step 1018 is performed when the movement distance is shortened. Step 1019 is performed when the movement distance is not shortened.

Step 1018. Determine the target prompt information as “I am on the way, and may arrive in x seconds approximately”.

Step 1019. Determine the target prompt information as “Caution”.

Figure 28:
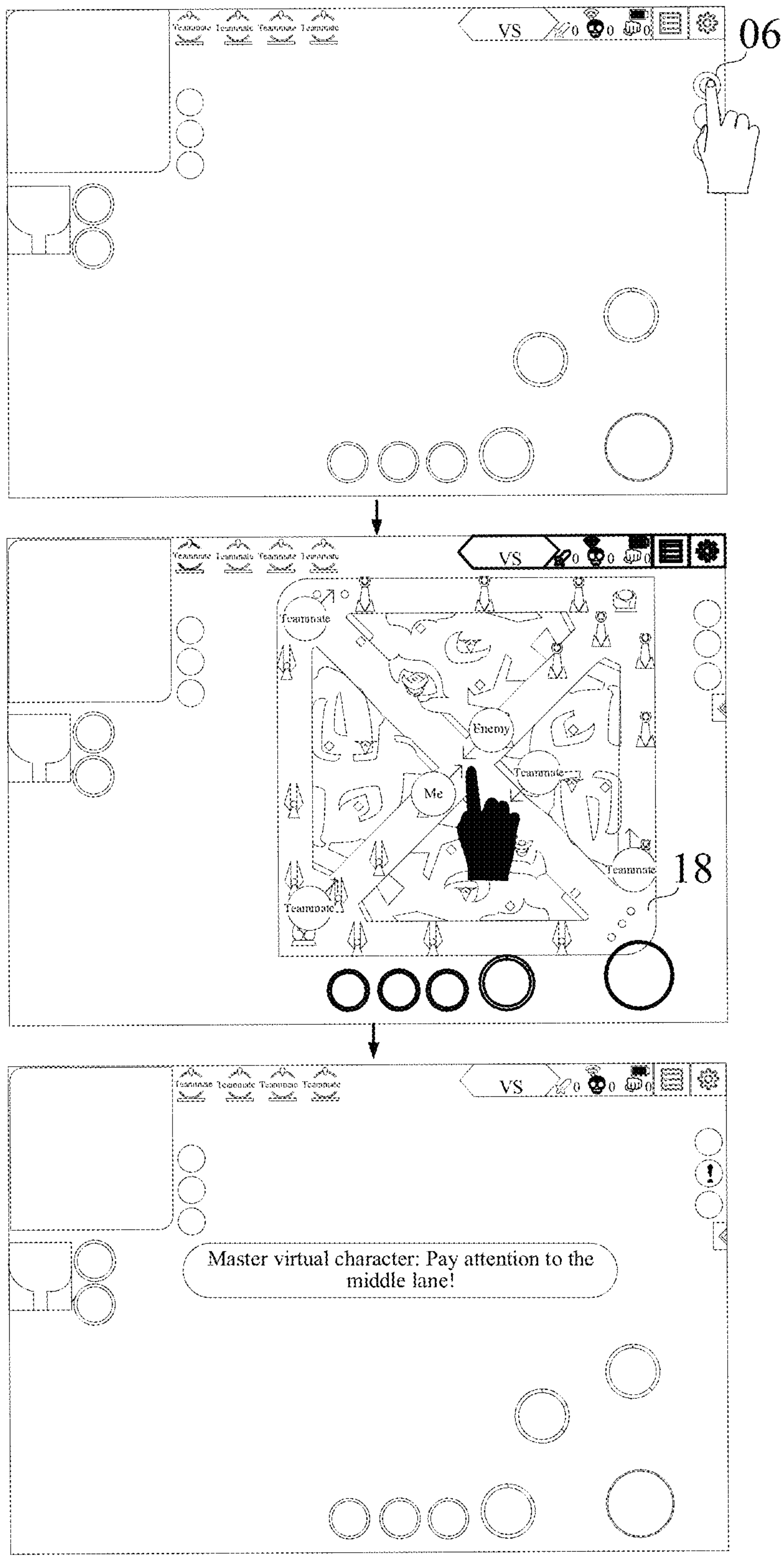
FIG. 28 is a schematic interface diagram of implementing the behavior tree according to the exemplary embodiment shown in FIG. 27.

For example, as shown in FIG. 28, a user applies a slide operation on a UI, a slide starting point of the slide operation being a signal button, and a slide end point of the slide operation being a middle lane region on the map viewing control. The multiplayer online battle program determines the target prompt information as “Pay attention to the middle lane” with reference to current battle information.

Target display element: a big dragon (or a small dragon) in a map viewing control.

Figure 29:
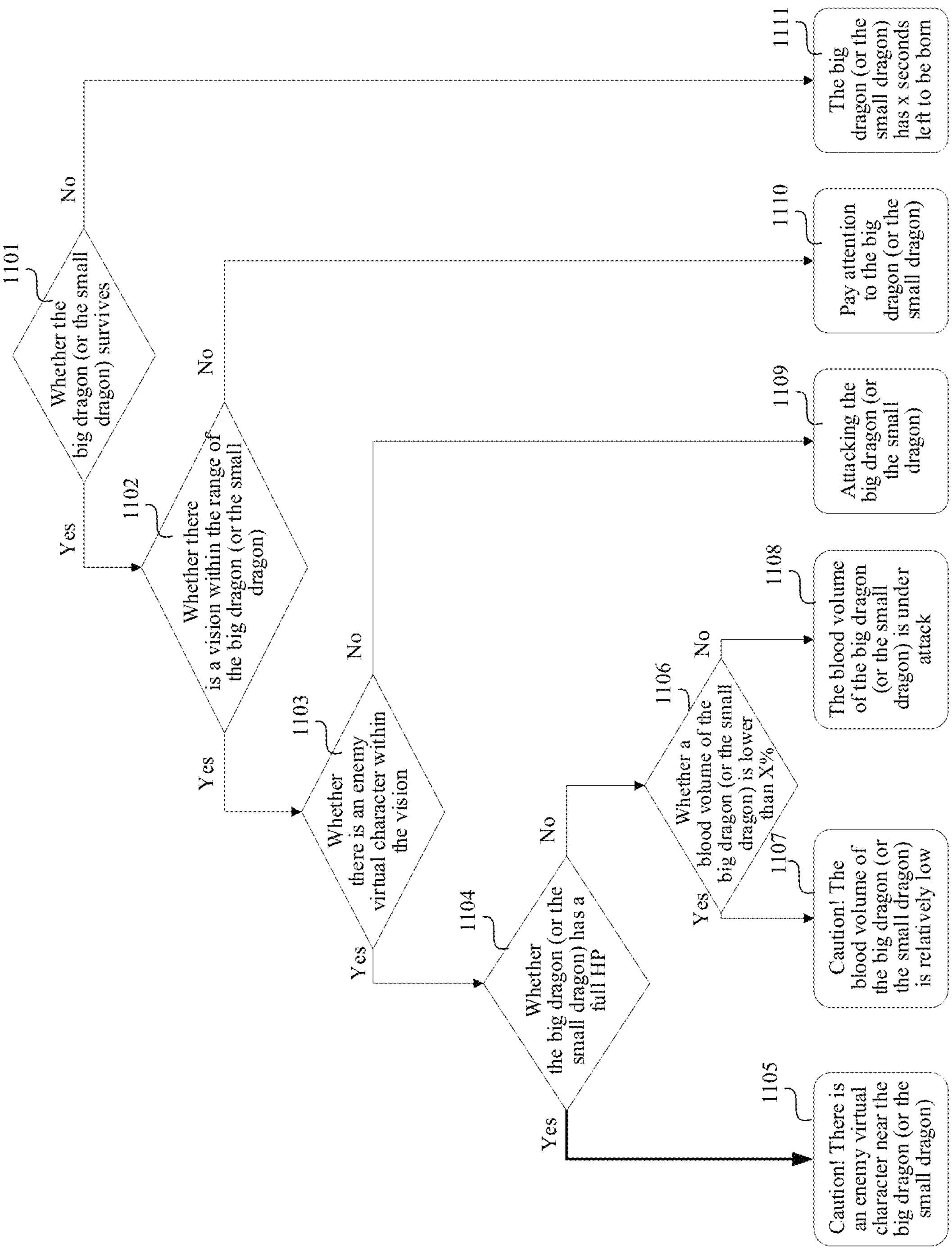
FIG. 29 is a flowchart of a behavior tree according to another exemplary embodiment of this application.

The big dragon (or the small dragon) is a monster that gives BUFF gains to all virtual characters in a camp of the killer after the big dragon (or the small dragon) is killed. Referring to FIG. 29, the foregoing step 303 may be implemented into the following steps.

Step 1101. Determine whether the big dragon (or the small dragon) survives.

Step 1102 is performed when the big dragon (or the small dragon) survives. Step 1111 is performed when the big dragon (or the small dragon) does not survive.

Step 1102. Determine whether there is a vision within the range of the big dragon (or the small dragon).

Step 1103 is performed when there is a vision; otherwise, step 1110 is performed.

Step 1103. Determine whether there is an enemy virtual character within the vision.

Step 1104 is performed when there is an enemy virtual character within the vision. Step 1109 is performed when there is no enemy virtual character within the vision.

Step 1104. Determine whether the big dragon (or the small dragon) has a full HP.

Step 1105 is performed when the big dragon (or the small dragon) has a full HP. Step 1106 is performed when the big dragon (or the small dragon) does not have a full HP.

Step 1105. Determine the target prompt information as “Caution, there is an enemy hero near the big dragon (or the small dragon)”.

Step 1106. Determine whether a blood volume of the big dragon (or the small dragon) is lower than X %.

Step 1107 is performed when the blood volume is lower than X %. Step 1108 is performed when the blood volume is not lower than X %.

Step 1107. Determine the target prompt information as “Caution! The blood volume of the big dragon (or the small dragon) is relatively low”.

Step 1108. Determine the target prompt information as “Caution! The blood volume of the big dragon (or the small dragon) is under attack”.

Step 1109. Determine the target prompt information as “Attacking the big dragon (or the small dragon)”.

Step 1110. Determine the target prompt information as “The big dragon (or the small dragon) has x seconds left to be born”.

Figure 30:
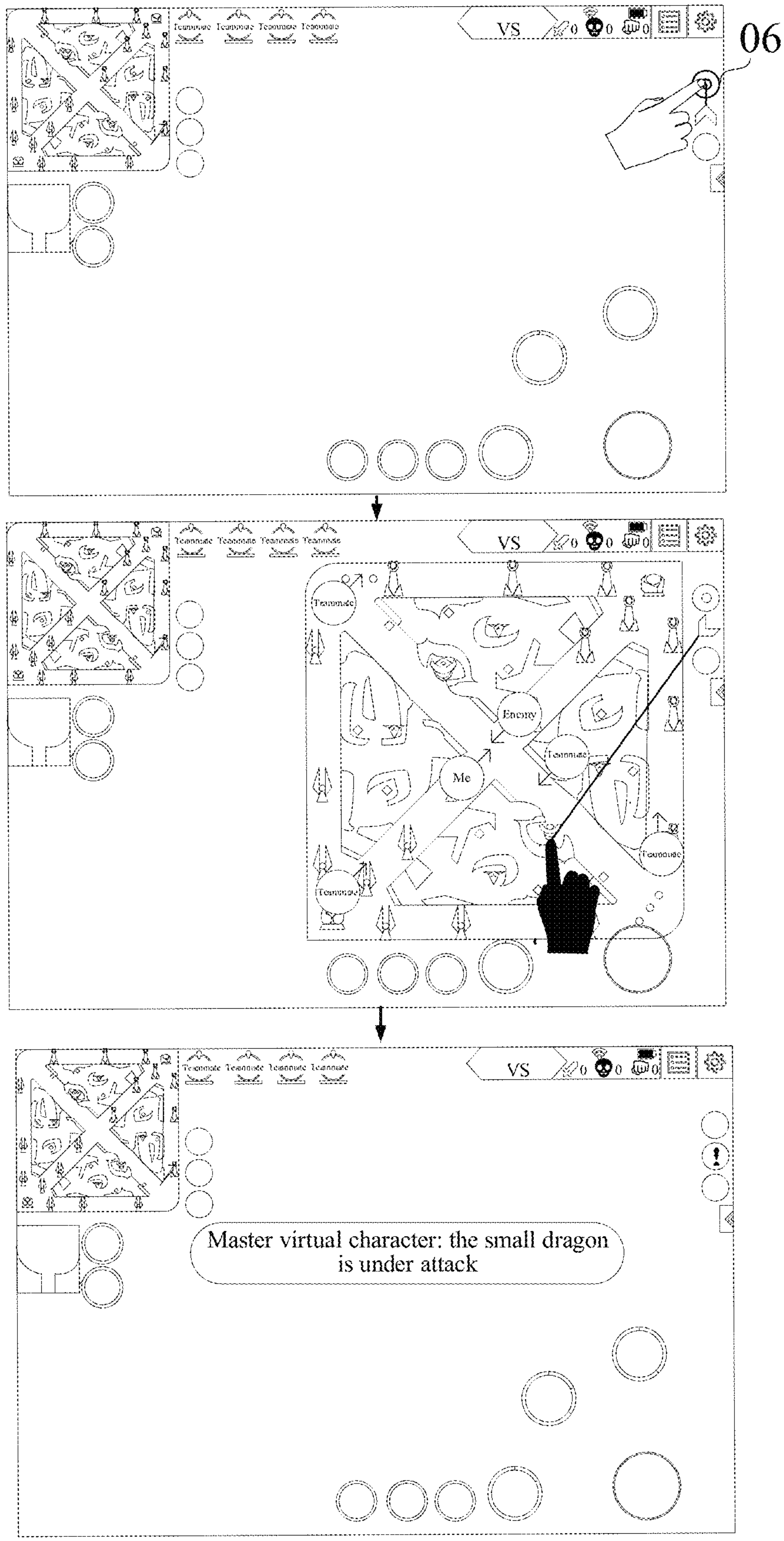
FIG. 30 is a schematic interface diagram of implementing the behavior tree according to the exemplary embodiment shown in FIG. 29.

For example, as shown in FIG. 30, a user applies a slide operation on a UI, a slide starting point of the slide operation being a signal button, and a slide end point of the slide operation being a small dragon region on the map viewing control. The multiplayer online battle program determines the target prompt information as “The small dragon is under attack” with reference to current battle information.

Target display element: a red (blue) BUFF in a map viewing control.

Figure 31:
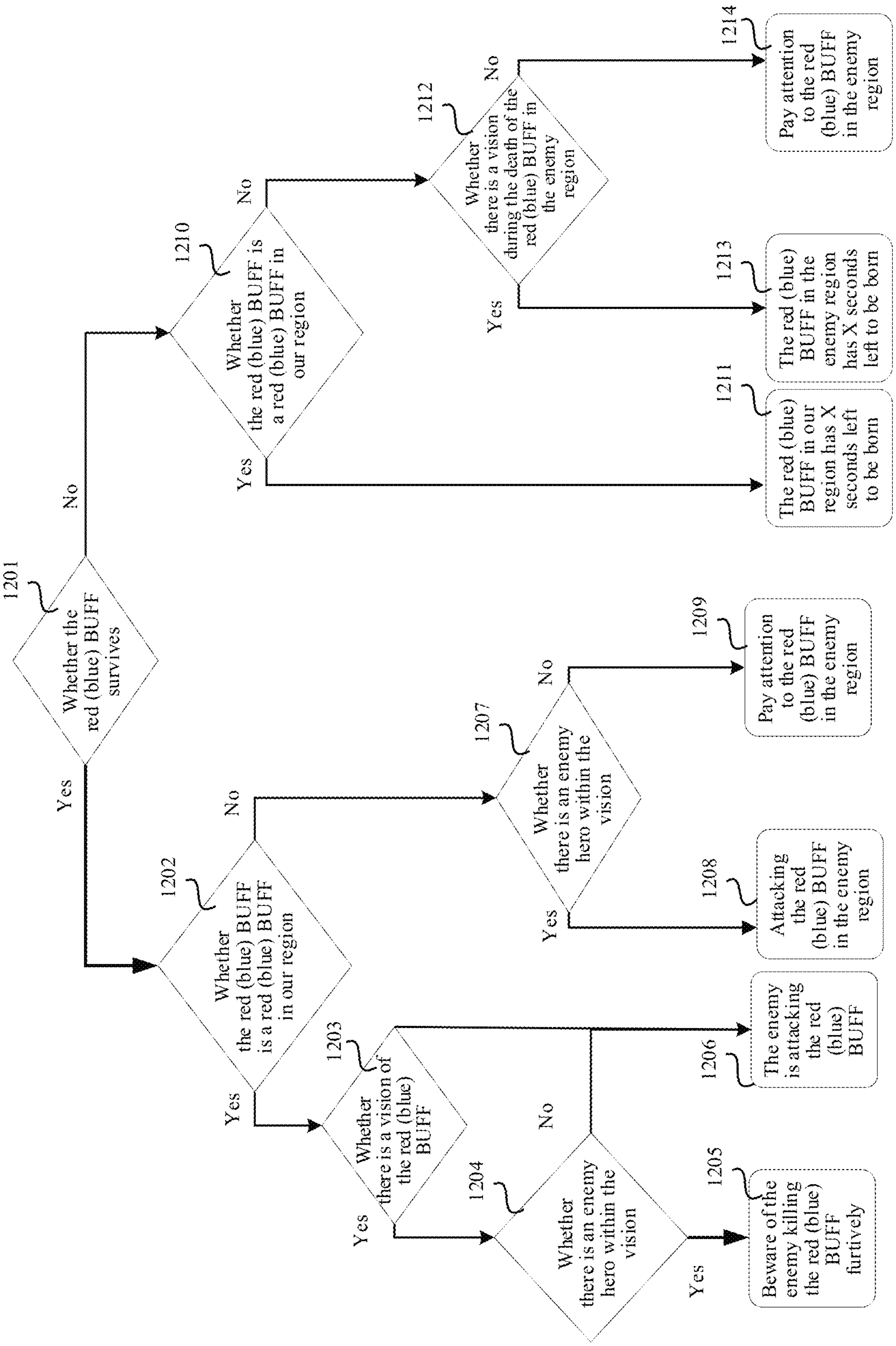
FIG. 31 is a flowchart of a behavior tree according to another exemplary embodiment of this application.

The red (blue) BUFF is a gain effect obtained after a target monster in the jungle is killed. Referring to FIG. 31, the foregoing step 303 may be implemented into the following steps.

Step 1201. Determine whether the red (blue) BUFF survives.

Step 1202 is performed when the red (blue) BUFF survives. Step 1210 is performed when the red (blue) BUFF does not survive.

Step 1202. Determine whether the red (blue) BUFF is a red (blue) BUFF in our region.

Step 1203 is performed when the red (blue) BUFF is the red (blue) BUFF in our region. Step 1207 is performed when the red (blue) BUFF is a red (blue) BUFF in an enemy region.

Step 1203. Determine whether there is a vision of the red (blue) BUFF.

Step 1204 is performed when there is a vision of the red (blue) BUFF. Step 1206 is performed when there is no vision of the red (blue) BUFF.

Step 1204. Determine whether there is an enemy virtual character within the vision.

Step 1205 is performed when there is an enemy virtual character within the vision. Step 1206 is performed when there is no enemy virtual character within the vision.

Step 1205. Determine the target prompt information as "Beware of the enemy killing the red (blue) BUFF furtively".

Step 1206. Determine the target prompt information as "The enemy is attacking the red (blue) BUFF".

Step 1207. Determine whether there is an enemy virtual character within the vision.

Step 1208 is performed when there is an enemy virtual character within the vision. Step 1209 is performed when there is no enemy virtual character within the vision.

Step 1208. Determine the target prompt information as "Attacking the red (blue) BUFF in the enemy region".

Step 1209. Determine the target prompt information as "Pay attention to the red (blue) BUFF in the enemy region".

Step 1210. Determine whether the red (blue) BUFF is a red (blue) BUFF in our region.

Step 1211 is performed when the red (blue) BUFF is the red (blue) BUFF in our region. Step 1212 is performed when the red (blue) BUFF is a red (blue) BUFF in an enemy region.

Step 1211. Determine the target prompt information as "The red (blue) BUFF in our region has X seconds left to be born".

Step 1212. Determine whether there is a vision during the death of the red (blue) BUFF in the enemy region.

Step 1213 is performed when there is the vision during the death. Step 1214 is performed when there is no vision during the death.

Step 1213. Determine the target prompt information as "The red (blue) BUFF in the enemy region has X seconds left to be born".

Step 1214. Determine the target prompt information as "Pay attention to the red (blue) BUFF in the enemy region".

Figure 32:
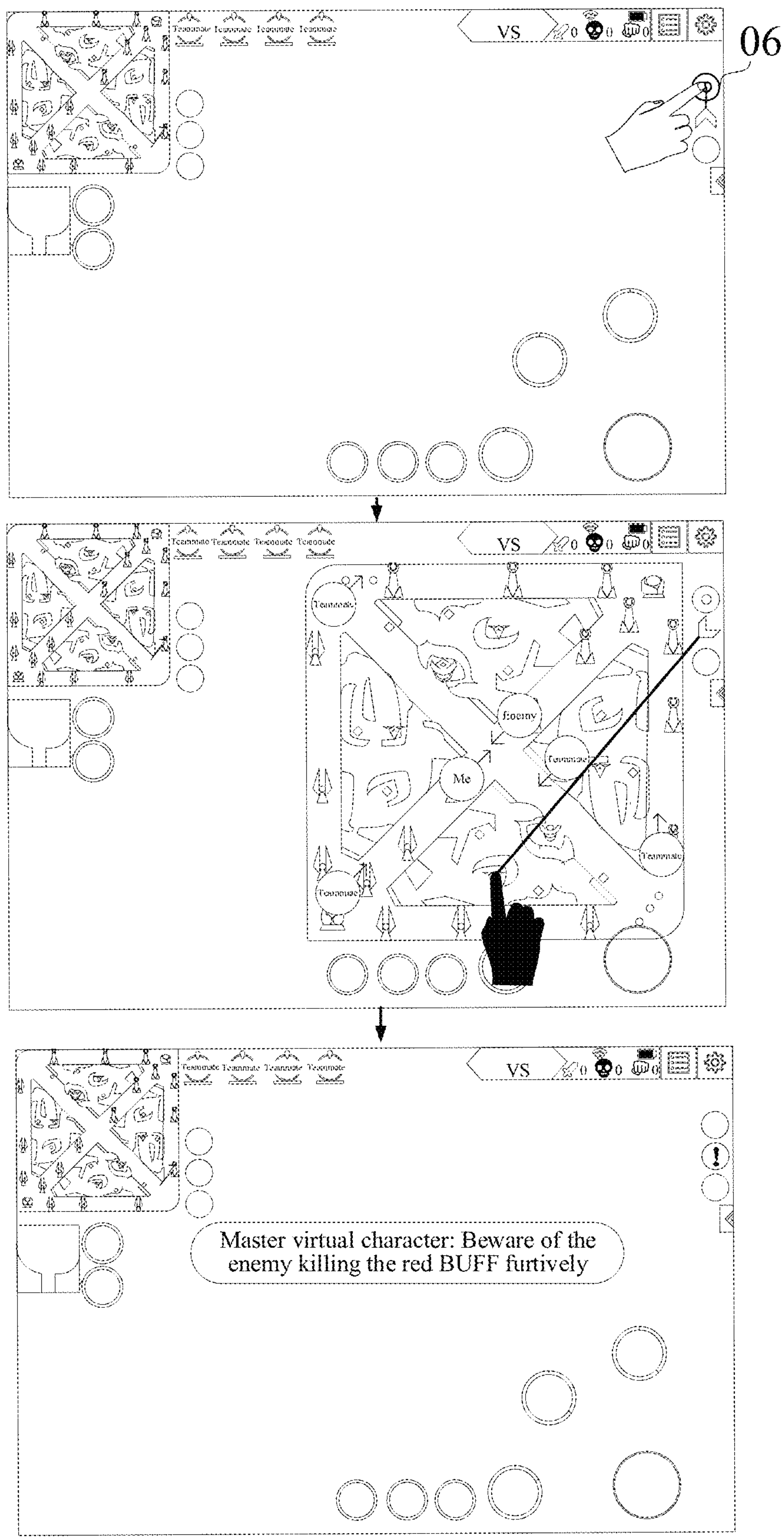
FIG. 32 is a schematic interface diagram of implementing the behavior tree according to the exemplary embodiment shown in FIG. 31.

For example, as shown in FIG. 32, a user applies a slide operation on a UI, a slide starting point of the slide operation being a signal button, and a slide end point of the slide operation being a location of a red BUFF monster in our region on the map viewing control. The multiplayer online battle program determines the target prompt information as "Beware of the enemy killing the red BUFF furtively" with reference to current battle information.

Target display element: a virtual character (also referred to as a hero).

Figure 33:
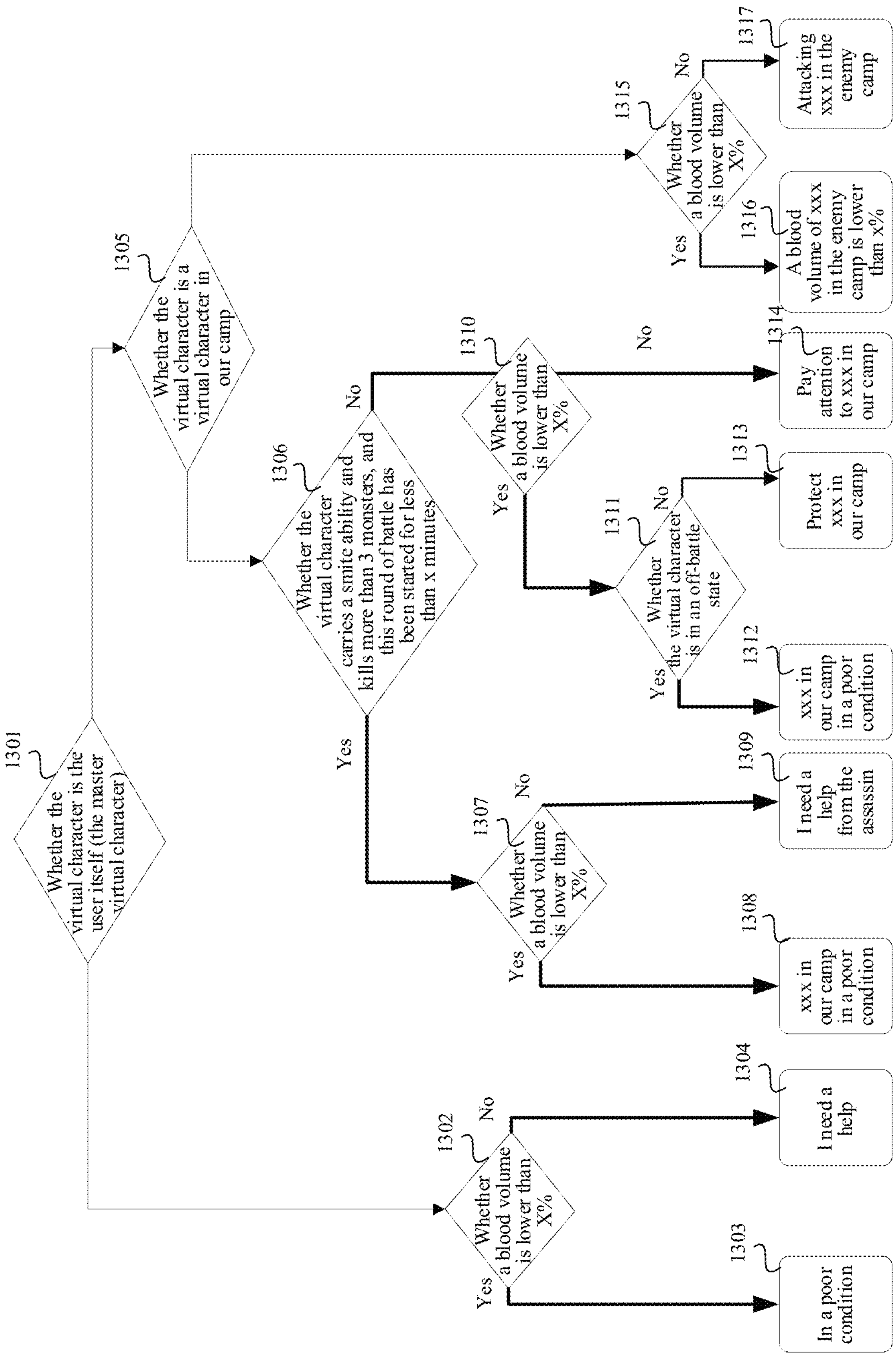
FIG. 33 is a flowchart of a behavior tree according to another exemplary embodiment of this application.

Referring to FIG. 33, the foregoing step 303 may be implemented into the following steps.

Step 1301. Determine whether the virtual character is the user itself (the master virtual character).

Step 1302 is performed when the virtual character is the master virtual character. Step 1305 is performed when the virtual character is not the master virtual character.

Step 1302. Determine whether a blood volume of the virtual character is lower than X %.

Step 1303 is performed when the blood volume is lower than X %. Step 1304 is performed when the blood volume is not lower than X %.

Step 1303. Determine the target prompt information as "I am in a poor condition".

Step 1304. Determine the target prompt information as "I need a help".

Step 1305. Determine whether the virtual character is a virtual character in our camp.

Step 1306 is performed when the virtual character is a virtual character in our camp. Step 1315 is performed when the virtual character is not a virtual character in our camp.

Step 1306. Determine whether the virtual character carries a smite ability and kills more than 3 monsters, and this round of battle has been started for less than x minutes.

Step 1307 is performed if yes; otherwise, step 1310 is performed.

Step 1307. Determine whether a blood volume of the virtual character is lower than X %.

Step 1308 is performed when the blood volume is lower than X %. Step 1309 is performed when the blood volume is not lower than X %.

Step 1308. Determine the target prompt information as "xxx in our camp in a poor condition".

Step 1309. Determine the target prompt information as "I need a help from the assassin".

Step 1310. Determine whether a blood volume of the virtual character is lower than X %.

Step 1311 is performed when the blood volume is lower than X %. Step 1314 is performed when the blood volume is not lower than X %.

Step 1311. Determine whether the virtual character is in an off-battle state.

Step 1312 is performed when the virtual character is in the off-battle state. Step 1313 is performed when the virtual character is not in the off-battle state.

Step 1312. Determine the target prompt information as "xxx in our camp in a poor condition".

Step 1313. Determine the target prompt information as "Protect xxx in our camp".

Step 1314. Determine the target prompt information as "Pay attention to xxx in our camp".

Step 1315. Determine whether a blood volume of the virtual character is lower than X %.

Step 1303 is performed when the blood volume is lower than X %. Step 1317 is performed when the blood volume is not lower than X %.

Step 1303. Determine the target prompt information as "A blood volume of xxx in the enemy camp is lower than x %".

Step 1304. Determine the target prompt information as "Attacking xxx in the enemy camp".

Figure 34:
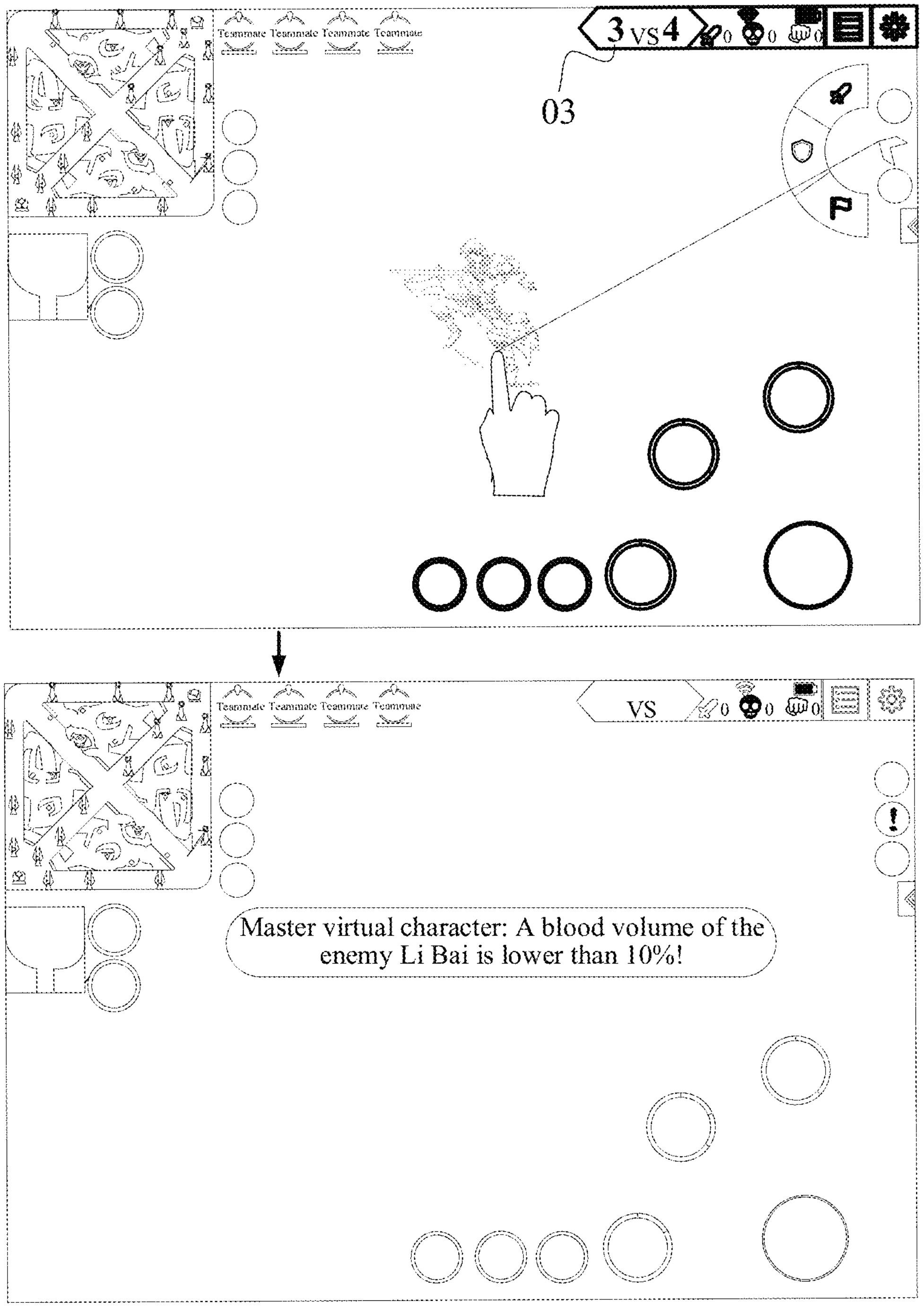
FIG. 34 is a schematic interface diagram of implementing the behavior tree according to the exemplary embodiment shown in FIG. 33.

For example, as shown in FIG. 34, a user applies a slide operation on a UI, a slide starting point of the slide operation being a signal button, and a slide end point of the slide operation being an enemy virtual character "Li Bai". The multiplayer online battle program determines the target prompt information as "A blood volume of the enemy Li Bai is lower than 10%" with reference to current battle information.

Target display element: a fort (or a base or a turret) in a map viewing control.

Figure 35:
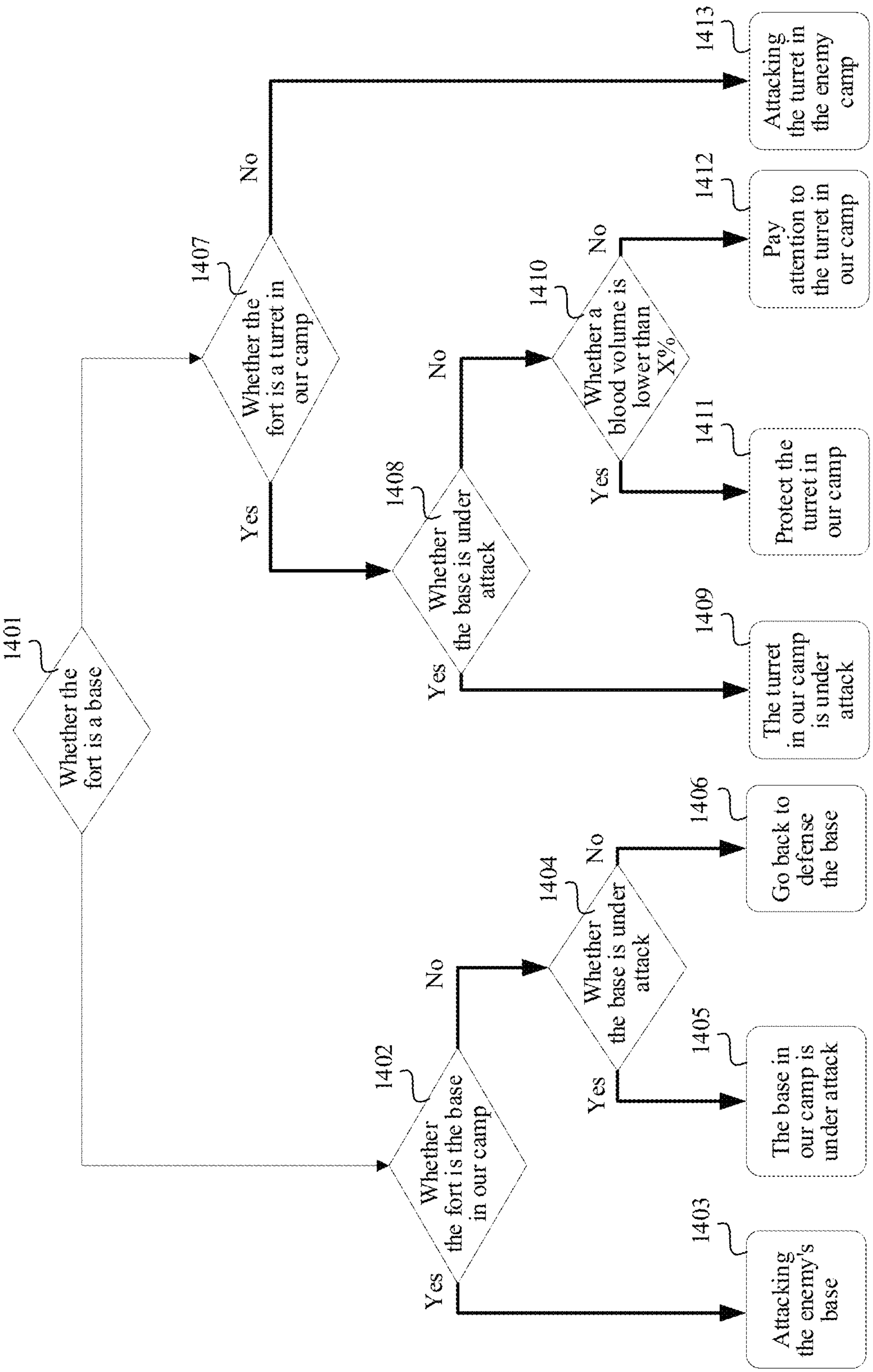
FIG. 35 is a flowchart of a behavior tree according to another exemplary embodiment of this application.

Referring to FIG. 35, the foregoing step 303 may be implemented into the following steps.

Step 1401. Determine whether the fort is a base.

Step 1402 is performed when the fort is a base. Step 1407 is performed when the fort is not a base.

Step 1402. Determine whether the fort is the base in our camp.

Step 1403 is performed when the fort is the base in our camp. Step 1404 is performed when the fort is not the base in our camp.

Step 1403. Determine the target prompt information as "Attacking the enemy's base".

Step 1404. Determine whether the base is under attack.

Step 1405 is performed when the base is under attack. Step 1406 is performed when the base is not under attack.

Step 1405. Determine the target prompt information as "The base in our camp is under attack".

Step 1406. Determine the target prompt information as "Go back to defense the base".

Step 1407. Determine whether the fort is a turret in our camp.

Step 1408 is performed when the fort is a turret in our camp. Step 1413 is performed when the fort is not a turret in our camp.

Step 1408. Determine whether the base is under attack.

Step 1409 is performed when the base is under attack. Step 1410 is performed when the base is not under attack.

Step 1409. Determine the target prompt information as "The turret in our camp is under attack".

Step 1410. Determine whether a blood volume of the virtual character is lower than X %.

Step 1411 is performed when the blood volume is lower than X %. Step 1412 is performed when the blood volume is not lower than X %.

Step 1411. Determine the target prompt information as "Protect the turret in our camp".

Step 1412. Determine the target prompt information as "Pay attention to the turret in our camp".

Step 1413. Determine the target prompt information as "Attacking the turret in the enemy camp".

Figure 36:
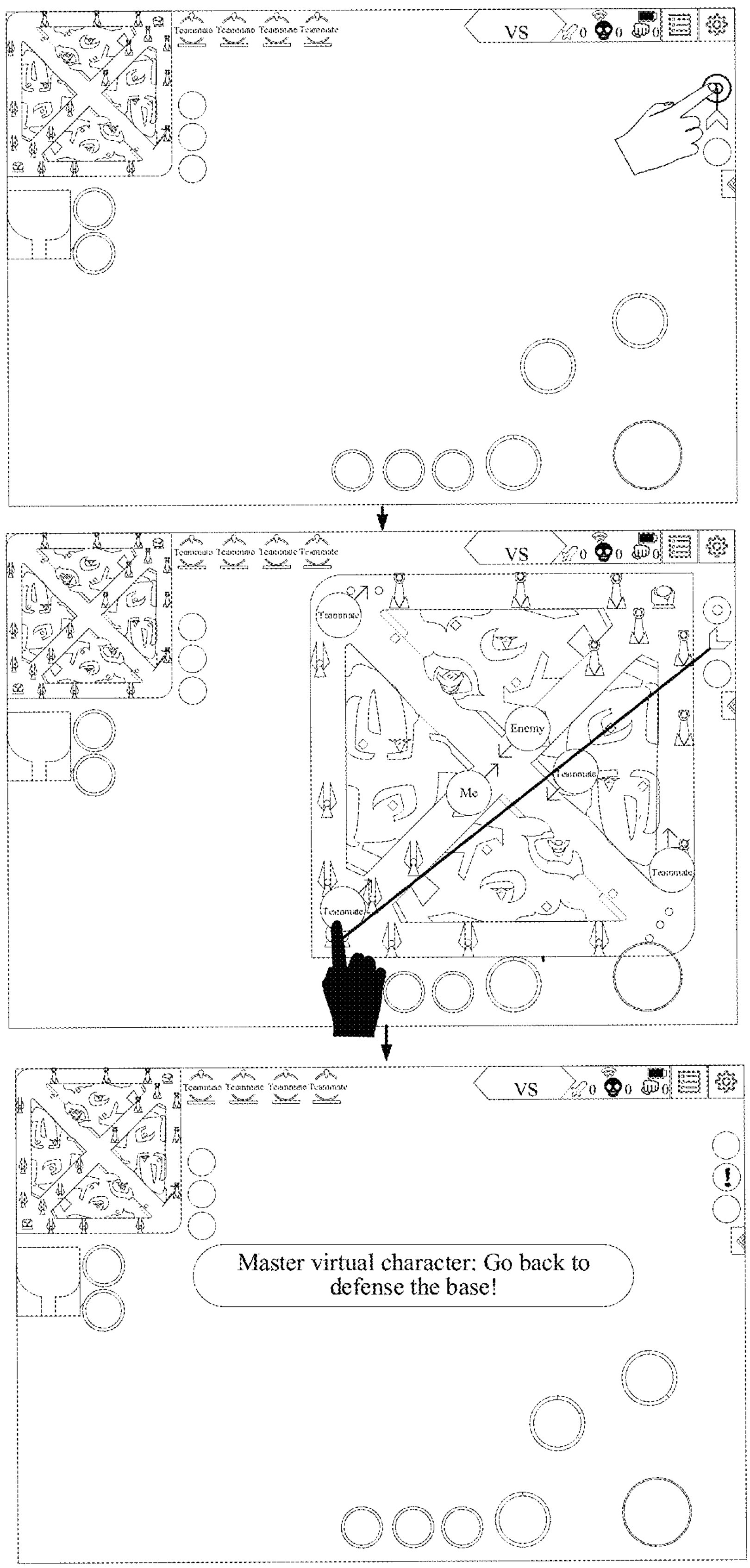
FIG. 36 is a schematic interface diagram of implementing the behavior tree according to the exemplary embodiment shown in FIG. 35.

For example, as shown in FIG. 36, a user applies a slide operation on a UI, a slide starting point of the slide operation being a signal button, and a slide end point of the slide operation being the base in our camp. The multiplayer online battle program determines the target prompt information as "Go back to defense the base" with reference to current battle information.

Target display element: a grass.

Figure 37:
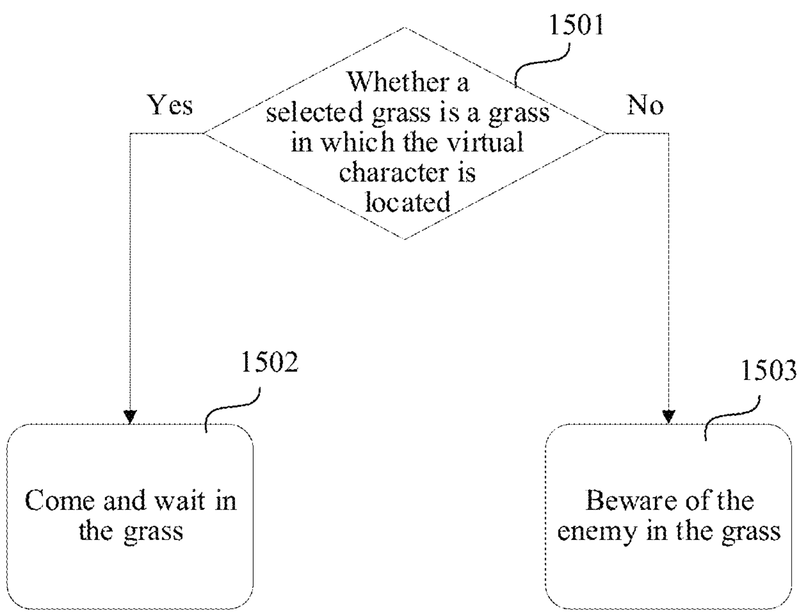
FIG. 37 is a flowchart of a behavior tree according to another exemplary embodiment of this application.

Referring to FIG. 37, the foregoing step 303 may be implemented into the following steps.

Step 1501. Determine whether a selected grass is a grass in which the virtual character is located.

Step 1502 is performed when the grass is the grass in which the virtual character is located. Step 1503 is performed when the grass is not the grass in which the virtual character is located.

Step 1502. Determine the target prompt information as "Come and wait in the grass".

Step 1503. Determine the target prompt information as "Beware of the enemy in the grass".

Target display element: a bone dragon.

Figure 38:
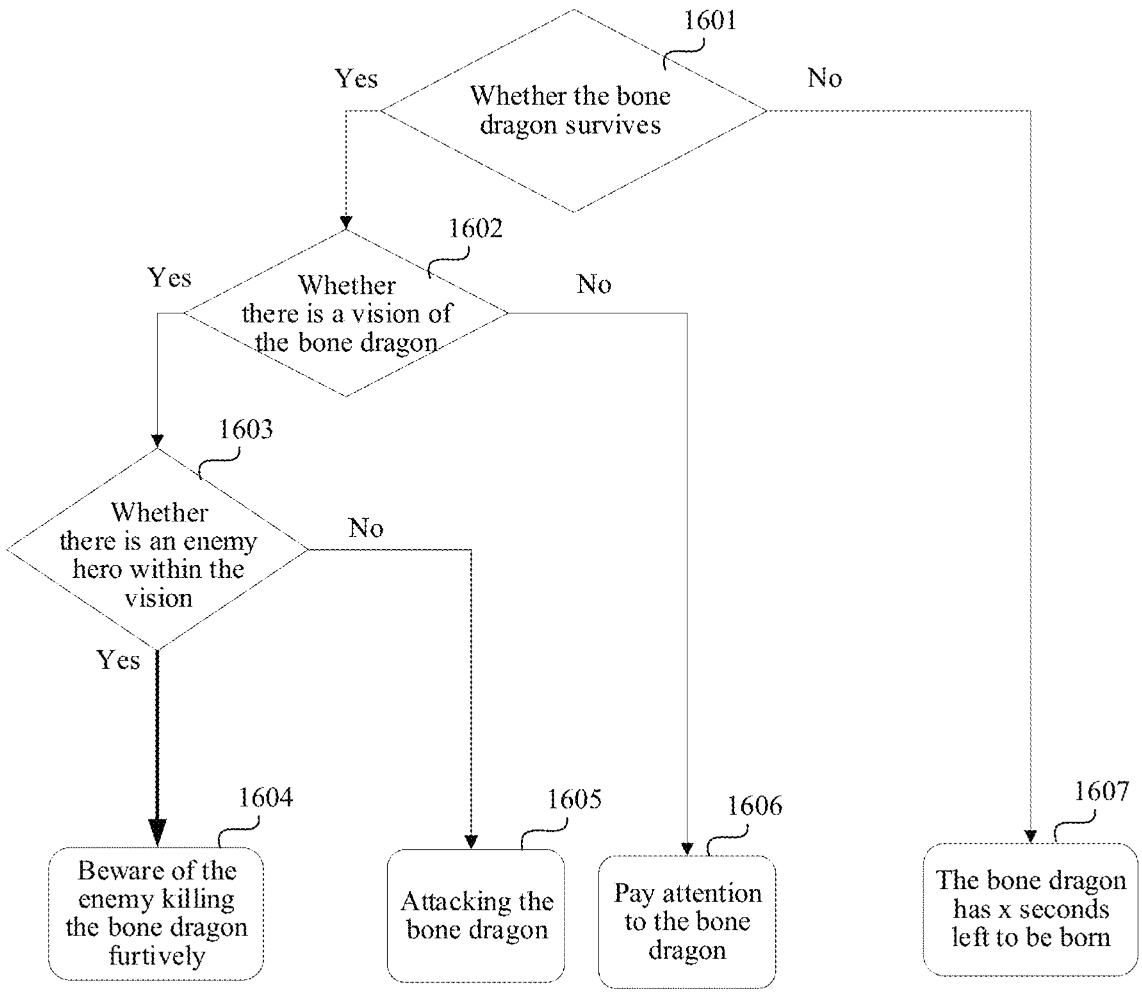
FIG. 38 is a flowchart of a behavior tree according to another exemplary embodiment of this application.

The bone dragon is also referred to as a little dragon, and is a monster located opposite to the big dragon on the riverway in some MOBA maps. Referring to FIG. 38, the foregoing step 303 may be implemented into the following steps.

Step 1601. Determine whether the bone dragon survives.

Step 1602 is performed when the bone dragon survives. Step 1607 is performed when the bone dragon does not survive.

Step 1602. Determine whether there is a vision of the bone dragon.

Step 1603 is performed when there is a vision of the bone dragon. Step 1606 is performed when there is no vision of the bone dragon.

Step 1603. Determine whether there is an enemy virtual character within the vision.

Step 1604 is performed when there is an enemy virtual character within the vision. Step 1605 is performed when there is no enemy virtual character within the vision.

Step 1604. Determine the target prompt information as "Beware of the enemy killing the bone dragon furtively".

Step 1605. Determine the target prompt information as "Attacking the bone dragon".

Step 1606. Determine the target prompt information as "Pay attention to the bone dragon".

Step 1607. Determine the target prompt information as "The bone dragon has x seconds left to be born".

Target display element: another region in a map viewing control.

Figure 39:
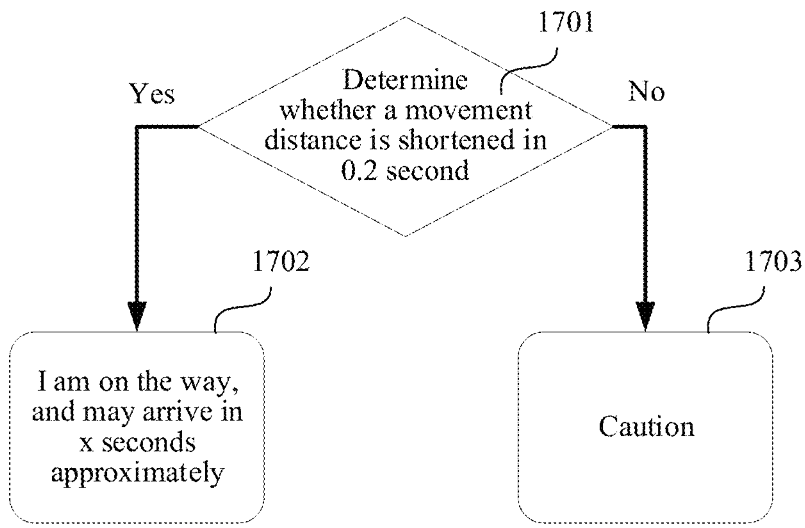
FIG. 39 is a flowchart of a behavior tree according to another exemplary embodiment of this application.

Referring to FIG. 39, the foregoing step 303 may be implemented into the following steps.

Step 1701. Determine whether a movement distance is shortened in 0.2 second.

Step 1702 is performed when the movement distance is shortened. Step 1703 is performed when the movement distance is not shortened.

Step 1702. Determine the target prompt information as "I am on the way, and may arrive in x seconds approximately".

Step 1703. Determine the target prompt information as "Caution".

In different embodiments, the foregoing display elements may be further extended, and are not limited to the foregoing limited display elements. The display elements include, but are not limited to, the following types.

In an example, the display elements further include three-dimensional models or two-dimensional elements used for decoration in a virtual environment.

Figure 40:
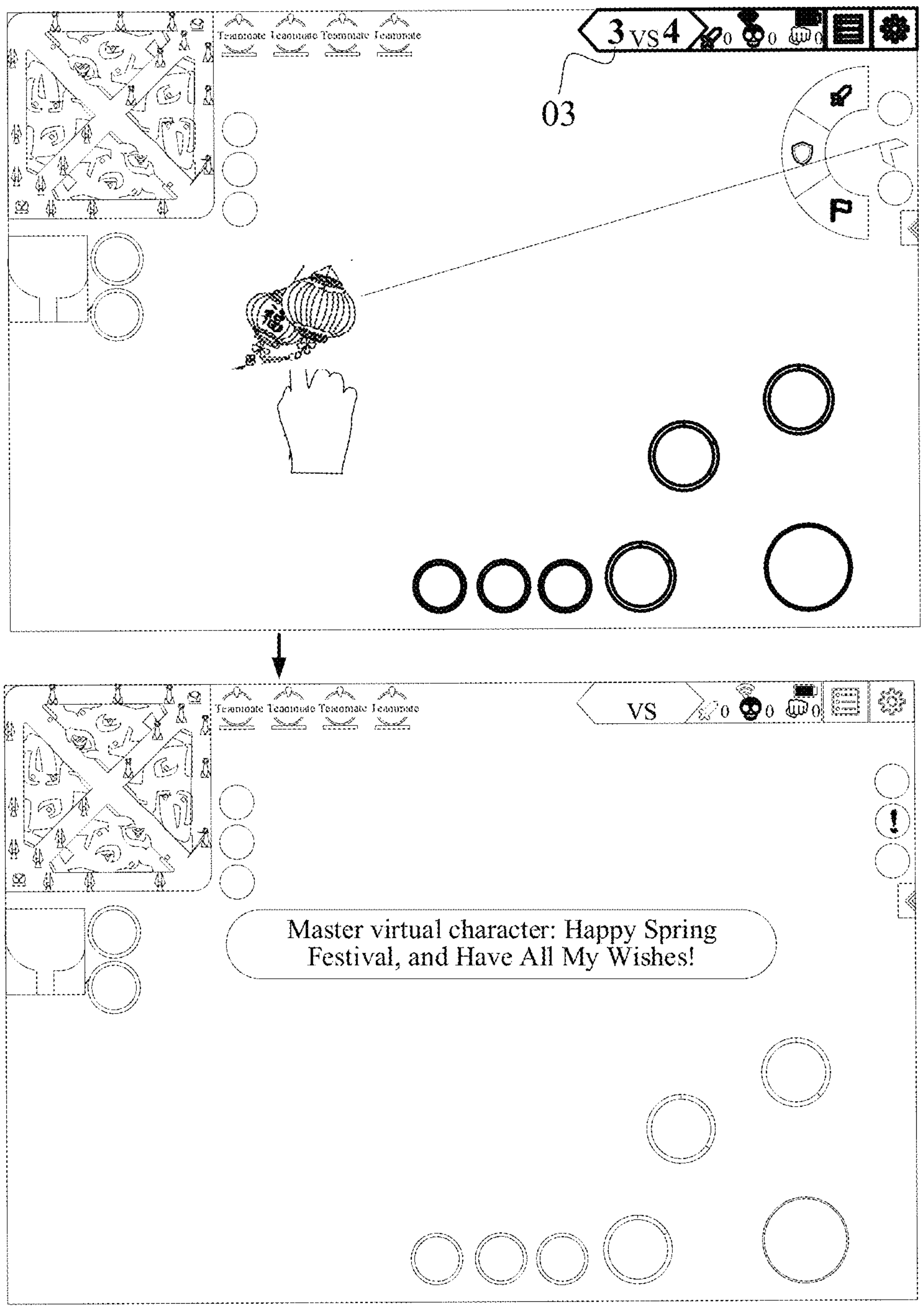
FIG. 40 is a schematic interface diagram of a schematic implementation of a method for transmitting prompt information in a multiplayer online battle program according to an exemplary embodiment.

As shown in FIG. 40, when there is a lantern element used for decoration in the virtual environment and a directional operation of a user points to the lantern element, target prompt information of "Happy Spring Festival, and Have All My Wishes!" is transmitted.

In an example, the display elements further include elements associated with a real world in the virtual environment.

Figure 41:
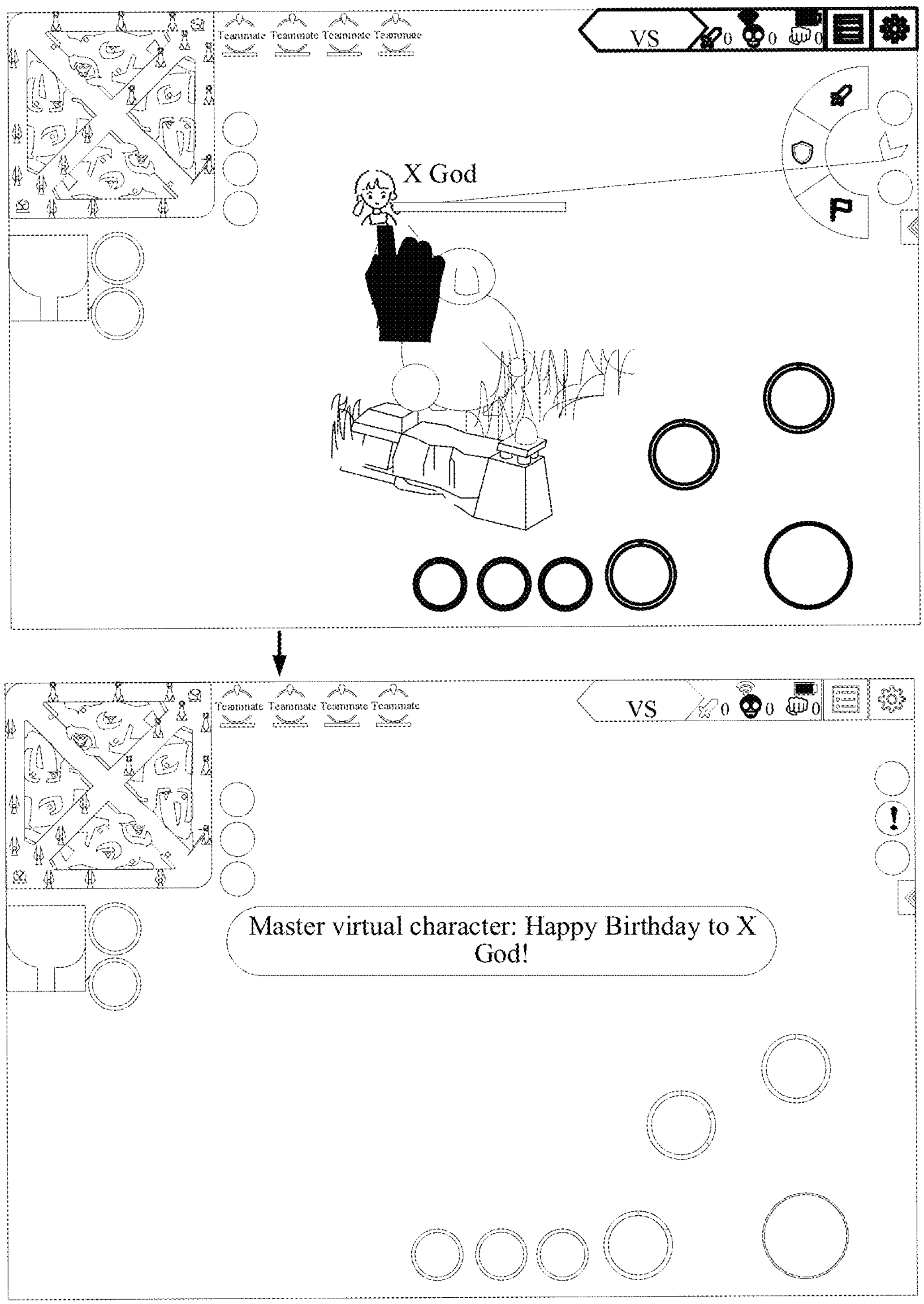
FIG. 41 is a schematic interface diagram of a schematic implementation of a method for transmitting prompt information in a multiplayer online battle program according to an exemplary embodiment.

As shown in FIG. 41, when an avatar "X God" of a user player exists above another virtual character in the virtual environment, and a directional operation of the user points to the avatar, and if it happens to be X God' birthday, target prompt information of "Happy Birthday to X God!".

In an example, the display elements further include elements associated with user accounts in the virtual environment.

Figure 42:
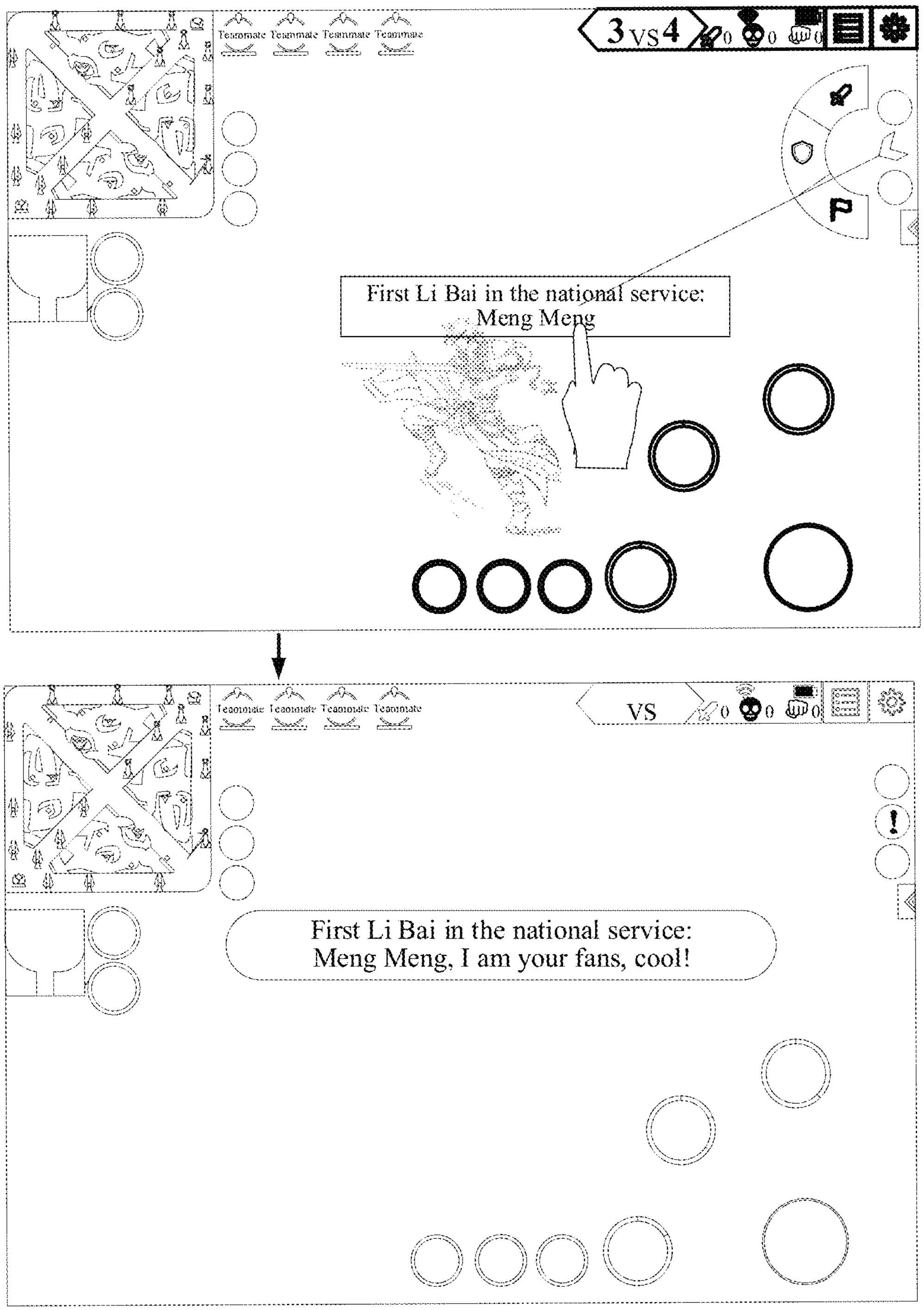
FIG. 42 is a schematic interface diagram of a schematic implementation of a method for transmitting prompt information in a multiplayer online battle program according to an exemplary embodiment.

As shown in FIG. 42, when a nickname "First Li Bai in the national service: Meng Meng" of a game anchor exists above the another virtual character in the virtual environment, and a directional operation of the user points to the nickname, target prompt information of "First Li Bai in the national service: Meng Meng, I am your fans, cool!" is transmitted.

In an example, the display elements further include elements associated with teams to which the user accounts belong in the virtual environment.

Figure 43:
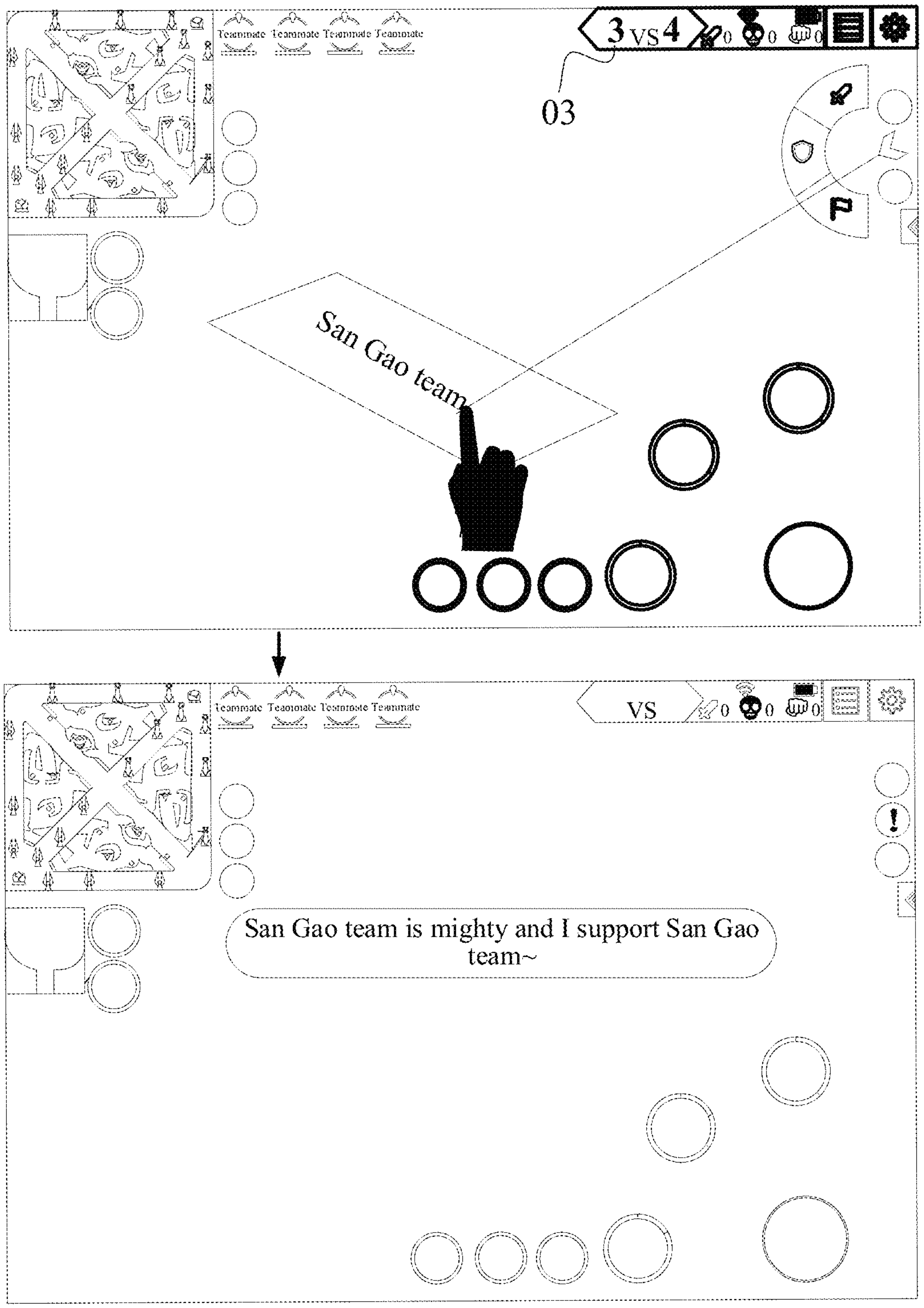
FIG. 43 is a schematic interface diagram of a schematic implementation of a method for transmitting prompt information in a multiplayer online battle program according to an exemplary embodiment.

As shown in FIG. 43, when there is a flag of a San Gao team on the ground of the virtual environment and a directional operation of a user points to the flag of the San Gao team, target prompt information of "San Gao team is mighty and I support San Gao team~" is transmitted.

In an example, the display elements further include prompt information transmitted by other user accounts.

Figure 44:
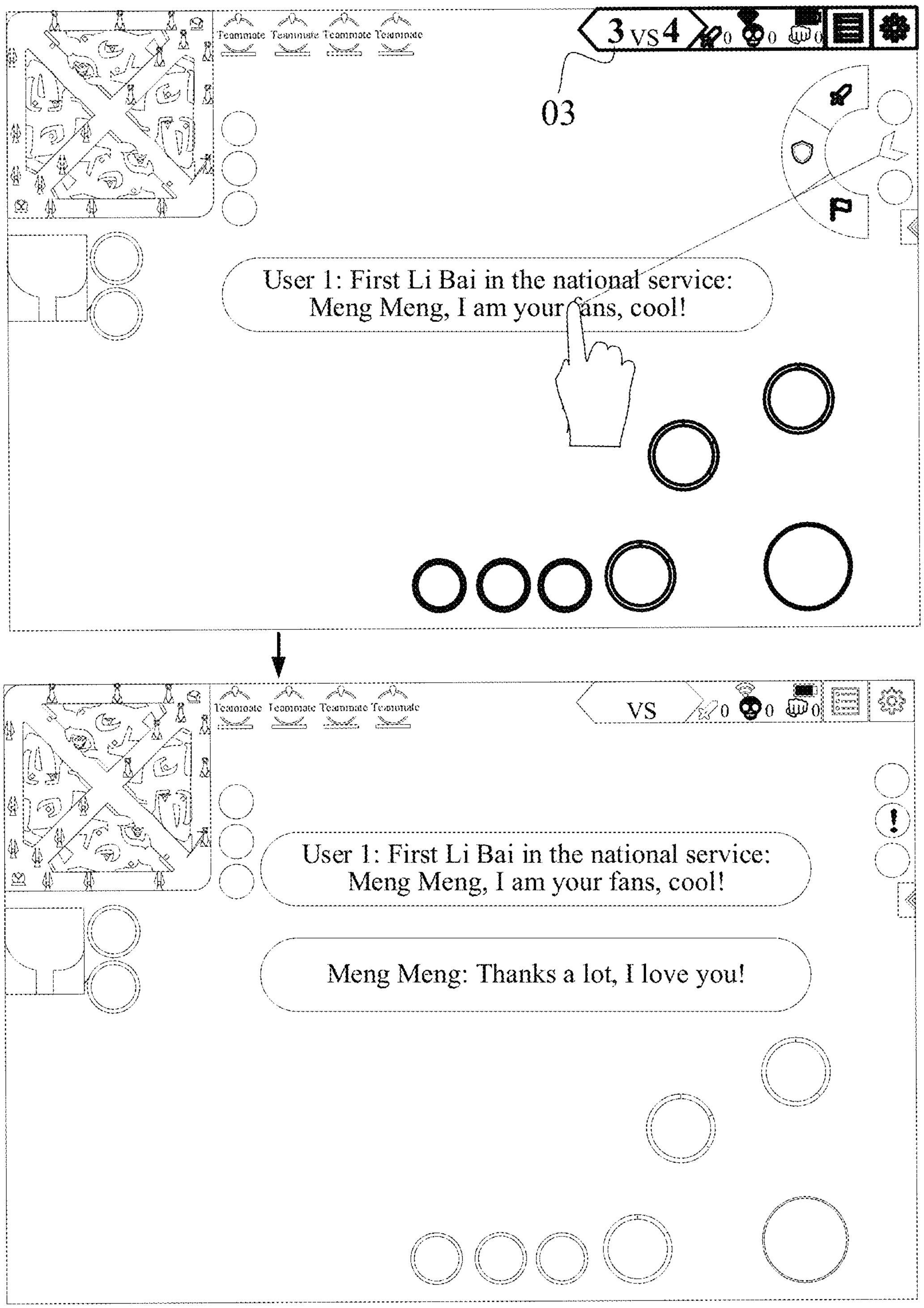
FIG. 44 is a schematic interface diagram of a schematic implementation of a method for transmitting prompt information in a multiplayer online battle program according to an exemplary embodiment.

As shown in FIG. 44, when prompt information of "First Li Bai in the national service: Meng Meng, I am your fans, cool!" transmitted by another user account exists on the ground of the virtual environment and a directional operation of a user points to the prompt information, target prompt information of "Thanks a lot, I love you!" is transmitted.

Figure 45:
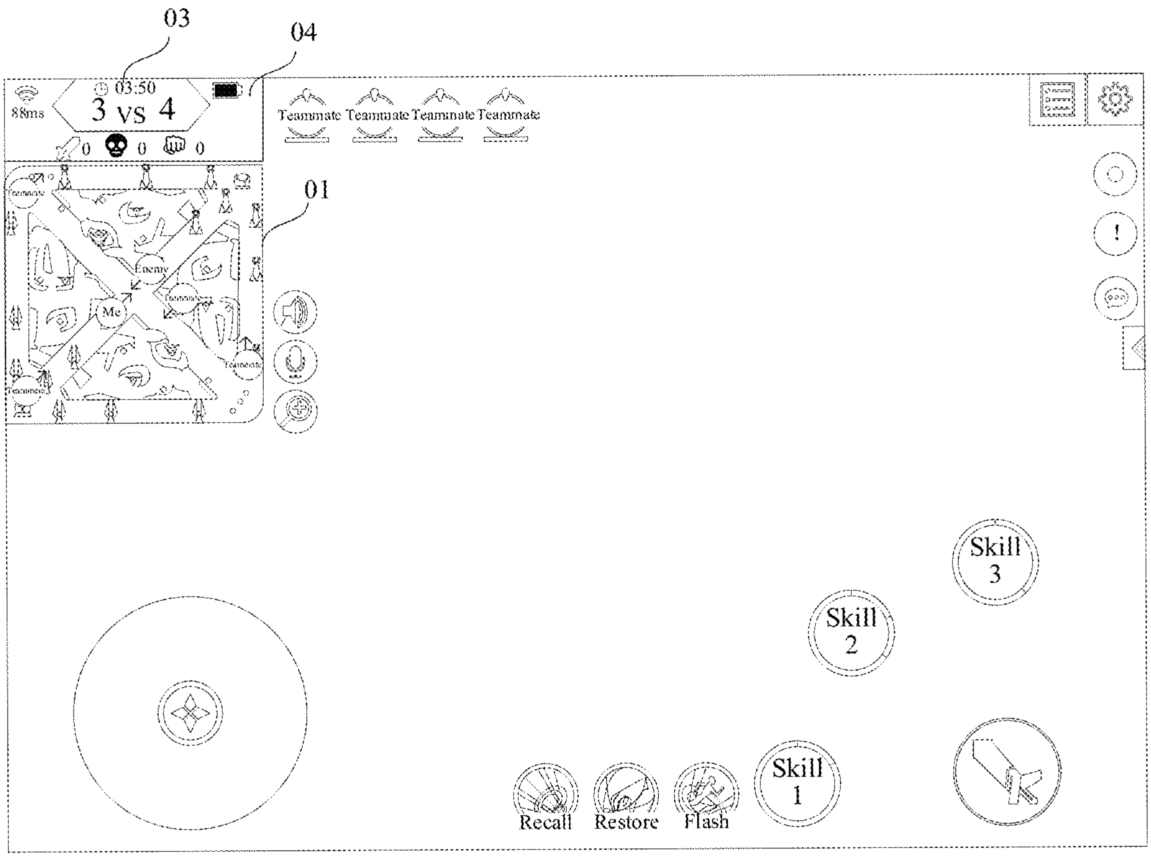
FIG. 45 is a schematic interface diagram of setting a directional operation by using the method for transmitting prompt information in a multiplayer online battle program according to an exemplary embodiment.

Arrangement positions of the display elements in the HUD region in the foregoing embodiments are variable. In an example shown in FIG. 45, the scoreboard 03 and the device information region and master virtual character score region 04 are disposed at an upper region of the minimap control 01 located at a left side. In different embodiments, more or fewer display elements may exist in the HUD region, and this may be easily considered by a person skilled in the related art based on the foregoing embodiments, and details are not repeated herein.

Figure 46:
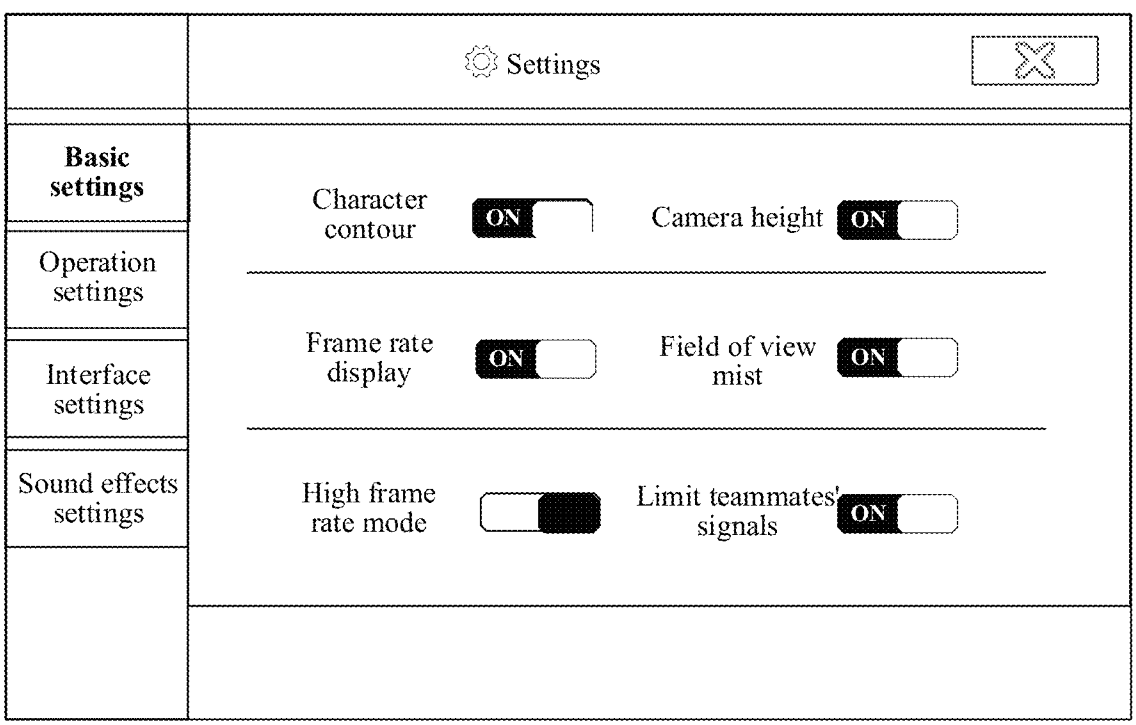
FIG. 46 is a schematic interface diagram of setting a directional operation by using the method for transmitting prompt information in a multiplayer online battle program according to an exemplary embodiment.

In an example, the prompt information transmission function may be enabled by a user manually. That is, the user manually controls whether to enable the prompt information transmission function. In another example, a prompt information receiving function may be also enabled by a user manually. As shown in FIG. 46, in a "basic settings" panel in a "settings" interface, a setting option of "limit teammates' signals" is provided. In a case that the setting option of "limit teammates' signals" is enabled, a current client does not display prompt information transmitted by clients of other teammates any more.

Figure 47:
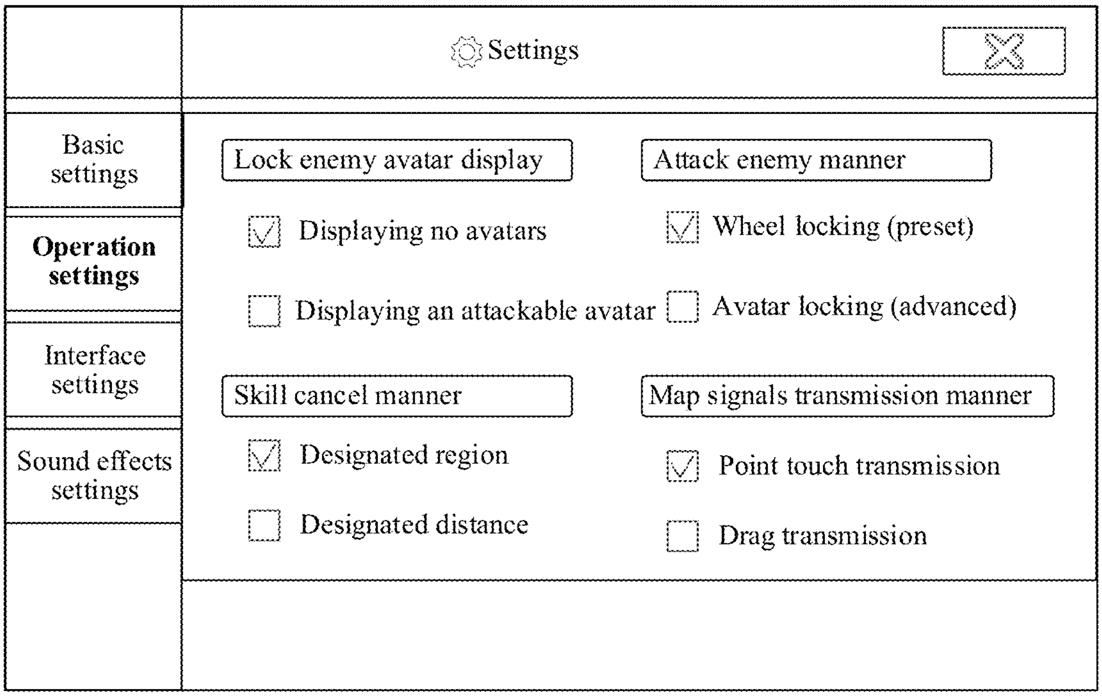
FIG. 47 is a schematic interface diagram of setting a directional operation by using the method for transmitting prompt information in a multiplayer online battle program according to an exemplary embodiment.

In an example, a triggering manner of the directional operation may be enabled by a user manually. As shown in FIG. 47, in an "operation settings" panel in a "settings" interface, a setting option of "map signals transmission manners" is provided. When the user checks a "point touch transmission" manner, the triggering manner shown in FIG. 6 is adopted. When the user checks a "sliding transmission" manner, the triggering manner shown in FIG. 8 is adopted.

The foregoing prompt information may be not only transmitted to friendly users or all users, but also may be displayed in a local client. Therefore, this application further provides the following embodiment.

Figure 48:
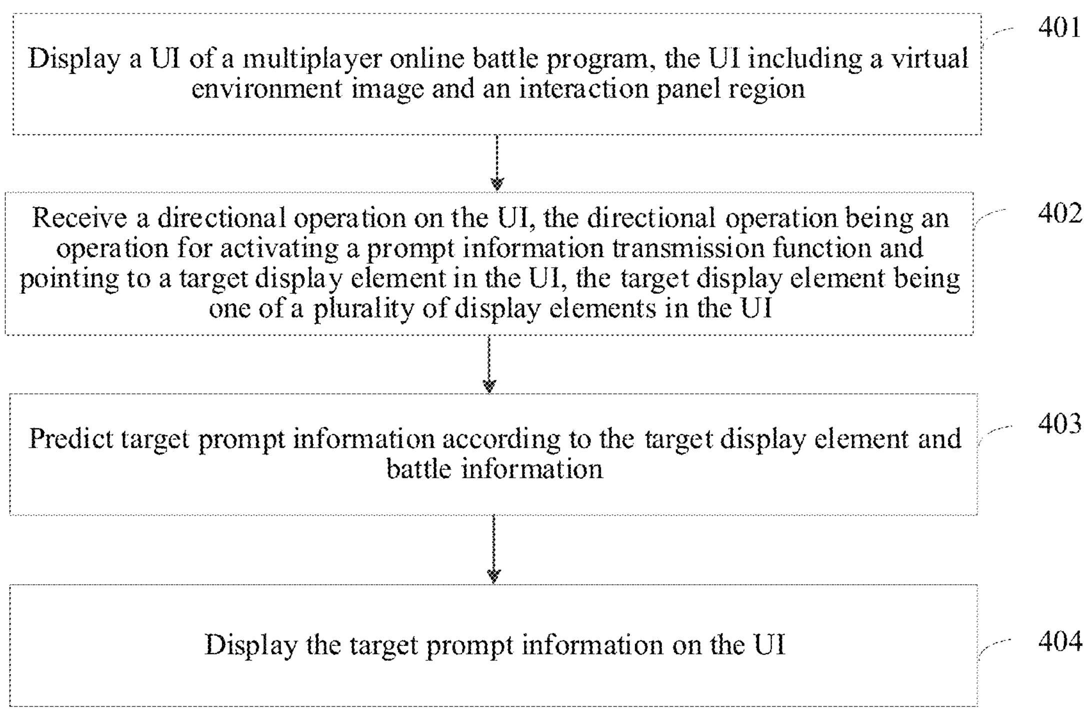
FIG. 48 is a method flowchart of a method for displaying prompt information in a multiplayer online battle program according to an exemplary embodiment.

FIG. 48 is a flowchart of a method for displaying prompt information according to an exemplary embodiment of this application. The method may be performed by any terminal in FIG. 1, and the method includes the following steps.

Step 401. Display a UI of a multiplayer online battle program.

The multiplayer online battle program is a program that provides at least two users to control virtual characters to battle in a virtual environment. The virtual environment is a battle environment configured for at least two virtual characters to battle. The multiplayer online battle program may be any one of a military simulation program, a MOBA game, a battle royale shooting game, and an SLG. In this embodiment, an example in which the multiplayer online battle program is a MOBA game is used for description.

In an example, as shown in FIG. 4, the UI 30 of the multiplayer online battle program includes a virtual environment image 32 and an interaction panel region 34.

The virtual environment image 32 is an image of the virtual environment observed from a perspective corresponding to a master virtual character 36. The master virtual character is a virtual character controlled by a user using the terminal in the virtual environment. The perspective corresponding to the master virtual character may be any one of a first-person perspective, a 45° bird's-eye view, a third-person perspective, and an over-shoulder perspective of the master virtual character. An example uses the 45° bird's-eye view for description in this embodiment.

When the master virtual character 36 moves or rotates, the virtual environment image changes accordingly. The master virtual character 36 may appear in the virtual environment image or may not appear in the virtual environment image.

The interaction panel region 34 is a UI element superimposed on the virtual environment image 32. The interaction panel region 34 is divided into two types: information display elements used for displaying information and control function elements used for man-machine interaction. The interaction panel region 34 is also referred to as a HUD region. For example, as shown in FIG. 5, the HUD region 34 includes:

a minimap region 01, a friend information region 02, a scoreboard 03, a device information region and master virtual character score region 04, a menu region 05, a minimap region extension button 06, a button control 07, a chatting control 08, skill buttons 09 of the master virtual character, an attack skill button 10 of the master virtual character, a summoner ability 11, a restore skill 12, a recall skill 13, a moving control 14, a gold coin region 15, and recommended equipment 16.

The friend information region 02, the scoreboard 03, and the device information region and master virtual character score region 04 are the information display elements, and the other elements are the control function elements. The interaction panel region 34 may include other elements, such as a death panel, a turret-attacking button, and a creep-attacking button, which is not limited in the embodiments.

After a user starts a round of battle, the UI of the multiplayer online battle program is displayed.

Step 402. Receive a directional operation on the UI, the directional operation being an operation for activating a prompt information transmission function and pointing to a target display element in the UI.

When the user needs to transmit prompt information, the user applies the directional operation on the UI. The directional operation may be a user operation, or may be an operation combination formed by two or more user operations.

The directional operation is an operation for activating a prompt information transmission function and pointing to a target display element in the UI. The target display element is one of a plurality of display elements in the UI. In an example, the directional operation is an operation of a double-tap, a triple-tap, or a long-pressing on the target display element. In another example, the interaction panel region includes a signal control. The directional operation is an operation pointing from the signal control to a target display element in the UI. The signal control is a control for activating the prompt information transmission function.

The plurality of display elements in the UI include, but are not limited to, at least one of the following elements.

1. Three-dimensional models forming battle function elements (non-decorative elements and non-visual presentation elements) in the virtual environment.

For example, the battle function elements are elements that influence the battle process in the virtual environment. The three-dimensional models include, but are not limited to: virtual characters, turrets, bases, monsters, grass, detection eyes, a big dragon, a small dragon, and the like.

2. The information display elements in the interaction panel region.

For example, the information display elements include: the friend information region 02, the scoreboard 03, the device information region and master virtual character score region 04, and the death panel not shown in FIG. 5.

3. The control function elements in the interaction panel region.

For example, the control function elements include: the minimap region 01, the minimap extension button 06, the button control 07, the chatting control 08, the skill buttons 09 of the master virtual character, the attack skill button 10 of the master virtual character, the summoner ability 11, the moving control 14, the gold coin region 15, and the recommended equipment 16.

For example, the control function elements further include a fast signal button. The fast signal button includes, but is not limited to an attack button, a retreat button, and an assembly button (not shown in FIG. 5).

Step 403. Predict target prompt information according to the target display element and battle information.

The target display element is a display element selected by the directional operation. The battle information is battle situation information during a round of battle. The battle information includes, but is not limited to the following: a started duration of this round of battle, levels of virtual characters, skill upgrade information, skill cooldown information, summoner ability types, health points (HP) of the virtual characters, HP of turrets, a position relationship between the virtual characters and grass, creep line situations, monsters refresh situations, network information, teammate positions, enemies positions, kill information, death information, date information, festival information, location information, matches information, and camp names of camps.

For example, the prompt information is information for performing an information prompt for the teammates, the enemies, or all the virtual characters. A form of the prompt information includes, but is not limited to at least one of text, voices, icons, animation, and vibration feedback. In an example, the prompt information includes information of two types: fact information and intention information. The fact information is information representing existing facts in a current battle, for example, a monster is refreshed, a turret is being attacked, I see an enemy, and the like. The intention information is information representing a strategy intention of the user, for example, pay attention to pushing the creep line on the top lane, beware of ambush in the grass, the economy is so poor and we need to grow, and the like.

Step 404. Display the target prompt information on the UI.

A client displays the target prompt information on the UI of its own. For example, the client displays the target prompt information at a left side region, a central region, or a right side region of the UI.

In some embodiments, when a display duration of the target prompt information reaches a display threshold, the display of the target prompt information is canceled. For example, the display of the target prompt information is canceled in a blanking manner.

This embodiment may be implemented independently, or may be implemented in combination with the foregoing embodiments, and this is not limited in this application.

In some embodiments, the foregoing client (multiplayer online battle program) may be alternatively a program such as a shooting game, a racing game, a battle royale game, or a military simulation program. The client may support at least one operating system of a Windows operating system, an Apple operating system, an Android operating system, an iOS operating system, and a LINUX operating system, and clients on different operating systems may be connected to and communicate with each other. In some embodiments, the foregoing client is a program adapted to a mobile terminal having a touchscreen.

Figure 49:
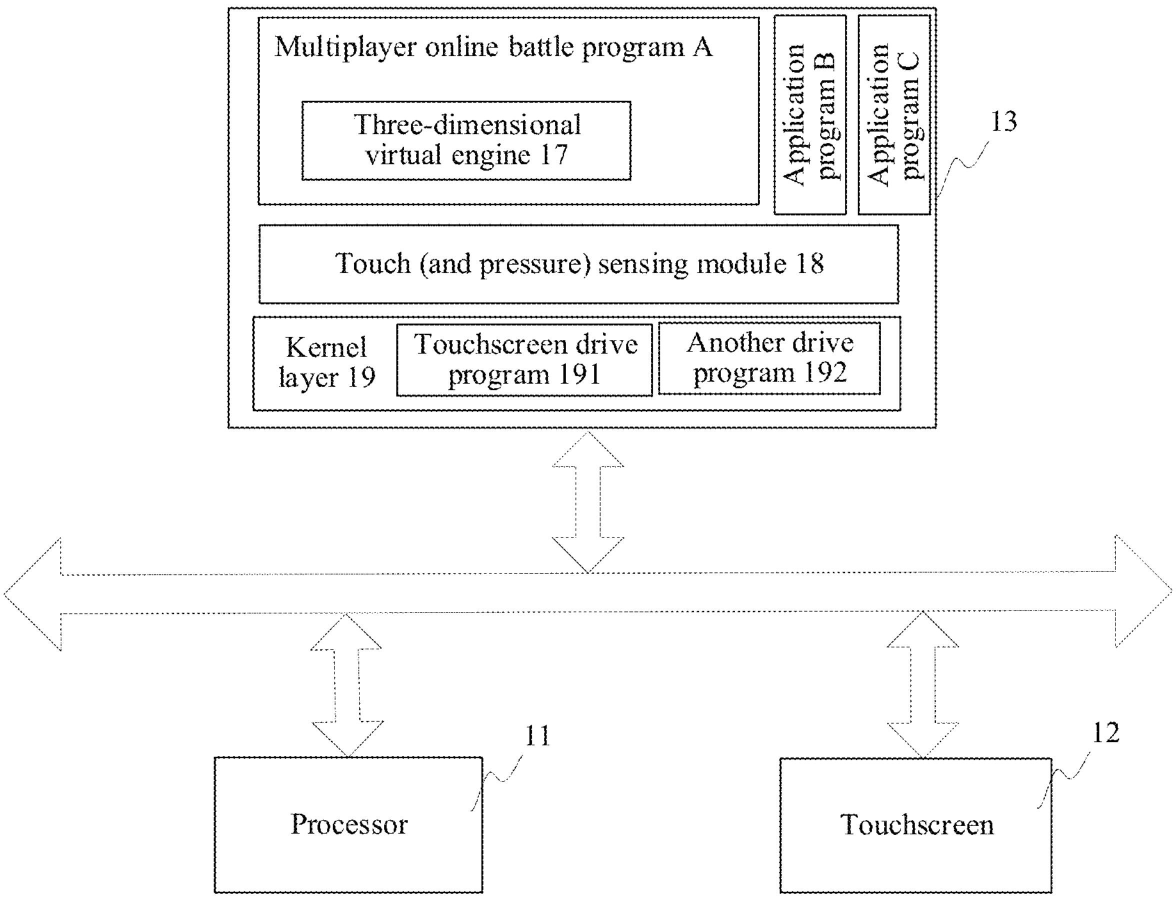
FIG. 49 is a block diagram of a terminal according to an exemplary embodiment of this application.

In some embodiments, the foregoing client is an application program developed based on a three-dimensional engine. For example, the three-dimensional engine is a Unity engine. FIG. 49 is a schematic structural diagram of a terminal according to an exemplary embodiment of this application. As shown in FIG. 49, the terminal includes a processor 11, a touchscreen 12, and a memory 13.

The processor 11 may be at least one of a single-core processor, a multi-core processor, an embedded chip, and a processor having an instruction running capability.

The touchscreen 12 includes a pressure sensing touchscreen. The pressure sensing touchscreen may measure pressing strength on the touchscreen 12.

The memory 13 stores programs executable by the processor 11. Schematically, the memory 13 stores a multiplayer online battle program A, an application program B, an application program C, a touch and pressure sensing module 18, and a kernel layer 19 of an operating system. The multiplayer online battle program A is an application program developed based on a three-dimensional virtual engine 17. In some embodiments, the multiplayer online battle program A includes, but is not limited to at least one of a game program, a virtual reality (VR) program, a three-dimensional map program, and a three-dimensional demonstration program that are developed by the three-dimensional virtual engine 17. In an example, when an operating system of the terminal is an Android operating system, the multiplayer online battle program A develops by using Java programming language and C #language. In another example, when an operating system of the terminal is an iOS operating system, the multiplayer online battle program A develops by using Object-C programming language and C #language.

The three-dimensional virtual engine 17 is a three-dimensional interactive engine supporting a plurality of operating system platforms. Schematically, the three-dimensional virtual engine may be applied to program development in a plurality of fields such as the game development field, the VR field, and the three-dimensional map field. A specific type of the three-dimensional virtual engine 17 is not limited in this embodiment of this application. An example in which the three-dimensional virtual engine 17 is a Unity engine is used in the following embodiment for description.

The touch (and pressure) sensing module 18 is a module configured to receive a touch event (and a pressure touch and control event) reported by a touchscreen drive program 191. The touch event includes a type and coordinate values of the touch event. The type of the touch event includes, but is not limited to a touch start event, a touch moving event, and a touch drop event. The pressure touch and control event includes a pressure value and coordinate values of the pressure touch and control event. The coordinate values are configured for indicating a touch and control position of a pressure touch and control operation on a display screen. In some embodiments, an x-axis is established in a horizontal direction of the display screen and a y-axis is established in a vertical direction of the display screen, and therefore, a two-dimensional coordinates system is obtained.

Schematically, the kernel layer 19 includes the touchscreen drive program 191 and another drive program 192. The touchscreen drive program 191 is a module configured to detect a pressure touch and control event. When detecting the pressure touch and control event, the touchscreen drive program 191 transfers the pressure touch and control event to the pressure sensing module 18.

The another drive program 192 may be a drive program related to the processor 11, a drive program related to the memory 13, a drive program related to a network component, a drive program related to a sound component, or the like.

A person skilled in the art may learn that the foregoing is only an overview of a structure of the terminal. In different embodiments, the terminal may have more or fewer components. For example, the terminal may further include a gravity acceleration sensor, a gyroscope sensor, a power supply, and the like.

Figure 50:
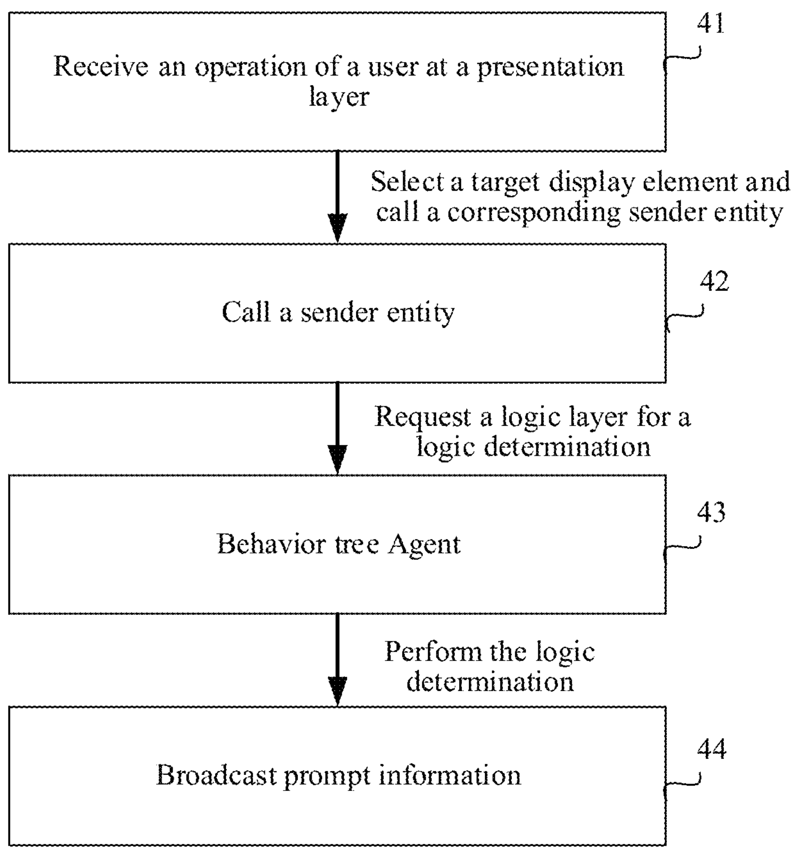
FIG. 50 is a method flowchart of a method for transmitting prompt information in a multiplayer online battle program according to an exemplary embodiment.

As shown in FIG. 50, the foregoing prompt information transmission function in a code implementation may be divided into four steps.

Step 41. Receive an operation of a user at a presentation layer.

The presentation layer is a layer at which the UI is located. Using a mobile terminal having a touchscreen as an example, a client receives a touch operation of the user at the presentation layer.

The client selects a target display element and calls a corresponding sender entity according to the touch operation. The foregoing memory 13 stores base classes used for implementing the foregoing prompt information transmission function.

Figure 51:
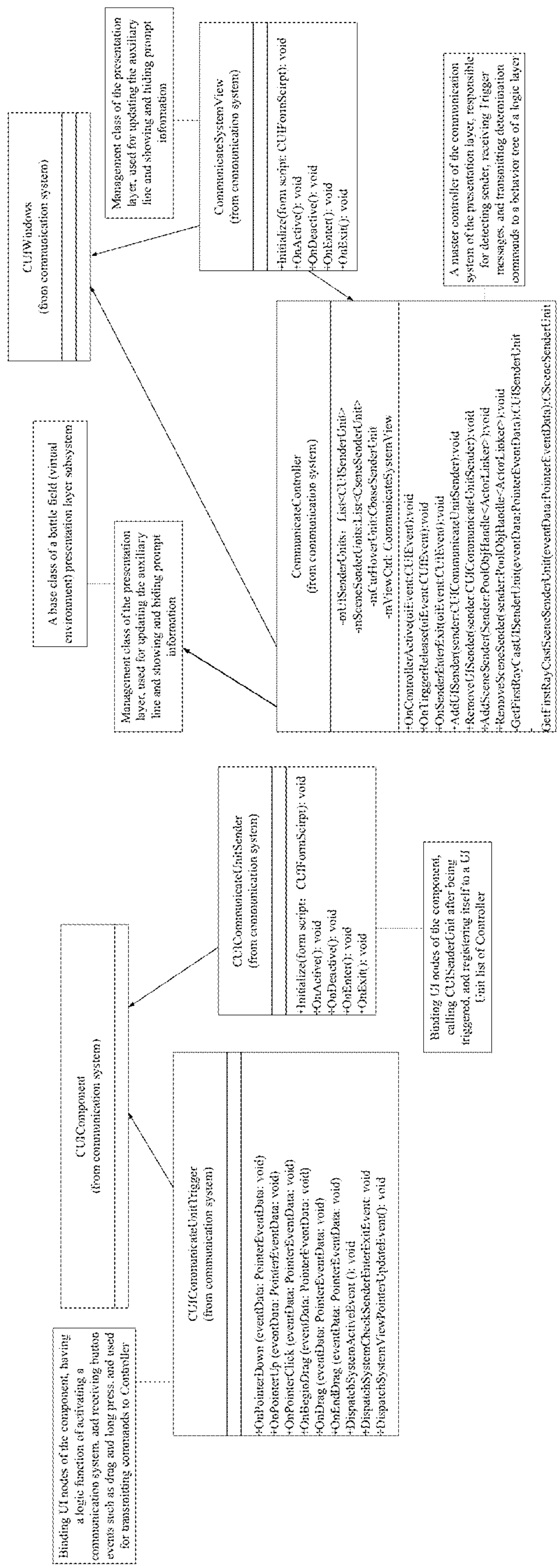
FIG. 51 is a relationship diagram of code classes according to an exemplary embodiment.

An interaction procedure control of the entire presentation layer may generally describe behaviors of a user as that the user performs a directional operation (drag, release, and tap) on the UI, activates a prompt information transmission function, and transmits prompt information. Different interaction control entities may be abstracted according to operation behaviors of the user. As shown in FIG. 51, CUICommunicateUnitTrigger: It is responsible for receiving a directional operation such as a long press operation, a drag operation, a release operation, and the like of the user, and acts as a trigger of the prompt information transmission function and plays a role of transmitting messages to a master controller.

CommunicateController: It acts as the master controller, and is responsible for receiving the messages transmitted from the CUICommunicateUnitTrigger and executing corresponding procedures;

CommunicateSystemView: It is responsible for controlling displays of some basic UI in the prompt information transmission function, for example, updating an auxiliary line (or a movement route); and CUICommunicateUnitSender: It is responsible for identifying an entity that transmits prompt information, and behaviors of the CUICommunicateUnitSender is driven by the CommunicateController.

Step 42. Call a sender entity.

Figure 52:
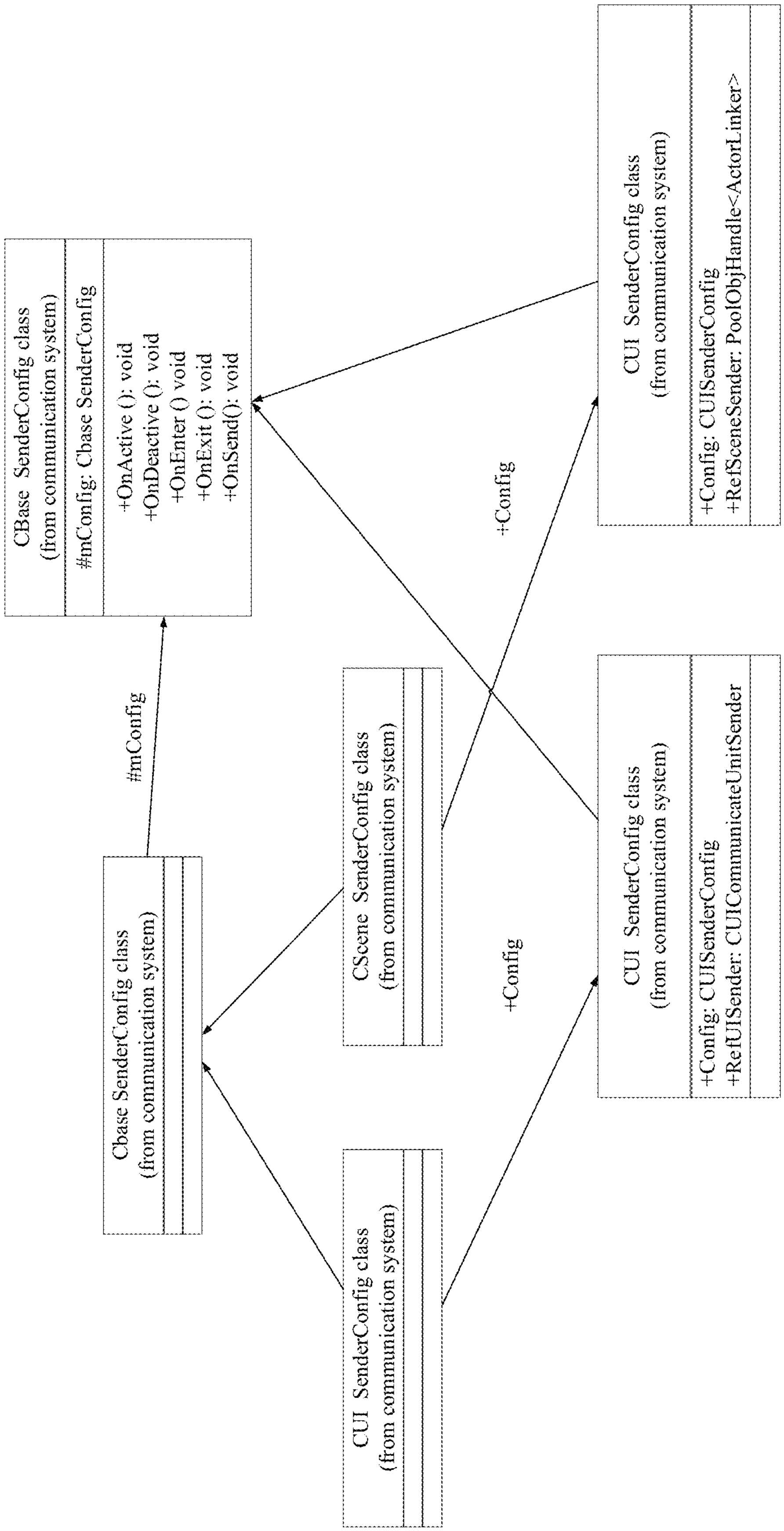
FIG. 52 is a relationship diagram of code classes according to another exemplary embodiment.

As shown in FIG. 52, the memory 13 stores a unit base class CBaseSenderUnit used for triggering to transmit a signal, and several functions (OnActive, OnDeactive, OnEnter, OnExit, and OnSend) defined by the unit base class CBaseSenderUnit are all virtual functions, and derived classes of the functions are used for implementing a specific transmission behavior of a prompt signal. In an exemplary round of battle, display elements that can trigger prompt information may be classified into two types: three-dimensional battle field elements in a three-dimensional virtual environment and two-dimensional UI elements on a HUD region. In the code implementation, the two types of objects (the three-dimensional battle field elements and the two-dimensional UI elements) may be abstracted. When the user operates, entities of different types perform corresponding logic behaviors respectively.

For an exemplary reference, when the directional operation determines the three-dimensional battle field element as a target display element, a logic behavior of calling a sender entity unit CSceneSenderUnit of the three-dimensional battle field element is triggered. When the directional operation determines the two-dimensional UI element as a target display element, a logic behavior of calling a sender entity unit CUISenderUnit of the two-dimensional UI element is triggered. Other logic behaviors may be derived from the two logic behaviors, for example, a minimap signal sender entity unit CUIMinimapSenderUnit inherited from the CUISenderUnit When the directional operation determines a minimap (or a middle map) element as a target display element, a logic behavior of calling the minimap signal sender entity unit CUIMinimapSenderUnit is triggered.

Step 43. Call a behavior tree to perform a logic determination.

When a player performs a directional operation (sliding/releasing/tapping) on the target display element, the logic determination needs to be performed with reference to real-time battle situation information to determine specific transmitted target prompt information. The logic determination involves a large quantity of logic branches of "if-else", and reference may be made to the behavior trees mentioned in the foregoing embodiments. A code implementation of the behavior tree may refer to a behavior tree behavior of an open source component.

Step 44. Broadcast prompt information.

In an example, the client transmits a frame synchronization signal to a server, the frame synchronization signal carrying the target prompt information. The server transmits the frame synchronization signal to other clients corresponding to the teammate virtual characters (the master virtual character itself is included optionally) of the master virtual character. Alternatively, the server transmits the frame synchronization signal to other clients of all the virtual characters in the battle. The other clients display or play the target prompt information according to the frame synchronization signal.

Technical improvements of this application bring an innovative design direction of a mobile game combat communication system that breaks through conventional mobile terminals, which has great growth, plasticity, and expansion. Every game of mobile terminals involving fierce battle situations has different degrees of appeal for effects of this system. In addition, a manner of "simple interaction+intelligent determination" enables the user to implement very intelligent teammates communication effects in a very simple man-machine interaction manner.

Apparatus embodiments of this application are described below, where the apparatus embodiments correspond to the foregoing method embodiments. For a part that is not described in detail in the apparatus embodiments, refer to the foregoing method embodiments.

Figure 53:
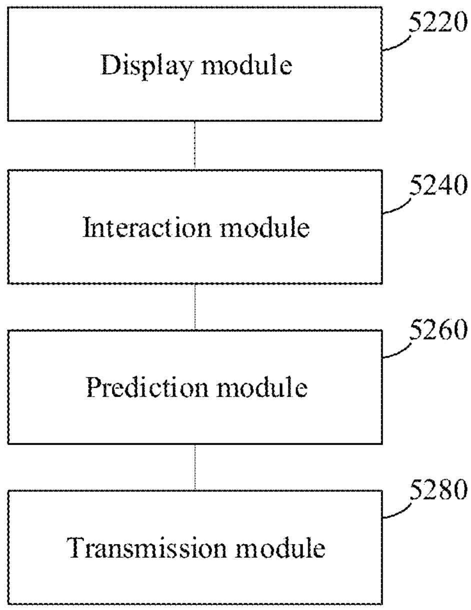
FIG. 53 is a block diagram of an apparatus for transmitting prompt information in a multiplayer online battle program according to an exemplary embodiment of this application.

FIG. 53 is a block diagram of an apparatus for transmitting prompt information in a multiplayer online battle program according to an exemplary embodiment of this application. The apparatus may be implemented as an entire terminal or a part of a terminal by using software, hardware, or a combination thereof. The apparatus includes:

a display module 5220, configured to display a UI of the multiplayer online battle program;

an interaction module 5240, configured to receive a directional operation on the UI, the directional operation being an operation for activating a prompt information transmission function and pointing to a target display element in the UI, the target display element being one of a plurality of display elements in the UI;

a prediction module 5260, configured to predict target prompt information according to the target display element and battle information; and a transmission module 5280, configured to transmit the target prompt information to clients of teammate virtual characters of a master virtual character or all virtual characters in a battle.

In some embodiments, the UI includes an interaction panel region, the interaction panel region including a signal control; and the directional operation is an operation pointing from the signal control to a target display element in the UI. In some embodiments, the signal control includes a button control; the directional operation includes a first touch operation and a second touch operation;

the interaction module 5240 is configured to receive a first touch operation applied on the button control on the UI;

the display module 5220 is configured to display one or more candidate display elements on the UI; and the interaction module 5240 is configured to receive the second touch operation applied on the target display element on the UI.

In some embodiments, the display module 5220 is configured to display the one or more candidate display elements on the UI in a highlight manner, the highlight manner including at least one of the following display manners: a target color display manner, an overlay masking display manner, a highlight display manner, and a contour display manner.

In some embodiments, the signal control includes a button control; the directional operation includes a slide operation; and the interaction module 5240 is configured to receive a slide operation on the UI, a slide starting point of the slide operation being the button control, and a slide end point of the slide operation being the target display element.

In some embodiments, the display module 5220 is further configured to display an auxiliary line or a movement route pointing from the slide starting point to the slide end point on the UI when the slide operation is received on the button control.

In some embodiments, the signal control includes a map expansion control; the directional operation includes a third touch operation and a fourth touch operation;

the interaction module 5240 is configured to receive the third touch operation applied on the map expansion control on the UI;

the display module 5220 is configured to display a map viewing control of a virtual environment on the UI according to the third touch operation; and the interaction module 5240 is configured to receive the fourth touch operation applied on the target display element on the map viewing control.

In some embodiments, the UI includes a virtual environment image and an interaction panel region, the virtual environment image being an image of a virtual environment observed from a perspective corresponding to a master virtual character, the virtual environment being a battle environment configured for at least two virtual characters to battle; and the display elements include at least one of the following elements:

three-dimensional models or two-dimensional elements forming battle function elements in the virtual environment;

information display elements in the interaction panel region; and control function elements in the interaction panel region.

In some embodiments, the display elements further include at least one of the following elements:

three-dimensional models or two-dimensional elements used for decoration in the virtual environment;

elements associated with a real world in the virtual environment;

elements associated with user accounts in the virtual environment; and elements associated with teams to which the user accounts belong in the virtual environment.

In some embodiments, the display elements further include at least one of the following elements:

prompt information transmitted by other user accounts.

In some embodiments, the prediction module 5260 is configured to query a behavior tree for the target prompt information according to the target display element and the battle information.

the behavior tree including a correspondence between the display elements, the battle information, and the prompt information.

In some embodiments, the target display element includes skill class display elements; the battle information includes a skill availability status; and the prediction module 5260 is configured to determine, when the target display element is the skill class display element and a skill availability status corresponding to the target display element is unavailable, first target prompt information used for indicating that a skill is unavailable; and determine, when the target display element is the skill class display element and a skill availability status corresponding to the target display element is available, second target prompt information used for indicating that a skill is available.

In some embodiments, the target display element includes skill class display elements; the battle information includes a skill CD time; and the prediction module 5260 is configured to determine, when the target display element is the skill class display element and a skill CD time corresponding to the target display element is valid, third target prompt information used for indicating the skill CD time.

In some embodiments, the target display element includes resource class display elements; the battle information includes vision information of the resource class display element; and the prediction module 5260 is configured to determine, when the target display element is the resource class display element and the vision information corresponding to the target display element has vision of an enemy, fourth target prompt information used for indicating that the enemy is obtaining the resource.

In some embodiments, the target display element includes resource class display elements; the battle information includes refresh information of the resource class display element; and The prediction module 5260 is configured to determine, when the target display element is the resource class display element and the refresh information is valid, fifth target prompt information used for indicating a remaining refresh time of the resource class display element.

In some embodiments, the target display element includes virtual character class display elements; the battle information includes a state of the virtual character class display element; and the prediction module 5260 is configured to determine, when the target display element is the virtual character class display element and the state of the target display element is a first designated state, sixth target prompt information used for indicating that the virtual character class display element is in the first designated state, the state including at least one of a blood volume state, a magic state, a recall state, a moving state, an attack state, an attacked state, an equipment state, a level state, and an external wearing state.

In some embodiments, the target display element includes construction class display elements; the battle information includes a state of the construction class display element; and the prediction module 5260 is configured to determine, when the target display element is the construction class display element and the state of the target display element is a second designated state, seventh target prompt information used for indicating that the construction class display element is in the second designated state.

In some embodiments, the target display element includes a network information display element; the battle information includes network speed information; and the prediction module 5260 is configured to determine, when the target display element is the network information display element and a network speed of the network speed information is less than a first threshold, eighth target prompt information used for indicating a network speed state.

In some embodiments, the target display element includes a hardware performance display element; the battle information includes a hardware working performance parameter; and the prediction module 5260 is configured to determine, when the target display element is the hardware performance display element and the hardware working performance parameter is less than a second threshold, ninth target prompt information used for indicating a network speed state.

In some embodiments, the target display element includes a prompt information display element; the battle information includes message content in the prompt information display element; and the prediction module 5260 is configured to determine, when the target display element is the prompt information display element, tenth target prompt information used for automatically replying to the message content.

In some embodiments, the UI further includes a moving control, the moving control being a control configured to control the master virtual character to move in the virtual environment, the moving control and the signal control being located at two marginal regions far away from each other on the UI.

Figure 54:
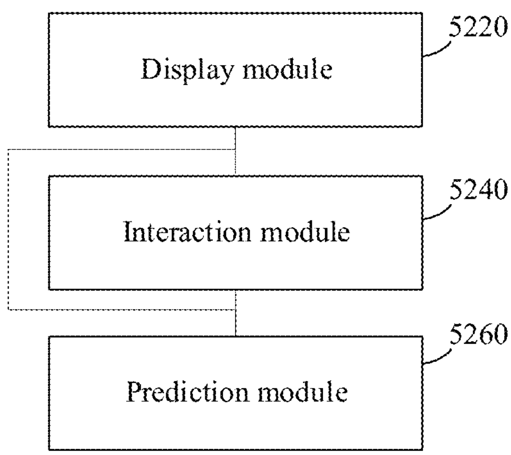
FIG. 54 is a block diagram of an apparatus for displaying prompt information in a multiplayer online battle program according to an exemplary embodiment of this application.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. FIG. 54 is a block diagram of an apparatus for displaying prompt information in a multiplayer online battle program according to an exemplary embodiment of this application. The apparatus may be implemented as an entire terminal or a part of a terminal by using software, hardware, or a combination thereof. The apparatus may be combined with the apparatus shown in FIG. 53 into the same apparatus. The apparatus includes:

a display module 5220, configured to display a UI of the multiplayer online battle program; the UI including a virtual environment image and an interaction panel region;

an interaction module 5240, configured to receive a directional operation on the UI, the directional operation being an operation for activating a prompt information transmission function and pointing to a target display element in the UI, the target display element being one of a plurality of display elements in the UI; and a prediction module 5260, configured to predict target prompt information according to the target display element and battle information;

the display module 5220 being configured to display the target prompt information on the UI.

In some embodiments, the UI includes an interaction panel region, the interaction panel region including a signal control; and the directional operation is an operation pointing from the signal control to a target display element in the UI.

In some embodiments, the signal control includes a button control; the directional operation includes a first touch operation and a second touch operation;

the interaction module 5240 is configured to receive a first touch operation applied on the button control on the UI;

the display module 5220 is configured to display one or more candidate display elements on the UI; and the interaction module 5240 is configured to receive the second touch operation applied on the target display element in the candidate display elements on the UI.

In some embodiments, the display module 5220 is configured to display the one or more candidate display elements on the UI in a highlight manner, the highlight manner including at least one of the following display manners: a target color display manner, an overlay masking display manner, a highlight display manner, and a contour display manner.

In some embodiments, the signal control includes a button control; the directional operation includes a slide operation; and the interaction module 5240 is configured to receive a slide operation on the UI, a slide starting point of the slide operation being the button control, and a slide end point of the slide operation being the target display element.

In some embodiments, the display module 5220 is further configured to display an auxiliary line or a movement route pointing from the slide starting point to the slide end point on the UI when the slide operation is received on the button control.

In some embodiments, the signal control includes a map expansion control; the directional operation includes a third touch operation and a fourth touch operation;

the interaction module 5240 is configured to receive the third touch operation applied on the map expansion control on the UI;

the display module 5220 is configured to display a map viewing control of a virtual environment on the UI according to the third touch operation; and the interaction module 5240 is configured to receive the fourth touch operation applied on the target display element on the map viewing control.

In some embodiments, the UI includes a virtual environment image and an interaction panel region, the virtual environment image being an image of a virtual environment observed from a perspective corresponding to a master virtual character, the virtual environment being a battle environment configured for at least two virtual characters to battle; and the display elements include at least one of the following elements:

three-dimensional models or two-dimensional elements forming battle function elements in the virtual environment;

information display elements in the interaction panel region; and control function elements in the interaction panel region.

In some embodiments, the display elements further include at least one of the following elements:

three-dimensional models or two-dimensional elements used for decoration in the virtual environment;

elements associated with a real world in the virtual environment;

elements associated with user accounts in the virtual environment; and elements associated with teams to which the user accounts belong in the virtual environment.

In some embodiments, the display elements further include at least one of the following elements:

prompt information transmitted by other user accounts.

In some embodiments, the prediction module 5260 is configured to query a behavior tree for the target prompt information according to the target display element and the battle information.

the behavior tree including a correspondence between the display elements, the battle information, and the prompt information.

In some embodiments, the target display element includes skill class display elements; the battle information includes a skill availability status; and the prediction module 5260 is configured to determine, when the target display element is the skill class display element and a skill availability status corresponding to the target display element is unavailable, first target prompt information used for indicating that a skill is unavailable; and determine, when the target display element is the skill class display element and a skill availability status corresponding to the target display element is available, second target prompt information used for indicating that a skill is available.

In some embodiments, the target display element includes skill class display elements; the battle information includes a skill CD time; and the prediction module 5260 is configured to determine, when the target display element is the skill class display element and a skill CD time corresponding to the target display element is valid, third target prompt information used for indicating the skill CD time.

In some embodiments, the target display element includes resource class display elements; the battle information includes vision information of the resource class display element; and the prediction module 5260 is configured to determine, when the target display element is the resource class display element and the vision information corresponding to the target display element has vision of an enemy, fourth target prompt information used for indicating that the enemy is obtaining the resource.

In some embodiments, the target display element includes resource class display elements; the battle information includes refresh information of the resource class display element; and The prediction module 5260 is configured to determine, when the target display element is the resource class display element and the refresh information is valid, fifth target prompt information used for indicating a remaining refresh time of the resource class display element.

In some embodiments, the target display element includes virtual character class display elements; the battle information includes a state of the virtual character class display element; and the prediction module 5260 is configured to determine, when the target display element is the virtual character class display element and the state of the target display element is a first designated state, sixth target prompt information used for indicating that the virtual character class display element is in the first designated state, the state including at least one of a blood volume state, a magic state, a recall state, a moving state, an attack state, an attacked state, an equipment state, a level state, and an external wearing state.

In some embodiments, the target display element includes construction class display elements; the battle information includes a state of the construction class display element; and the prediction module 5260 is configured to determine, when the target display element is the construction class display element and the state of the target display element is a second designated state, seventh target prompt information used for indicating that the construction class display element is in the second designated state.

In some embodiments, the target display element includes a network information display element; the battle information includes network speed information; and the prediction module 5260 is configured to determine, when the target display element is the network information display element and a network speed of the network speed information is less than a first threshold, eighth target prompt information used for indicating a network speed state.

In some embodiments, the target display element includes a hardware performance display element; the battle information includes a hardware working performance parameter; and the prediction module 5260 is configured to determine, when the target display element is the hardware performance display element and the hardware working performance parameter is less than a second threshold, ninth target prompt information used for indicating a network speed state.

In some embodiments, the target display element includes a prompt information display element; the battle information includes message content in the prompt information display element; and the prediction module 5260 is configured to determine, when the target display element is the prompt information display element, tenth target prompt information used for automatically replying to the message content.

In some embodiments, the UI further includes a moving control, the moving control being a control configured to control the master virtual character to move in the virtual environment, the moving control and the signal control being located at two marginal regions far away from each other on the UI.

This application further provides a terminal, including a processor and a memory, the memory storing at least one instruction, the at least one instruction being executed by the processor to implement the method for transmitting prompt information in a multiplayer online battle program, and/or, the method for displaying prompt information in a multiplayer online battle program provided in the foregoing method embodiments. The terminal may be a terminal provided in FIG. 55 below.

Figure 55:
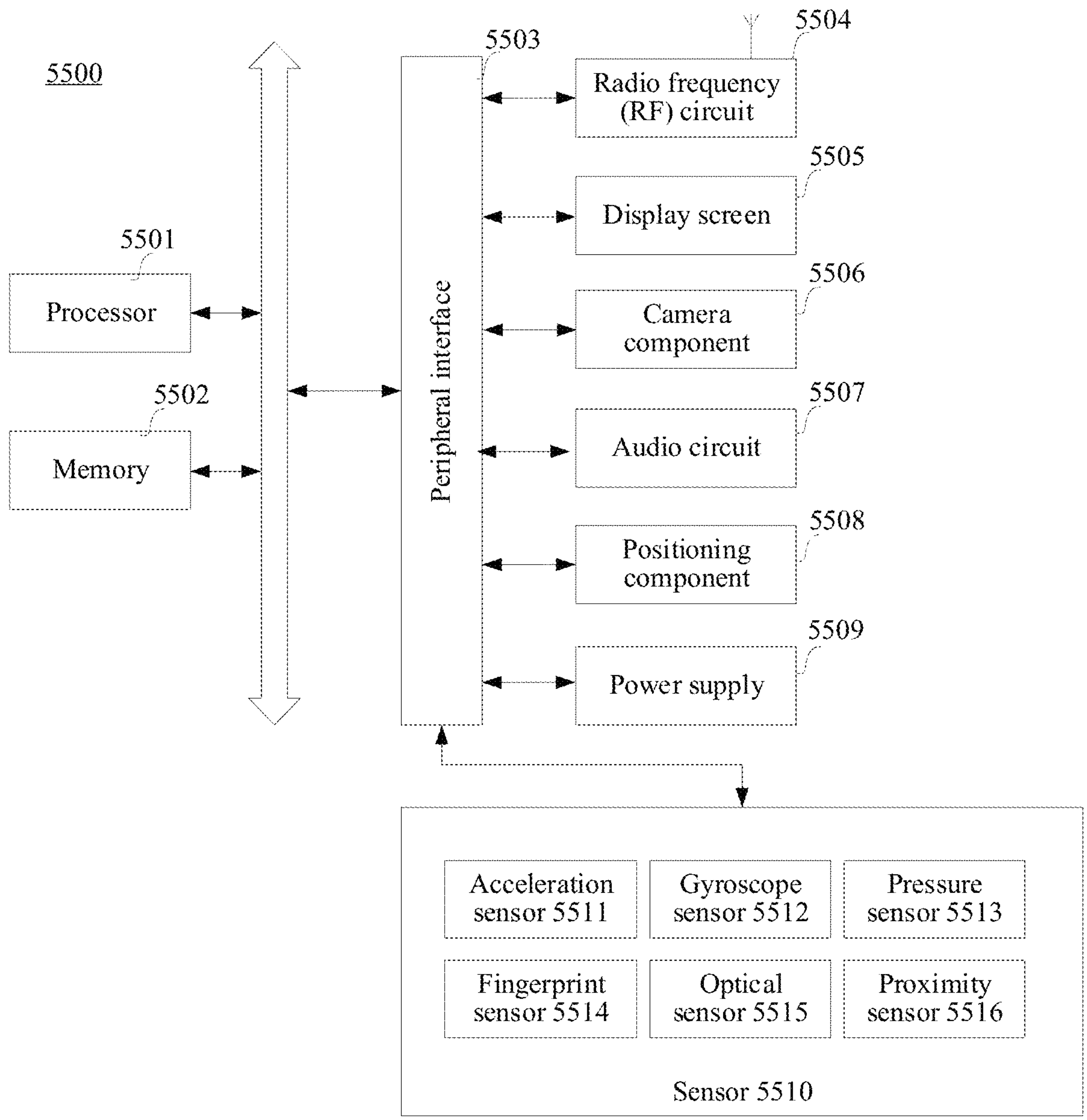
FIG. 55 is a block diagram of a terminal according to an exemplary embodiment of this application.

FIG. 55 shows a structural block diagram of a terminal 5500 according to an exemplary embodiment of this application. The terminal 5500 may be a smartphone, a tablet computer, an MP3 player, an MP4 player, a notebook computer, or a desktop computer. The terminal 5500 may also be referred to as other names such as user equipment, a portable terminal, a laptop terminal, or a desktop terminal.

Generally, the terminal 5500 includes a processor 5501 and a memory 5502.

The processor 5501 may include one or more processing cores, for example, a 4-core processor or an 8-core processor. The processor 5501 may be implemented in at least one hardware form of a digital signal processor (DSP), a field-programmable gate array (FPGA), and a programmable logic array (PLA). The processor 5501 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 5501 may be integrated with a graphics processing unit (GPU). The GPU is configured to render and draw content that needs to be displayed on a display screen. In some embodiments, the processor 5501 may further include an artificial intelligence (AI) processor. The AI processor is configured to process computing operations related to machine learning.

The memory 5502 may include one or more computer-readable storage media. The computer-readable storage medium may be non-transient. The memory 5502 may further include a high-speed random access memory and a nonvolatile memory, for example, one or more disk storage devices or flash storage devices. In some embodiments, a non-transitory computer-readable storage medium in the memory 5502 is configured to store at least one instruction, the at least one instruction being configured to be executed by the processor 5501 to implement the method for transmitting prompt information in a multiplayer online battle program, and/or, the method for displaying prompt information in a multiplayer online battle program provided in the method embodiments of this application.

In some embodiments, the terminal 5500 may optionally include: a peripheral interface 5503 and at least one peripheral. The processor 5501, the memory 5502, and the peripheral interface 5503 may be connected by using a bus or a signal cable. Each peripheral may be connected to the peripheral interface 5503 by using a bus, a signal cable, or a circuit board. Specifically, the peripheral device includes: at least one of a radio frequency (RF) circuit 5504, a display screen 5505, a camera component 5506, an audio circuit 5507, a positioning component 5508, and a power supply 5509.

The peripheral interface 5503 may be configured to connect the at least one peripheral related to input/output (I/O) to the processor 5501 and the memory 5502. In some embodiments, the processor 5501, the memory 5502 and the peripheral device interface 5503 are integrated on a same chip or circuit board. In some other embodiments, any one or two of the processor 5501, the memory 5502, and the peripheral device interface 5503 may be implemented on a single chip or circuit board. This is not limited in this embodiment.

The RF circuit 5504 is configured to receive and transmit an RF signal, also referred to as an electromagnetic signal. The RF circuit 5504 communicates with a communication network and other communication devices through the electromagnetic signal. The RF circuit 5504 converts an electrical signal into an electromagnetic signal for transmission, or converts a received electromagnetic signal into an electrical signal. In some embodiments, the RF circuit 5504 includes: an antenna system, an RF transceiver, one or more amplifiers, a tuner, an oscillator, a digital signal processor, a codec chip set, a subscriber identity module card, and the like. The RF circuit 5504 may communicate with another terminal by using at least one wireless communication protocol. The wireless communication protocol includes, but is not limited to: a world wide web, a metropolitan area network, an intranet, generations of mobile communication networks (2G, 3G, 4G, and 5G), a wireless local area network, and/or a Wi-Fi network. In some embodiments, the RF 5504 may further include a circuit related to NFC, which is not limited in this application.

The display screen 5505 is configured to display a user interface (UI). The UI may include a graph, text, an icon, a video, and any combination thereof. When the display screen 5505 is a touch display screen, the display screen 5505 is also capable of acquiring a touch signal on or above a surface of the display screen 5505. The touch signal may be inputted to the processor 5501 as a control signal for processing. In this case, the display screen 5505 may be further configured to provide a virtual button and/or a virtual keyboard that are/is also referred to as a soft button and/or a soft keyboard. In some embodiments, there may be one display screen 5505, disposed on a front panel of the terminal 5500. In some other embodiments, there may be at least two display screens 5505, disposed on different surfaces of the terminal 5500 respectively or in a folded design. In still other embodiments, the display screen 5505 may be a flexible display screen, disposed on a curved surface or a folded surface of the terminal 5500. Even, the display screen 5505 may be further set in a non-rectangular irregular pattern, namely, a special-shaped screen. The display screen 5505 may be prepared by using materials such as a liquid crystal display (LCD), an organic light-emitting diode (OLED), or the like.

The camera component 5506 is configured to acquire images or videos. In some embodiments, the camera component 5506 includes a front-facing camera and a rear-facing camera. Generally, the front-facing camera is disposed on the front panel of the terminal, and the rear-facing camera is disposed on a back surface of the terminal. In some embodiments, there are at least two rear cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera component 5506 may further include a flash. The flash may be a monochrome temperature flash, or may be a double color temperature flash. The double color temperature flash refers to a combination of a warm light flash and a cold light flash, and may be used for light compensation under different color temperatures.

The audio circuit 5507 may include a microphone and a speaker. The microphone is configured to acquire sound waves of a user and an environment, and convert the sound waves into an electrical signal to input to the processor 5501 for processing, or input to the radio frequency circuit 5504 for implementing voice communication. For the purpose of stereo sound acquisition or noise reduction, there may be a plurality of microphones, respectively disposed at different parts of the terminal 5500. The microphone may further be an array microphone or an omni-directional acquisition type microphone. The speaker is configured to convert electrical signals from the processor 5501 or the RF circuit 5504 into sound waves. The speaker may be a conventional film speaker, or may be a piezoelectric ceramic speaker. When the speaker is the piezoelectric ceramic speaker, the speaker not only can convert an electric signal into acoustic waves audible to a human being, but also can convert an electric signal into acoustic waves inaudible to a human being, for ranging and other purposes. In some embodiments, the audio circuit 5507 may also include an earphone jack.

The positioning component 5508 is configured to determine a current geographic location of the terminal 5500, to implement a navigation or a location-based service (LBS). The positioning component 5508 may be a positioning component based on the global positioning system (GPS) of the United States, the BeiDou System of China, and the GALILEO System of Russia.

The power supply 5509 is configured to supply power to components in the terminal 5500. The power supply 5509 may be an alternating-current power supply, a direct-current power supply, a disposable battery, or a rechargeable battery. When the power supply 5509 includes a rechargeable battery, and the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charging technology.

In some embodiments, the terminal 5500 may further include one or more sensors 5510. The one or more sensors 5510 include, but are not limited to: an acceleration sensor 5511, a gyroscope sensor 5512, a pressure sensor 5513, a fingerprint sensor 5514, an optical sensor 5515, and a proximity sensor 5516.

The acceleration sensor 5511 may detect a magnitude of acceleration on three coordinate axes of a coordinate system established by the terminal 5500. For example, the acceleration sensor 5511 may be configured to detect components of gravity acceleration on the three coordinate axes. The processor 5501 may control, according to a gravity acceleration signal acquired by the acceleration sensor 5511, the touch display screen 5505 to display the UI in a frame view or a portrait view. The acceleration sensor 5511 may be further configured to acquire motion data of a game or a user.

The gyroscope sensor 5512 may detect a body direction and a rotation angle of the terminal 5500. The gyroscope sensor 5512 may cooperate with the acceleration sensor 5511 to acquire a 3D action by the user on the terminal 5500. The processor 5501 may implement the following functions according to data acquired by the gyroscope sensor 5512: motion sensing (for example, the UI is changed according to a tilt operation of a user), image stabilization during shooting, game control, and inertial navigation.

The pressure sensor 5513 may be disposed at a side frame of the terminal 5500 and/or a lower layer of the touch display screen 5505. When the pressure sensor 5513 is disposed at the side frame of the terminal 5500, a holding signal of the user on the terminal 5500 may be detected. The processor 5501 performs left and right hand recognition or a quick operation according to the holding signal acquired by the pressure sensor 5513. When the pressure sensor 5513 is disposed on the low layer of the touch display screen 5505, the processor 5501 controls, according to a pressure operation of the user on the touch display screen 5505, an operable control on the UI. The operable control includes at least one of a button control, a scroll-bar control, an icon control, and a menu control.

The fingerprint sensor 5514 is configured to acquire a user's fingerprint, and the processor 5501 identifies a user's identity according to the fingerprint acquired by the fingerprint sensor 5514, or the fingerprint sensor 5514 identifies a user's identity according to the acquired fingerprint. When identifying that the user's identity is a trusted identity, the processor 5501 authorizes the user to perform related sensitive operations. The sensitive operations include: unlocking a screen, viewing encrypted information, downloading software, paying, changing a setting, and the like. The fingerprint sensor 5514 may be disposed on a front surface, a back surface, or a side surface of the terminal 5500. When a physical button or a vendor logo is disposed on the terminal 5500, the fingerprint 5514 may be integrated with the physical button or the vendor logo.

The optical sensor 5515 is configured to acquire ambient light intensity. In an embodiment, the processor 5501 may control the display brightness of the touch display screen 5505 according to the ambient light intensity acquired by the optical sensor 5515. Specifically, when the ambient light intensity is relatively high, the display brightness of the touch display screen 5505 is increased. When the ambient light intensity is relatively low, the display brightness of the touch display screen 5505 is decreased. In another embodiment, the processor 5501 may further dynamically adjust a camera parameter of the camera component 5506 according to the ambient light intensity acquired by the optical sensor 5515.

The proximity sensor 5516, also referred to as a distance sensor, is usually disposed on the front panel of the terminal 5500. The proximity sensor 5516 is configured to acquire a distance between the user and the front surface of the terminal 5500. In an embodiment, when the proximity sensor 5516 detects that the distance between the user and the front surface of the terminal 5500 gradually becomes small, the touch display screen 5505 is controlled by the processor 5501 to switch from a screen-on state to a screen-off state. When the proximity sensor 5516 detects that the distance between the user and the front surface of the terminal 5500 gradually increases, the touch display screen 5505 is controlled by the processor 5501 to switch from the screen-off state to the screen-on state.

A person skilled in the art may understand that the structure shown in FIG. 55 does not constitute a limitation to the terminal 5500, and the terminal may include more or fewer components than those shown in the figure, or some components may be combined, or a different component arrangement may be used.

The memory further includes one or more programs. The one or more programs are stored in the memory. The one or more programs include a program for performing the method for transmitting prompt information in a multiplayer online battle program, and/or the method for displaying prompt information in a multiplayer online battle program provided in the embodiments of this application.

This application provides a computer-readable storage medium, storing at least one instruction, the at least one instruction being executed by a processor to implement the method for transmitting prompt information in a multiplayer online battle program, and/or, the method for displaying prompt information in a multiplayer online battle program provided in the foregoing method embodiments.

This application further provides a computer program product, the computer program product, when run on a computer, causing the computer to perform the method for transmitting prompt information in a multiplayer online battle program, and/or, the method for displaying prompt information in a multiplayer online battle program according to the foregoing method embodiments.

The sequence numbers of the foregoing embodiments of this application are merely for description purpose but do not imply the preference among the embodiments.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, or improvement made within the spirit and principle of this application shall fall within the protection scope of this application.

What is claimed is:

1. A method for transmitting prompt information in a multiplayer online battle program performed by a terminal, the method comprising:

displaying a user interface (UI) from a perspective corresponding to a master virtual character of the multiplayer online battle program, the UI including a plurality of skill display elements that are in inactive status;

receiving a prompt activation operation on the UI for activating a prompt information transmission function;

activating the plurality of skill display elements in the UI in response to the prompt activation operation, wherein the plurality of skill display elements are visually changed from the inactive status in response to the prompt activation operation on the UI;

receiving a prompt release operation on a target skill display element among the plurality of skill display elements;

determining target prompt information specific to the target skill display element; and transmitting the determined target prompt information to one or more virtual characters that are teammates of the master virtual character.

2. The method according to claim 1, wherein the prompt release operation on the target skill display element is an operation that is the same as a predefined skill release operation on the target skill display element.

3. The method according to claim 2, wherein the target skill display element is configured to not release its predefined skill in response to the prompt release operation.

4. The method according to claim 1, wherein the plurality of skill display elements comprise at least one of the following elements:

three-dimensional models or two-dimensional elements forming battle function elements of the multiplayer online battle program;

information display elements in an interaction panel region of the UI; and control function elements in the interaction panel region.

5. The method according to claim 4, wherein the plurality of skill display elements further comprise at least one of the following elements:

three-dimensional models or two-dimensional elements used for decoration in the multiplayer online battle program;

elements associated with a real world in the multiplayer online battle program;

elements associated with user accounts in the multiplayer online battle program; and elements associated with teams to which the user accounts belong in the multiplayer online battle program.

6. The method according to claim 1, wherein the determining target prompt information specific to the target skill display element comprises:

querying an algorithm for the target prompt information according to the target skill display element and battle information, the algorithm comprising a correspondence between the plurality of skill display elements, the battle information, and the prompt information.

7. The method according to claim 1, wherein the UI further comprises a moving control configured to control the master virtual character to move in the multiplayer online battle program, and the moving control and a signal control for receiving the prompt activation operation are located at two different regions on the UI.

8. A terminal, comprising a processor and a memory, the memory storing a plurality of instructions that, when executed by the processor, cause the terminal to perform a method for transmitting prompt information in a multiplayer online battle program including:

displaying a user interface (UI) from a perspective corresponding to a master virtual character of the multiplayer online battle program, the UI including a plurality of skill display elements that are in inactive status;

receiving a prompt activation operation on the UI for activating a prompt information transmission function;

activating the plurality of skill display elements in the UI in response to the prompt activation operation, wherein the plurality of skill display elements are visually changed from the inactive status in response to the prompt activation operation on the UI;

receiving a prompt release operation on a target skill display element among the plurality of skill display elements;

determining target prompt information specific to the target skill display element; and transmitting the determined target prompt information to one or more virtual characters that are teammates of the master virtual character.

9. The terminal according to claim 8, wherein the prompt release operation on the target skill display element is an operation that is the same as a predefined skill release operation on the target skill display element.

10. The terminal according to claim 9, wherein the target skill display element is configured to not release its predefined skill in response to the prompt release operation.

11. The terminal according to claim 8, wherein the plurality of skill display elements comprise at least one of the following elements:

three-dimensional models or two-dimensional elements forming battle function elements of the multiplayer online battle program;

information display elements in an interaction panel region of the UI; and control function elements in the interaction panel region.

12. The terminal according to claim 11, wherein the plurality of skill display elements further comprise at least one of the following elements:

three-dimensional models or two-dimensional elements used for decoration in the multiplayer online battle program;

elements associated with a real world in the multiplayer online battle program;

elements associated with user accounts in the multiplayer online battle program; and elements associated with teams to which the user accounts belong in the multiplayer online battle program.

13. The terminal according to claim 8, wherein the determining target prompt information specific to the target skill display element comprises:

querying an algorithm for the target prompt information according to the target skill display element and battle information, the algorithm comprising a correspondence between the plurality of skill display elements, the battle information, and the prompt information.

14. The terminal according to claim 8, wherein the UI further comprises a moving control configured to control the master virtual character to move in the multiplayer online battle program, and the moving control and a signal control for receiving the prompt activation operation are located at two different regions on the UI.

15. A non-transitory computer-readable storage medium, storing a plurality of instructions that, when executed by a processor of a terminal, cause the terminal to perform a method for transmitting prompt information in a multiplayer online battle program including:

displaying a user interface (UI) from a perspective corresponding to a master virtual character of the multiplayer online battle program, the UI including a plurality of skill display elements that are in inactive status;

receiving a prompt activation operation on the UI for activating a prompt information transmission function;

activating the plurality of skill display elements in the UI in response to the prompt activation operation, wherein the plurality of skill display elements are visually changed from the inactive status in response to the prompt activation operation on the UI;

receiving a prompt release operation on a target skill display element among the plurality of skill display elements;

determining target prompt information specific to the target skill display element; and transmitting the determined target prompt information to one or more virtual characters that are teammates of the master virtual character.

16. The non-transitory computer-readable storage medium according to claim 15, wherein the prompt release operation on the target skill display element is an operation that is the same as a predefined skill release operation on the target skill display element.

17. The non-transitory computer-readable storage medium according to claim 16, wherein the target skill display element is configured to not release its predefined skill in response to the prompt release operation.

* * * * *